US012666312B2

(12) United States Patent
Wu

(10) Patent No.: US 12,666,312 B2
(45) Date of Patent: Jun. 23, 2026

(54) MANAGING UE INFORMATION AFTER PREPARING A CONDITIONAL MOBILITY PROCEDURE

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 185 days.

(21) Appl. No.: 18/032,388

(22) PCT Filed: Oct. 19, 2021

(86) PCT No.: PCT/US2021/055568
§ 371 (c)(1),
(2) Date: Apr. 18, 2023

(87) PCT Pub. No.: WO2022/086933
PCT Pub. Date: Apr. 28, 2022

(65) Prior Publication Data
US 2023/0388891 A1 Nov. 30, 2023

Related U.S. Application Data

(60) Provisional application No. 63/104,036, filed on Oct. 22, 2020.

(51) Int. Cl.
*H04W 36/00* (2009.01)
*H04W 36/36* (2009.01)

(52) U.S. Cl.
CPC . *H04W 36/0007* (2018.08); *H04W 36/00692* (2023.05); *H04W 36/362* (2023.05)

(58) Field of Classification Search
CPC ..... H04W 36/00; H04W 36/36; H04W 36/08; H04W 36/30; H04W 76/34; H04W 76/27;
(Continued)

(56) References Cited

U.S. PATENT DOCUMENTS 9,985,756 B2 * 5/2018 Kim ........................ H04L 5/001
11,317,335 B2 * 4/2022 Latheef ............... H04W 36/362
(Continued)

FOREIGN PATENT DOCUMENTS

WO WO-2020/128848 A1 6/2020
WO WO-2021/008478 A1 1/2021
(Continued)

OTHER PUBLICATIONS

Sharp: "UE assistance information transmission in CHO case", 3GPP Draft; R2-2007718, vol. RAN WG2, No. e-meeting; Aug. 17, 2020-Aug. 28, 2020 Aug. 7, 2020 (Aug. 7, 2020), XP051912345 (Year: 2020).*
(Continued)

*Primary Examiner* — Man U Phan
(74) *Attorney, Agent, or Firm* — MARSHALL, GERSTEIN & BORUN LLP

(57) ABSTRACT

A method in a UE communicating with a RAN includes receiving (312A), from the RAN, a conditional configuration and a corresponding condition for a conditional procedure and, after receiving the conditional configuration and the corresponding condition, sending (316 A) UE information to the RAN. The UE information includes information indicative of a preference or circumstance of the UE. The method also includes, after sending the UE information to the RAN, determining (334A) that the corresponding condition is satisfied and, after determining that the corresponding condition is satisfied, again sending (320A) the UE information to the RAN.

20 Claims, 26 Drawing Sheets

(58) Field of Classification Search
CPC ..... H04W 76/20; H04W 76/15; H04W 72/04;
H04W 72/08; H04W 52/02; H04W 52/06;
H04W 52/24; H04W 52/36; H04W 24/08
USPC ........................................................ 370/331
See application file for complete search history.

(56)                    References Cited

U.S. PATENT DOCUMENTS

| | | | | |
|---|---|---|---|---|
| 11,895,550 | B2 * | 2/2024 | Latheef | H04W 36/249 |
| 12,069,521 | B2 * | 8/2024 | Futaki | H04W 36/0061 |
| 12,156,018 | B2 * | 11/2024 | Rugeland | H04W 36/00838 |
| 12,250,595 | B2 * | 3/2025 | Hwang | H04W 8/22 |
| 12,267,732 | B2 * | 4/2025 | Teyeb | H04W 76/27 |
| 2023/0143942 | A1 * | 5/2023 | Wu | H04W 36/0055 |
| | | | | 370/311 |
| 2023/0199578 | A1 * | 6/2023 | Wu | H04W 36/305 |
| | | | | 370/331 |
| 2024/0049076 | A1 * | 2/2024 | Jin | H04W 36/362 |
| 2024/0057216 | A1 * | 2/2024 | Wu | H04W 76/34 |
| 2024/0306050 | A1 * | 9/2024 | Wu | H04W 36/0072 |
| 2024/0349134 | A1 * | 10/2024 | Futaki | H04W 36/0077 |

FOREIGN PATENT DOCUMENTS

| | | |
|---|---|---|
| WO | WO-2021/0105681 A1 | 6/2021 |
| WO | WO-2021/216485 A1 | 10/2021 |

OTHER PUBLICATIONS

Huawei et al., "Correction on UE Assistance Information Transmission for Handover Case, " 3GPP Draft (2020).
InterDigital Inc., "Conditional PSCell Addition/Change," 3GPP Draft (2019).
International Search Report for Application No. PCT/US2021/055568, dated Jan. 31, 2022.
Qualcomm Incorporated, "Correction to Re-Sending UEAssistanceInformation Upon Reconfiguration w/sync," 3GPP Draft (2020).
Samsung, "Repetition of SCG Related (Power Saving) Assistance Upon Synchronous Reconfiguration/Handover," 3GPP Draft (2020).
Sharp, "UE Assistance Information Transmission in CHO Case," 3GPP Draft (2020).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.6.0 (2019).
"3rd Generation Partnership Project; Technical Specification Group Radio Access Network; Evolved Universal Terrestrial Radio Access (E-UTRA); Overall description; Stage 2 (Release 16)," 3GPP TS 36.300 V16.3.0 (2020).
"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.7.0 (2019).
"3rd Generation Partnership Project; Technical Specification Group Radio Access Network; Evolved Universal Terrestrial Radio Access (E-UTRA); Packet Data Convergence Protocol (PDCP) specification (Release 15)," 3GPP TS 36.323 V15.6.0 (2020).
"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331 V16.2.0 (2020).
"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331 V16.3.0 (2020).
"3rd Generation Partnership Project; Technical Specification Group Radio Access Network; Evolved Universal Terrestrial Radio Access Network (E-UTRAN); X2 application protocol (X2AP) (Release 16)," 3GPP TS 36.423 V16.3.0 (2020).
"3rd Generation Partnership Project; Technical Specification Group Radio Access Network; NG-RAN; Architecture description (Release 15)," 3GPP TS 38.401 V15.6.0 (2019).
"3rd Generation Partnership Project; Technical Specification Group Radio Access Network; NG-RAN; Xn application protocol (XnAP) (Release 16)," 3GPP TS 38.423 V16.3.0 (2020).
"3rd Generation Partnership Project; Technical Specification Group Radio Access Network; NR; NR and NG-RAN Overall Description; Stage 2 (Release 15)," 3GPP TS 38.300 V15.6.0 (2019).
"3rd Generation Partnership Project; Technical Specification Group Radio Access Network; NR; NR and NG-RAN Overall Description; Stage 2 (Release 16)," 3GPP TS 38.300 V16.3.0 (2020).
"3rd Generation Partnership Project; Technical Specification Group Radio Access Network; NR; Packet Data Convergence Protocol (PDCP) specification (Release 15)," 3GPP TS 38.323 V15.6.0 (2019).
"3rd Generation Partnership Project; Technical Specification Group Radio Access Network; NR; Radio Resource Control (RRC) protocol specification (Release 16)," 3GPP TS 38.331 V16.2.0 (2020).
"3rd Generation Partnership Project; Technical Specification Group Radio Access Network; NR; Radio Resource Control (RRC) protocol specification (Release 16)," 3GPP TS 38.331 V16.3.0 (2020).

* cited by examiner

300B

300D

400B

500C

| UE 102 | MN 104 | C-SN 106A | SN 106B |
|---|---|---|---|

CSAC configuration procedure 588C

*First UE information* → 516C

*First UE information* 518C

Determine to update C-SN configuration in response to first UE information 554C

*SN Request (first UE information)* 556C

Generate second C-SN configuration for C-PSCell 558C

*SN Request Ack (second C-SN configuration)* 560C

*RRC reconfiguration (second C-SN configuration)* 562C

*RRC reconfiguration complete* 564C

594C

CSAC execution procedure 590C

*Second UE information* 532C

*Second UE information* 533C

RRC reconfiguration procedure 592C

Figure 5C

500D

| UE 102 | MN 104 | C-SN 106A | SN 106B |

CSAC configuration procedure 588D

*First UE information* → 516D

*First UE information* → 518D

Determine to release C-SN configuration — 572D

*RRC reconfiguration (release conditional configuration)* — 574D

*SN Release Request* — 578D

*RRC reconfiguration complete* → 576D

Release C-SN configuration — 580D

*SN Release Request Ack* — 582D

596D

RRC reconfiguration procedure 593D

*Second UE information* → 532D

*Second UE information* → 533D

Figure 6:
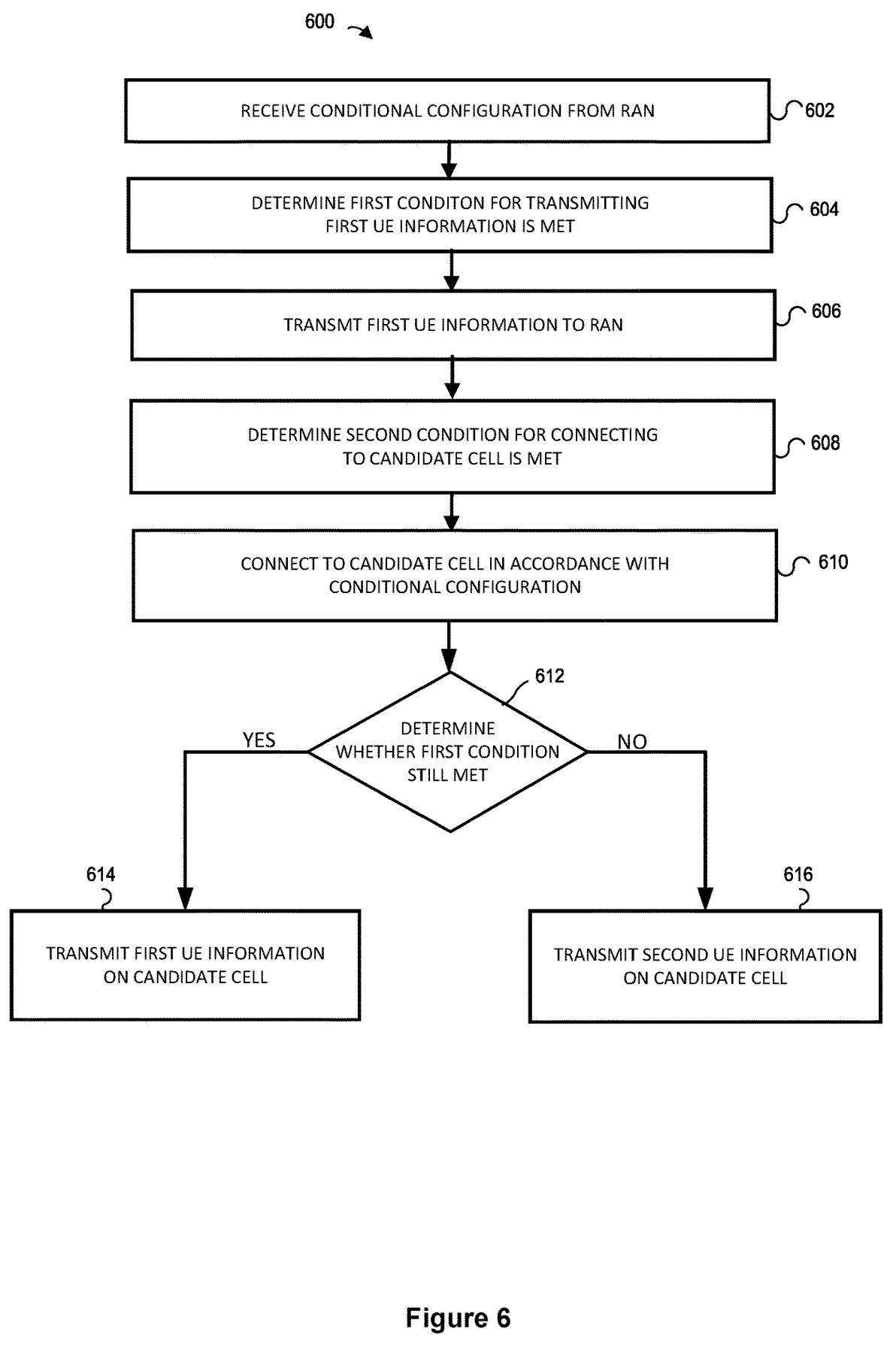

RECEIVE CONDITIONAL CONFIGURATION FROM RAN — 602

DETERMINE FIRST CONDITON FOR TRANSMITTING
FIRST UE INFORMATION IS MET — 604

TRANSMT FIRST UE INFORMATION TO RAN — 606

DETERMINE SECOND CONDITION FOR CONNECTING
TO CANDIDATE CELL IS MET — 608

CONNECT TO CANDIDATE CELL IN ACCORDANCE WITH
CONDITIONAL CONFIGURATION — 610

612
DETERMINE
WHETHER FIRST CONDITION
STILL MET

YES                                                    NO 614                                                    616

TRANSMIT FIRST UE INFORMATION
ON CANDIDATE CELL

TRANSMIT SECOND UE INFORMATION
ON CANDIDATE CELL

MANAGING UE INFORMATION AFTER PREPARING A CONDITIONAL MOBILITY PROCEDURE

This disclosure relates generally to wireless communications and, more particularly, to managing user equipment (UE) information (e.g., preferred configuration information) after a conditional mobility procedure (e.g., after a radio access network (RAN) has prepared a conditional handover or conditional addition/change procedure, and/or after the conditional handover or conditional addition/change procedure is triggered and/or executed).

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. MCG DRBs use the lower-layer resources of only the MN, SCG DRBs use the lower-layer resources of only the SN, and split DRBs use the lower-layer resources of both the MCG and the SCG. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

As noted above, a UE in some scenarios can operate in DC by concurrently utilizing resources of multiple RAN nodes (e.g., multiple base stations or components of a distributed base station), which are interconnected by a backhaul. When these RAN nodes support different radio access technologies (RATs), this type of connectivity is referred to as Multi-Radio Dual Connectivity (MR-DC). When a UE operates in MR-DC, one base station operates as an MN that covers a primary cell (PCell), and the other base station operates as a secondary node (SN) that covers a primary secondary cell (PSCell). The UE communicates with the MN via the PCell, and with the SN via the PSCell. In other scenarios, the UE utilizes resources of only one base station at a time. One base station and/or the UE may then determine that the UE should establish a radio connection with another base station. For example, one base station can determine to hand the UE over to the second base station, and initiate a handover procedure.

The 3GPP specifications TS 36.300 and TS 38.300 describe procedures for handover (also called "reconfiguration with sync") scenarios. These procedures involve messaging (e.g., RRC signaling and preparation) between RAN nodes that generally causes latency, which in turn increases the probability of failure for handover procedures. Some handover procedures do not involve triggering conditions associated with the UE, and can be referred to as "immediate" handover procedures.

3GPP specification TS 37.340 v15.7.0 describes procedures for a UE to add or change an SN in DC scenarios. These procedures involve messaging (e.g., RRC signaling and preparation) between RAN nodes. This messaging generally causes latency, which in turn increases the probability that the SN addition or SN change procedure will fail. These procedures, which do not involve triggering conditions that are checked at the UE, can be referred to as "immediate" SN addition and SN change procedures.

UEs can also perform handover procedures to switch from one cell to another, whether in single connectivity (SC) or DC operation. The UE may handover from a cell of a first base station to a cell of a second base station, or from a cell of a first distributed unit (DU) of a base station to a cell of a second DU of the same base station, depending on the scenario. 3GPP specifications 38.401 v15.6.0, 36.300 v15.6.0 and 38.300 v15.6.0 describe a handover procedure that includes several steps (RRC signaling and preparation) between RAN nodes, which causes latency in the handover procedure and therefore increases the risk of handover failure. This procedure, which does not involve triggering conditions that are checked at the UE, can be referred to as an "immediate" handover procedure.

More recently, for handover, SN addition/change, or PSCell addition/change, "conditional" procedures have been considered (i.e., conditional handover, conditional SN addition/change, or conditional PSCell addition/change). For example, scenarios involving conditional handover procedures are described in 3GPP specifications 36.300 and 38.300 v16.3.0. Unlike the "immediate" mobility procedures discussed above, these conditional mobility procedures do not perform the handover, or add or change the SN or PSCell, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., one or more random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied. The configuration associated with the condition is at times referred to herein as the "conditional configuration" or "conditional reconfiguration". 3GPP specifications 36.331 and 38.331 v16.3.0 describe a data structure a base station can use to indicate a conditional (re)configuration, and a condition to be satisfied prior to applying the conditional configuration, respectively.

In various scenarios, a UE may send the RAN certain types of information indicating preferences and/or circumstances of the UE. For example, 3GPP TS 36.331 and 38.331 describe procedures for handling various types of UE information, including configurations preferred by the UE, in-device coexistence (IDC) assistance information, sidelink information, and multicast and/or broadcast service (MBS) interest information. The UE can send this UE information to a base station (e.g., MN or SN), after which the base station may choose to update UE configurations (i.e., configure or reconfigure the UE) in accordance with the UE information provided.

In "immediate" (non-conditional) mobility procedures, the source RAN node can provide any previously received UE information to the target RAN node during the mobility procedure itself. For example, when preparing an immediate handover procedure for a UE, the source base station can include previously received UE information in a Handover Request message, and send the Handover Request message to the target base station. In conditional mobility procedures, however, there can be a relatively long delay between the RAN setting up the conditional procedure, and the mobility procedure being triggered/executed (i.e., after the corresponding condition is satisfied). Thus, the UE might provide additional UE information to the source RAN node after the RAN has prepared the conditional mobility procedure, but before the corresponding condition is satisfied. For example, this may occur if the circumstances of the UE change, and/or if the UE prefers to use a configuration other than the conditional configuration that the UE received from the source RAN node. In scenarios such as these, it is not clear how the RAN should handle the new UE information, and any failure to properly manage the UE information can give rise to various network and/or device inefficiencies (e.g., longer delays before the UE can use a preferred configuration, delayed access to various services, shorter battery life for the UE due to unnecessary power consumption, etc.).

SUMMARY

Base stations and user equipment UEs of this disclosure implement techniques that can efficiently handle information indicative of preferences and/or circumstances of a UE (generally referred to herein as "UE information"), including in situations where the UE desires to send new UE information to the RAN (1) after the RAN has prepared a conditional mobility procedure, but (2) the condition has not yet been satisfied and/or the mobility procedure has not yet been executed (i.e., the handover or node change/addition has not yet occurred). The UE information may include a preferred configuration, sidelink information, IDC information, or MBS interest information, for example.

In some implementations, the UE or the RAN ensures that this UE information is conveyed to the candidate RAN node of the conditional mobility procedure. For example, the UE may send the UE information to the candidate RAN node (e.g., candidate base station, candidate DU, or candidate SN), either directly or indirectly (e.g., via an MN), after the mobility procedure is executed. Alternatively, the source RAN node (e.g., source base station) or an MN may send/forward the UE information to the candidate RAN node.

In other implementations, the UE information is not necessarily re-sent to the RAN or forwarded to the candidate RAN node, but the RAN nonetheless acts upon the UE information. For example, in a conditional handover procedure between DUs of a distributed base station—and, depending on the implementation, either before or after the handover is complete—the centralized unit (CU) of the base station may initiate a reconfiguration of the UE in accordance with the UE information (i.e., responsive to and/or based on the preference(s) and/or circumstance(s) indicated in the UE information). For example, the CU may determine one or more configuration restrictions (e.g., maximum resource allocations) based on the UE information, and send the candidate DU a UE context request message that includes information indicative of the configuration restriction(s). In another example implementation, in a DC scenario, the MN may initiate a reconfiguration of the UE in accordance with the UE information by sending an SN Request message to the candidate SN, where the SN Request message includes similar information indicative of one or more configuration restrictions.

In other implementations, the RAN (e.g., a source base station, CU, or MN) cancels the conditional mobility procedure, and/or causes the UE to release the conditional configuration, after receiving UE information from the UE. This can ensure, for example, that the UE is not forced to communicate with a candidate node using a configuration that does not align with preferences and/or circumstances of the UE.

In still other implementations, the RAN ensures that the UE does not send UE information if the RAN has already prepared a conditional mobility procedure for that UE. For example, the RAN may refrain from enabling the UE to send UE information after the RAN prepares (or has determined to prepare) a conditional mobility procedure for the UE, or may disable the UE from sending UE information if the UE is already enabled to do so. Alternatively, the RAN may refrain from preparing a conditional mobility procedure for a UE if the UE is currently enabled to send UE information to the RAN. In some of these latter implementations, if the RAN decides to enable the UE to send UE information but the UE is already configured for a conditional mobility procedure, the RAN sends the UE a radio resource control (RRC) message releasing the conditional configuration.

One example implementation of these techniques is a method in a UE communicating with a RAN. The method includes receiving, from the RAN, a conditional configuration and a corresponding condition for a conditional mobility procedure, where the corresponding condition is to be satisfied before the UE can communicate with a candidate node of the RAN using the conditional configuration. The method also includes, after receiving the conditional configuration and the corresponding condition, sending UE information to the RAN, the UE information including information indicative of a preference or circumstance of the UE and, after sending the UE information to the RAN, determining, by processing hardware of the UE, that the corresponding condition is satisfied. The method also includes, after determining that the corresponding condition is satisfied, again sending the UE information to the RAN.

In another example implementation, a method in a RAN communicating with a UE includes sending to the UE a conditional configuration and a corresponding condition for a conditional mobility procedure, where the corresponding condition is to be satisfied before the UE can communicate with a candidate node of the RAN using the conditional configuration. The method also includes, after sending the conditional configuration and the corresponding condition, and before the corresponding condition is satisfied, receiving UE information from the UE, the UE information including information indicative of a preference or circumstance of the UE and, after the conditional mobility procedure is executed, again receiving the UE information from the UE.

In another example implementation, a method in a RAN node of a RAN includes sending to a UE a conditional configuration and a corresponding condition for a conditional mobility procedure, where the corresponding condition is to be satisfied before the UE can communicate with a candidate node of the RAN using the conditional configuration. The method also includes, after sending the conditional configuration and the corresponding condition, receiving UE information from the UE, the UE information including information indicative of a preference or circumstance of the UE and, after receiving the UE information from the UE, sending the UE information to the candidate node.

In another example implementation, a method in a RAN node of a RAN includes sending to a UE a conditional configuration and a corresponding condition for a conditional mobility procedure, where the corresponding condition is to be satisfied before the UE can communicate with a candidate node of the RAN using the conditional configuration. The method also includes, after sending the conditional configuration and the corresponding condition, receiving UE information from the UE, the UE information including information indicative of a preference or circumstance of the UE and, after receiving the UE information from the UE, sending the candidate node a message that causes the UE to be reconfigured in accordance with the UE information.

In another example implementation, a method in a RAN node of a RAN includes sending to a UE a conditional configuration and a corresponding condition for a conditional mobility procedure, where the corresponding condition is to be satisfied before the UE can communicate with a candidate node of the RAN using the conditional configuration. The method also includes, after sending the conditional configuration and the corresponding condition, receiving UE information from the UE, the UE information including information indicative of a preference or circumstance of the UE and, in response to receiving the UE information from the UE, sending a message that causes the UE to release the conditional configuration.

In another example implementation, a method in a RAN node of a RAN includes determining, by processing hardware of the RAN node, to perform a conditional mobility procedure for a UE. The method also includes, in response to determining to perform, or performing, the conditional mobility procedure, preventing the UE from sending UE information indicative of a preference or circumstance of the UE to the RAN node, and sending to the UE a conditional configuration and a corresponding condition that is to be satisfied before the UE can communicate with a candidate node of the RAN using the conditional configuration.

In another example implementation, a method in a RAN node of a RAN includes determining, by processing hardware of the RAN node, to enable a UE to send UE information indicative of a preference or circumstance of the UE to the RAN node. The method also includes, in response to determining to enable, or enabling, the UE to send UE information indicative of a preference or circumstance of the UE to the RAN node, enabling the UE to send UE information indicative of a preference or circumstance of the UE to the RAN node, and preventing the UE from performing a conditional mobility procedure.

BRIEF DESCRIPTION OF THE DRAWINGS

FIGS. 5A through 5H are example message sequences corresponding to scenarios in which the RAN prepares a conditional change procedure for a UE from one secondary node (SN) to another;

FIG. 6 depicts a flow diagram of a method for providing UE information to a candidate RAN node;

DETAILED DESCRIPTION OF THE DRAWINGS

In general, a user equipment (UE) of this disclosure (e.g., any of the UEs described with reference to FIGS. 1 through 13 below) can receive a configuration related to a base station or a cell, along with a condition to be satisfied before the UE can apply the configuration, and can determine the conditional mobility procedure to which the configuration (referred to herein as a "conditional configuration") pertains. The conditional mobility procedure can be, for example, a conditional handover procedure, a conditional secondary node (SN) addition or change procedure, or a conditional primary secondary cell (PSCell) addition or change procedure. In the discussion that follows, the term "CPAC" is used to refer to a conditional PSCell addition or change without an SN change, while the term "CSAC" is used to refer to a conditional SN addition or change.

Figure 1A:
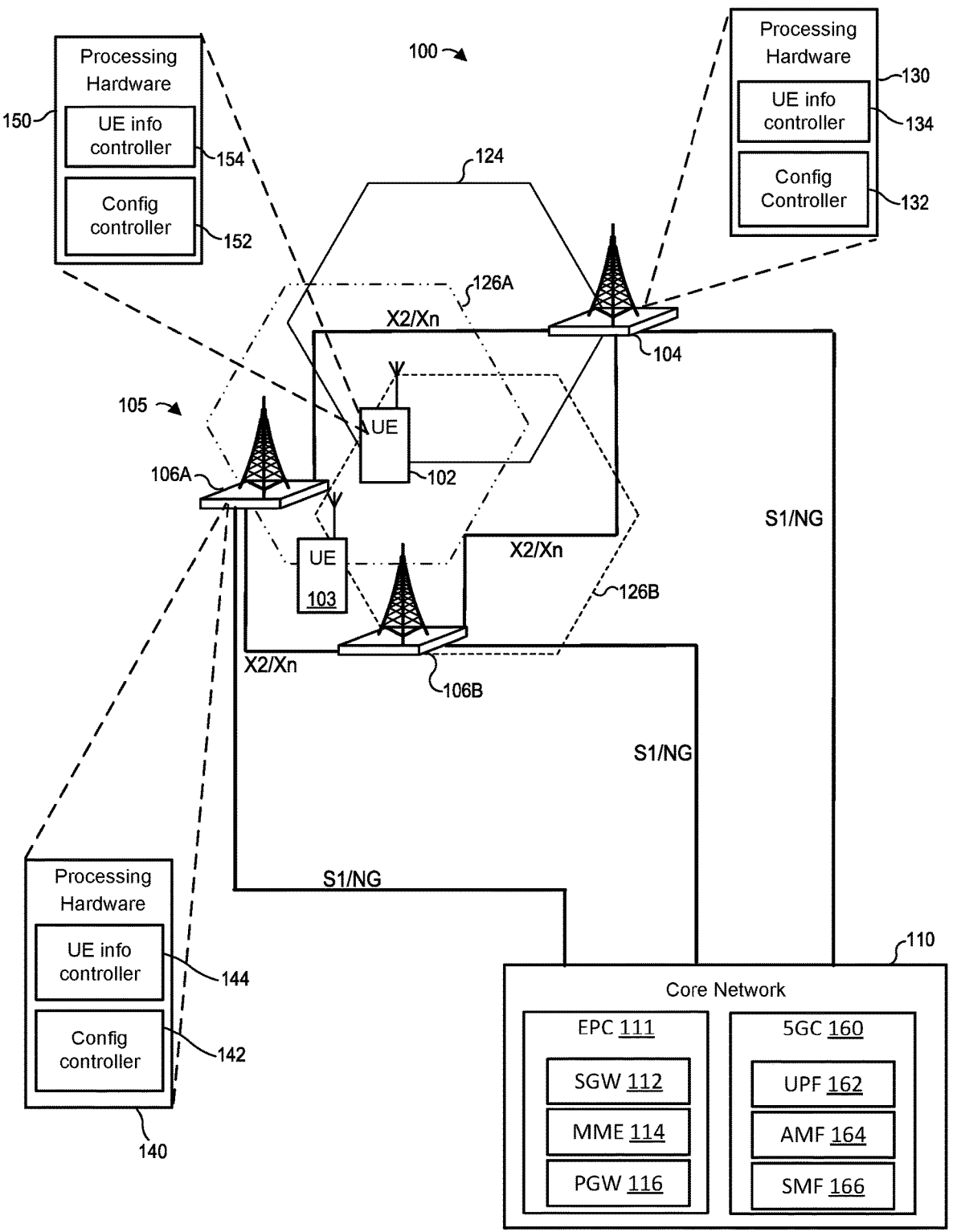
FIG. 1A is a block diagram of an example system in which a radio access network (RAN) and a user equipment (UE) can implement techniques of this disclosure for managing UE information after a conditional mobility procedure has been prepared.

FIG. 1A depicts an example wireless communication system 100 in which a UE and/or a base station can implement the techniques of this disclosure. The wireless communication system 100 includes UEs 102 and 103, as well as base stations 104, 106A, 106B that operate in a radio access network (RAN) 105 and are connected to a core network (CN) 110. The base stations 104, 106A, 106B can be any suitable type, or types, of base stations, such as an evolved node B (eNB), a next-generation eNB (ng-eNB), or a 5G Node B (gNB), for example. As a more specific example, the base station 104 may be an eNB or a gNB, and the base stations 106A, 106B may be gNBs.

The base station 104 supports a cell 124, the base station 106A supports a cell 126A, and the base station 106B supports a cell 126B. The cell 124 partially overlaps both of cells 126A and 126B, so that the UE 102 can be in range to communicate with the base station 106A while simultaneously being in range to communicate with the base station 106A and/or 106B (or in range to detect or measure the signal from both base stations 104 and 106A, etc.). The overlap may make it possible for the UE 102 to hand over between cells (e.g., from cell 124 to cell 126A or 126B) before the UE 102 experiences radio link failure, for example. Moreover, the overlap allows the various dual connectivity (DC) scenarios discussed below. For example, the UE 102 can communicate in DC with the base station 104 (operating as a master node (MN)) and the base station 106A (operating as an SN) and, upon completing an SN change, can communicate with the base station 104 (operating as an MN) and the base station 106B (operating as an SN). More particularly, when the UE 102 is in DC with the base station 104 and the base station 106A, the base station 104 operates as an MeNB, an Mng-eNB or an MgNB, and the base station 106A operates as an SgNB or a Sng-eNB.

In some implementations and scenarios where the UE 102 is in single connectivity (SC) with the base station 104 but is capable of operating in DC, the base station 104 operates as an MeNB, an Mng-eNB or an MgNB, and the base station 106A operates as a candidate SgNB (C-SgNB) or a candidate Sng-eNB (C-Sng-eNB).

In scenarios where the UE 102 hands over from the base station 104 to the base station 106B, the base stations 104 and 106B operate as the source base station (S-BS) and a target base station (T-BS), respectively. The UE 102 may operate in DC with the base station 104 and the base station 106A prior to the handover, and continue to operate in DC with the base station 104 and the base station 106A after completing the handover. As used herein, the term "MN" can be used to refer to a base station operating as an MN for a UE in DC operation, or as a base station serving the UE in SC operation. Thus, the base stations 104 and 106B in this case can be said to operate as a source MN (S-MN) and a target MN (T-MN), respectively, if the handover is immediate. When the handover is conditional, however, the base station 106B operates as a "conditional" or "candidate" T-MN, which may be referred to herein as "C-T-MN" or simply "C-MN."

Although various scenarios are described below in which the base station 104 operates as an MN and the base station 106A (or 106B) operates as an SN or C-SN, any of the base stations 104, 106A, 106B generally can operate as an MN, an SN or a C-SN in different scenarios. Thus, in some implementations, the base station 104, the base station 106A, and the base station 106B can implement similar sets of functions and each support MN, SN and C-SN operations.

In operation, the UE 102 can use a radio bearer (e.g., a data radio bearer (DRB) or a signal radio bearer (SRB)) that at different times terminates at an MN (e.g., the base station 104) or an SN (e.g., the base station 106A). The UE 102 can apply one or more security keys when communicating on the radio bearer, in the uplink (from the UE 102 to a base station) and/or downlink (from a base station to the UE 102) direction.

The base station 104 includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1A includes a configuration controller 132 that is configured to manage or control configuration techniques in support of immediate and conditional mobility procedures. For example, the configuration controller 132 may support radio resource control (RRC) messaging associated with immediate and conditional handover procedures, and/or support RRC messaging associated with immediate and conditional addition/change operations when the base station 104 operates as an MN relative to an SN. Moreover, in some implementations and/or scenarios, the configuration controller 132 may be responsible for maintaining (for the UE 102 and a number of other UEs) current sets of conditional configurations for conditional mobility procedures. The processing hardware 130 in the example implementation of FIG. 1A also includes a UE information controller 134 that is configured to manage or control the techniques of this disclosure relating to management of UE information. For example, the UE information controller 134 may support RRC messaging associated with UE information procedures, and/or support operations that the base station 104 performs based on UE information when the base station 104 operates as an MN relative to an SN. "UE information" broadly refers to information that a UE provides to a base station of a RAN while the UE is in a connected state with the base station, with the UE information indicating preferences and/or circumstances of the UE (e.g., a configuration preferred by a UE, coexisting communication systems that a UE is using, desires to use, or may use, etc.). Some specific examples of UE information are discussed below.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1 includes a configuration controller 142 that is configured to manage or control RRC procedures and RRC configurations. For example, the configuration controller 142 may support RRC messaging associated with immediate and conditional handover procedures, and/or support RRC messaging associated with immediate and conditional addition/change operations when the base station 106A operates as an SN or candidate SN (C-SN). Moreover, in some implementations and/or scenarios, the configuration controller 142 may be responsible for maintaining (for the UE 102 and a number of other UEs) current sets of conditional configurations for conditional mobility procedures. The processing hardware 140 in the example implementation of FIG. 1 includes a UE information controller 144 that is configured to manage or control the techniques of this disclosure relating to management of UE information. For example, the UE information controller 144 may support RRC messaging associated with UE information procedures, and/or support operations that the base station 106A performs based on UE information when the base station 106A operates as an SN or candidate SN (C-SN). While not shown in FIG. 1A, the base station 106B may include processing hardware similar to the processing hardware 140 of the base station 106A. Moreover, while this disclosure describes different operations for the base stations 104, 106A, 106B to reflect their different, scenario-specific operations (e.g., when the base station 104 is an MN, the base station 106A is a C-SN, and the base station 106B is an SN), the processing hardware of the base stations 104, 106A, 106B may all include controllers with similar capabilities/ functionality.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a configuration controller 152 that is configured to manage or control RRC procedures and RRC configurations related to configurations for mobility procedures, including conditional mobility procedures. For example, the configuration controller 152 may support RRC messaging associated with immediate and conditional handover and/or secondary node addition/change procedures, and may also be responsible for maintaining a current set of conditional configurations for the UE 102 (e.g., adding, releasing, or modifying conditional configurations as needed) in accordance with any of the implementations discussed below. The processing hardware 150 in the example implementation of FIG. 1A also includes a UE information controller 154 that is configured to manage or control the UE information techniques of this disclosure. For example, the UE information controller 144 may support RRC messaging associated with the UE information procedures discussed herein.

The CN 110 may be an evolved packet core (EPC) 111 or a fifth-generation core (5GC) 160, both of which are depicted in FIG. 1A. Each of the base stations 104, 106B may be an eNB supporting an Si interface for communicating with the EPC 111, an ng-eNB supporting an NG interface for communicating with the 5GC 160, or a gNB that supports the NR radio interface as well as an NG interface for communicating with the 5GC 160, as shown in FIG. 1A. The base station 106A may be an EUTRA-NR DC (EN-DC) gNB (en-gNB) with an Si interface to the EPC 111, an en-gNB that does not connect to the EPC 111, a gNB that supports the NR radio interface as well as an NG interface to the 5GC 160, or an ng-eNB that supports an EUTRA radio interface as well as an NG interface to the 5GC 160. To directly exchange messages with each other during the various scenarios discussed below, the base stations 104, 106A, 106B may support an X2 or Xn interface, as shown in FIG. 1A.

Among other components, the EPC 111 can include a Serving Gateway (SGW) 112, a Mobility Management Entity (MME) 114, and a Packet Data Network Gateway (PGW) 116. The SGW 112 is generally configured to transfer user-plane packets related to audio calls, video calls, Internet traffic, etc., and the MME 114 is generally configured to manage authentication, registration, paging, and other related functions. The PGW 116 is generally configured to provide connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management Function (AMF) 164, and/or a Session Management Function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

Generally, the wireless communication system 100 may include any suitable number of base stations supporting NR cells and/or EUTRA cells. More particularly, the EPC 111 or the 5GC 160 can be connected to any suitable number of base stations supporting NR cells and/or EUTRA cells. For example, the wireless communication system 100 includes at least one additional base station in immediate and conditional handover scenarios discussed below with reference to FIG. 1B. Although the examples below refer specifically to specific CN types (EPC, 5GC) and specific radio access technology (RAT) types (5G NR and EUTRA), in general the techniques of this disclosure can also apply to other suitable radio access and/or core network technologies, such as sixth generation (6G) radio access, and/or 6G core network or 5G NR-6G DC, for example.

The UE information referred to above may include, for example, a UEAssistanceInformation message containing a preferred configuration, which the UE 102 sends to a base station (e.g., the base station 104). By transmitting the preferred configuration, the UE 102 can suggest that the receiving base station (or more generally, the RAN 105) take actions such as temporarily disabling DC, or adjusting parameters such as one or more minimum scheduling offsets (e.g., K0 and/or K2), the discontinuous (DRX) configuration, the number of SCells, the number of MIMO layers, and/or the aggregated bandwidth in use during the connected state (e.g., to reduce power, or to accommodate heavy application processing or high ambient temperature). For example, if the UE 102 and the receiving base station are configured to communicate over a maximum number of SCells, a maximum number of MIMO layers, and/or a maximum aggregated bandwidth, the UE 102 can suggest that the receiving base station reduce the maximum number of SCells, the maximum number of MIMO layers, and/or the maximum aggregated bandwidth, by sending a preferred configuration to the MN that indicates a preferred maximum number of SCells, a preferred maximum number of MIMO layers, and/or a preferred maximum aggregated bandwidth, respectively. Thus, a preferred configuration may be indicative of a maximum allocation preferred by the UE for one or more resources. Further, in scenarios in which the UE 102 is in DC with an MN (e.g., base station 104) and an SN (e.g., base station 106B), the UE 102 may send a preferred configuration indicating, specifically for the SN, a preferred maximum number of SCells, a preferred maximum number of MIMO layers, and/or a preferred maximum aggregated bandwidth.

In another example, the UE 102 may send a base station in-device coexistence (IDC) assistance information in a UEAssistanceInformation message or an InDeviceCoex-Indication message while the UE 102 is in a connected state. In the IDC assistance information, the UE 102 can include a list of carrier frequencies affected by an IDC problem, a list of carrier frequency combinations that are affected by an IDC problem (due to inter-modulation distortion and harmonics caused by EUTRA or NR when configured with uplink (UL) carrier aggregation (CA)), or a list of "victim" system type(s) that are subject to IDC interference from EUTRA or NR when configured with UL CA. Victim system type(s) can include, for example, a type of GNSS (e.g., GPS, GLONASS, BDS, Galileo, or NavIC), a wireless local area network (WLAN), and/or Bluetooth. The UEAssistanceIn-formation message and InDeviceCoexIndication messages are described in 3GPP TS 38.331 or 36.331. The IDC assistance information can include one or more information elements (IE(s)) in an IDC-Assistance-r16 information element (IE) as specified in 3GPP TS 38.331 v16.2.0 or an InDeviceCoexIndication-r11-IEs IE as specified in 3GPP TS 36.331 v16.2.0, for example.

In another example, the UE 102 may send a base station sidelink information in a UEAssistanceInformation mes-sage, a SidelinkUEInformation message, or a SidelinkUE-InformationNR message while the UE 102 is in a connected state. The UEAssistanceInformation, SidelinkUEInforma-tion, and SidelinkUEInformationNR messages are described in 3GPP TS 38.331 or 36.331. The sidelink information can be one or more IEs included in an SL-UE-AssistanceInfor-mationNR IE or SidelinkUEInformationNR-r16-IEs IE as specified in 3GPP TS 38.331 v16.2.0, for example. As another example, the sidelink information can be one or more IEs included in a TrafficPatternInfoList-v1530 IE or SidelinkUEInformation-r12-IEs IE as specified in 3GPP TS 36.331 v16.2.0.

In yet another example, if the UE 102 is receiving or otherwise interested in receiving a multicast and/or broad-cast service (MBS), the UE 102 can transmit an indication of MBS interest to a base station. Based on the MBS interest indication, the RAN 105 can attempt to enable the UE 102 to receive MBS (and possibly unicast) services, subject to the capabilities of the UE 102. In the MBS interest indica-tion, the UE 102 can indicate a set of one or more frequen-cies on which the UE 102 is receiving, or is interested in receiving, MBS. The MBS interest indication may also indicate a list of MBSs that the UE 102 is receiving, or is interested in receiving, on the indicated frequency or fre-quencies. The UE 102 may transmit the MBS interest indication regardless of whether the serving cell supports MBS. In some scenarios, the UE 102 sends a first MBS interest indication to the network, and sends a second, updated MBS interest indication at a later time. In some implementations, a UE 102 in a connected state can send the base station MBS interest information within an MBMSIn-terestIndication message or an MBSInterestIndication mes-sage. The MBMSInterestIndication and MBSInterestIndica-tion messages are described in 3GPP TS 36.331 or 38.331. The MBS interest information can be one or more IEs included in an MBMSInterestIndication-r11-IEs IE as speci-fied in 3GPP TS 36.331 v16.2.0, for example.

As indicated above, the wireless communication system 100 may support various mobility procedures (e.g., imme-diate or conditional handover, SN addition, etc.) and modes of operation (e.g., SC or DC). Example operation of various procedures that may be implemented in the wireless com-munication system 100 will now be described.

In some implementations, the wireless communication system 100 supports immediate handovers between cells. In one scenario, for example, the UE 102 initially connects to the base station 104, and the base station 104 later performs preparation for an immediate handover with the base station 106A via an interface (e.g., X2 or Xn). In this scenario, the base stations 104 and 106A operate as a source base station and a target base station, respectively. In the handover preparation, the source base station 104 sends a Handover Request message to the target base station 106A. In response, the target base station 106A includes an immediate handover command message in a Handover Request Acknowledge message, and sends the Handover Request Acknowledge message to the source base station 104. The source base station 104 then transmits a handover command message to the UE 102 in response to receiving the Han-dover Request Acknowledge message.

Upon receiving the immediate handover command mes-sage, the UE 102 immediately reacts to the immediate handover command, by attempting to connect to the target base station 106A. To connect to the target base station 106A, the UE 102 may perform a random access procedure with the target base station 106A, and then (after gaining access to a channel) transmit a handover complete message to the target base station 106A via a cell (e.g., cell 126A) of the base station 106A (i.e., in response to the immediate handover command).

In some implementations, the wireless communication system 100 also supports conditional handovers. In one scenario, for example, the UE 102 initially connects to the base station 104, and the base station 104 later performs a first conditional handover preparation procedure with the base station 106A via an interface (e.g., X2 or Xn) to prepare for a potential handover of the UE 102 to the base station 106A. In this scenario, the base stations 104 and 106A operate a source base station and a candidate base station, respectively. In the first conditional handover preparation procedure, the source base station 104 sends a Handover Request message to the candidate base station 106A. In response, the candidate base station 106A includes a first conditional handover command message in a Handover Request Acknowledge message, and sends the Handover Request Acknowledge message to the source base station 104. The source base station 104 then transmits the first conditional handover command message to the UE 102, in response to receiving the Handover Request Acknowledge message.

Upon receiving the first conditional handover command message, the UE 102 does not immediately react to the message by attempting to connect to the candidate base station 106A. Instead, the UE 102 connects to the candidate base station 106A according to the first conditional handover command message only if the UE 102 determines that a first condition is satisfied for handing over to a candidate cell 126A of the candidate base station 106A. The base station 106A provides a configuration for the candidate cell 126A (i.e., a configuration that the UE 102 can use to connect with the base station 106A via the candidate cell 126A) in the first conditional handover command message.

Before the first condition is met, the UE 102 has not yet connected to the candidate base station 106A. In other words, the candidate base station 106A has not yet con-nected and served the UE 102. In some implementations, the first condition can be that a signal strength/quality, as measured by the UE 102 on the candidate cell 126A of the candidate base station 106A, is "good" enough, and/or a signal strength/quality, as measured by the UE 102 on the cell 124 of the source base station 104, is poor. For example, the first condition may be satisfied if one or more measurement results obtained by the UE 102 (when performing measurements on the candidate cell 126A) exceed a threshold that is configured by the source base station 104, which could be a pre-determined or pre-configured threshold, and/or if one or more measurement results obtained by the UE 102 (when performing measurements on the candidate cell 124) exceed a threshold that is configured by the source base station 104, which could be a pre-determined or pre-configured threshold. In some implementations, the first condition can be that a signal strength/quality, as measured by the UE 102 on the candidate cell 126A is better than a signal strength/quality, as measured by the UE 102 on the cell 124, by at least some threshold value (e.g., at least an offset). The threshold value can be configured by the source base station 104 or a pre-determined or pre-configured offset. If the UE 102 determines that the first condition is satisfied, the candidate base station 106A becomes the target base station 106A for the UE 102, and the UE 102 attempts to connect to the target base station 106A. To connect to the target base station 106A, the UE 102 may perform a random access procedure with the target base station 106A, and then (after gaining access to a channel) transmit a first handover complete message via the candidate cell 126A to the target base station 106A. After the UE 102 successfully completes the random access procedure and/or transmits the first handover complete message, the target base station 106A becomes the source base station 106A for the UE 102, and the UE 102 starts communicating data with the source base station 106A.

In some implementations and/or scenarios, conditional handovers can occur with more than one candidate cell supported by the candidate base station 106A (e.g., cell 126A and another cell of base station 106A not shown in FIG. 1A). In one such scenario, the base station 106A may provide a configuration of an additional candidate cell of the base station 106A, in addition to a configuration of the candidate cell 126A, in the first conditional handover command message. The UE 102 may then monitor whether a second condition is met for the additional candidate cell of the candidate base station 106A, while also monitoring whether the first condition is met for the candidate cell 126A. The second condition can be the same as or different from the first condition.

In another scenario, the base station 104 performs a second conditional handover preparation procedure with the base station 106A via the interface (e.g., X2 or Xn), to prepare a potential handover of the UE 102 to the base station 106A, in a procedure similar to that described above. In this scenario, however, the base station 104 also transmits to the UE 102 a second conditional handover command message that the base station 104 received from the candidate base station 106A, for a potential handover to an additional candidate cell (not shown in FIG. 1A) of the base station 106A. The base station 106A may provide a configuration of the additional candidate cell in the second conditional handover command message. The UE 102 may then monitor whether a second condition is met for the additional candidate cell of the candidate base station 106A. The second condition can be the same as or different from the first condition.

The base station 104 may also perform a third conditional handover preparation procedure with the base station 106B via an interface (e.g., X2 or Xn), to prepare a potential handover of the UE 102 to the base station 106B, in a procedure similar to that described above. For example, in this scenario, the base station 104 may transmit to the UE 102 a third conditional handover command message, which the base station 104 received from the candidate base station 106B for a potential handover to the cell 126B the candidate base station 106B. The base station 106B may provide a configuration of the candidate cell 126B in the third handover command message. The UE 102 may then monitor whether a third condition is met for the candidate cell 126B. The third condition can be the same as or different from the first and/or second conditions. The conditional handover command messages above may be RRC reconfiguration messages, or may be conditional handover configurations that are information elements (IEs).

In some implementations, the wireless communication system 100 supports DC operation, including SN addition and SN change procedures. In one scenario, for example, after the UE 102 connects to the base station 104, the base station 104 can perform an immediate SN addition procedure to add the base station 106A as a secondary node, thereby configuring the UE 102 to operate in DC with the base stations 104 and 106A. At this point, the base stations 104 and 106A operate as an MN and an SN, respectively. Later, while the UE 102 is still in DC with the MN 104 and the SN 106A, the MN 104 may perform an immediate SN change procedure to change the SN of the UE 102 from the base station 106A (which may be referred to as the source SN or S-SN) to the base station 106B (which may be referred to as the target SN or T-SN).

In other scenarios, the base station 104 may perform a conditional SN addition procedure to configure the base station 106B as a candidate SN (C-SN) for the UE 102, while the UE 102 is in single connectivity (SC) with the base station 104, or while the UE 102 is in DC with the base stations 104 and 106A, and before the UE 102 has connected to the C-SN 106B. In this case, the base stations 104 and 106B operate as an MN and a C-SN, respectively, for the UE 102. When the UE 102 receives the configuration for the C-SN 106B, the UE 102 does not connect to the C-SN 106B unless and until the UE 102 detects that the corresponding condition is satisfied. If the UE 102 determines that the condition is satisfied, the UE 102 connects to the C-SN 106B, such that the C-SN 106B becomes the SN 106B for the UE 102.

In some implementations, the condition can be that a signal strength/quality, as measured by the UE 102 on a candidate primary secondary cell (C-PSCell) of the C-SN 106B (e.g., cell 126B), is "good" enough, and/or a signal strength/quality, as measured by the UE 102 on a PSCell 126A of the SN 106A, is poor (if the UE 102 is DC with the MN 104 and the SN 106A). For example, the condition may be satisfied if one or more measurement results obtained by the UE 102 (when performing measurements on the C-PSCell) exceed a threshold that is configured by the MN 104, or above a pre-determined or pre-configured threshold, and/or if one or more measurement results obtained by the UE 102 (when performing measurements on the C-PSCell 126A) exceed a threshold that is configured by the MN 104 or SN 106A, which can be a pre-determined or pre-configured threshold. In other implementations, if the UE 102 is in DC with the MN 104 and the SN 106A, the condition can be that a signal strength/quality, as measured by the UE 102 on the C-PSCell 126B is exceeds a signal strength/quality, as measured by the UE 102 on the PSCell 126A, by at least some threshold value (e.g., at least some offset). The threshold can be configured by the MN 104 or SN 106A, or can be a pre-determined or pre-configured offset, for example. If the UE 102 determines that condition is satisfied, the UE 102 may perform a random access procedure with the C-SN 106B to connect to the C-SN 106B. After the UE 102 successfully completes the random access procedure, the base station 106B becomes an SN for the UE 102, and the C-PSCell (e.g., cell 126B) becomes a PSCell for the UE 102. The SN 106B may then start communicating data with the UE 102.

Yet another scenario relates to a conditional PSCell change. In this scenario, the UE 102 is initially in DC with the MN 104 (via a primary cell (PCell)) and the SN 106A (via a PSCell, not shown in FIG. 1, that is different than cell 126A). The SN 106A can provide a configuration for the C-PSCell 126A, for the UE 102. If the UE 102 is configured with an SRB that permits the exchange of RRC messages with the SN 106A (e.g., SRB3), the SN 106A may transmit the configuration for the C-PSCell 126A to the UE 102 directly via the SRB, or via the MN 104. In some implementations, the SN 106A may transmit an RRC reconfiguration message including the configuration via the SRB to the UE 102. If the UE 102 has not been configured with the SRB, or if the SN 106A determines to transmit the configuration via the MN 104, the SN 106A may transmit the configuration for the C-PSCell 126A to the UE 102 via the MN 104. In some implementations, the SN 106A may send the RRC reconfiguration message to the MN 104 and in turn, the MN 104 transmits the RRC reconfiguration message to the UE 102. The SN 106A may transmit the configuration in response to one or more measurement results received from the UE 102 via the SRB, or in response to one or more measurement results obtained by the SN 106A from measurements on signals received from the UE 102, for example.

In contrast to the immediate PSCell change case discussed above, in a conditional procedure, the UE 102 does not immediately disconnect from the PSCell and attempt to connect to the C-PSCell 126A after receiving the configuration for the C-PSCell 126A. Instead, the UE 102 does not connect to the C-PSCell 126A until the UE 102 determines that a certain condition is satisfied. When the UE 102 determines that the condition has been satisfied, the UE 102 connects to the C-PSCell 126A, such that the C-PSCell 126A begins to operate as the PSCell 126A for the UE 102. In some implementations, the UE 102 disconnects from the current PSCell in order to connect to the C-PSCell 126A.

In some scenarios, the condition associated with conditional SN addition or conditional PSCell change can be that signal strength/quality, as measured by the UE 102 on the C-PSCell 126A of the (C-)SN 106A, exceeds a certain threshold or otherwise corresponds to an acceptable measurement, and/or a signal strength/quality, as measured by the UE 102 on the current PSCell of the SN 106A, is poor. For example, when the one or more measurement results that the UE 102 obtains on the C-PSCell 126A are above a threshold configured by the MN 104 or the (C-)SN 106A, or above a pre-determined or pre-configured threshold, the UE 102 may determine that the condition is satisfied. In other implementations, if the UE 102 is in DC with the MN 104 and the SN 106A, the condition can be that a signal strength/quality, as measured by the UE 102 on the C-PSCell 126A exceeds a signal strength/quality, as measured by the UE 102 on the current PSCell, by at least some threshold value (e.g., at least some offset). The threshold value can be configured by the SN 106A, or a pre-determined or pre-configured offset, for example. When the UE 102 determines that such a condition is satisfied, the UE 102 can perform a random access procedure on the C-PSCell 126A and with the C-SN 106A to connect to the C-SN 106A. After the UE 102 successfully completes the random access procedure on the C-PSCell 126A, the C-PSCell 126A becomes a PSCell 126A for the UE 102. The C-SN 106A can then start communicating data (user-plane data and/or control-plane data) with the UE 102 through the PSCell 126A.

In different implementations and/or scenarios of the wireless communication system 100, the base station 104 may operate as a master eNB (MeNB) or a master gNB (MgNB), and the base station 106A or 106B can be implemented as a secondary gNB (SgNB) or a candidate SgNB (C-SgNB). The UE 102 may communicate with the base station 104 and the base station 106A or 106B via the same RAT, such as EUTRA or NR, or via different RATs. If the base station 104 is an MeNB and the base station 106A is an SgNB, the UE 102 may be in EN-DC with the MeNB and the SgNB. In this scenario, the MeNB 104 may or may not configure the base station 106B as a C-SgNB to the UE 102. When the base station 104 is an MeNB and the base station 106A is a C-SgNB for the UE 102, the UE 102 may be in SC with the MeNB. In this scenario, the MeNB 104 may or may not configure the base station 106B as another C-SgNB to the UE 102.

In some cases, an MeNB, an SeNB or a C-SgNB may be implemented as an ng-eNB rather than an eNB. When the base station 104 is a master ng-eNB (Mng-eNB) and the base station 106A is a SgNB, the UE 102 may be in next generation (NG) EUTRA-NR DC (NGEN-DC) with the Mng-eNB and the SgNB. In this scenario, the MeNB 104 may or may not configure the base station 106B as a C-SgNB to the UE 102. When the base station 104 is an Mng-NB and the base station 106A is a C-SgNB for the UE 102, the UE 102 may be in SC with the Mng-NB. In this scenario, the Mng-eNB 104 may or may not configure the base station 106B as another C-SgNB to the UE 102.

When the base station 104 is an MgNB and the base station 106A is an SgNB, the UE 102 may be in NR-NR DC (NR-DC) with the MgNB and the SgNB. In this scenario, the MeNB 104 may or may not configure the base station 106B as a C-SgNB to the UE 102. When the base station 104 is an MgNB and the base station 106A is a C-SgNB for the UE 102, the UE 102 may be in SC with the MgNB. In this scenario, the MgNB 104 may or may not configure the base station 106B as another C-SgNB to the UE 102.

When the base station 104 is an MgNB and the base station 106A is a secondary ng-eNB (Sng-eNB), the UE 102 may be in NR-EUTRA DC (NE-DC) with the MgNB and the Sng-eNB. In this scenario, the MgNB 104 may or may not configure the base station 106B as a C-Sng-eNB to the UE 102. When the base station 104 is an MgNB and the base station 106A is a candidate Sng-eNB (C-Sng-eNB) for the UE 102, the UE 102 may be in SC with the MgNB. In this scenario, the MgNB 104 may or may not configure the base station 106B as another C-Sng-eNB to the UE 102.

Figure 1B:
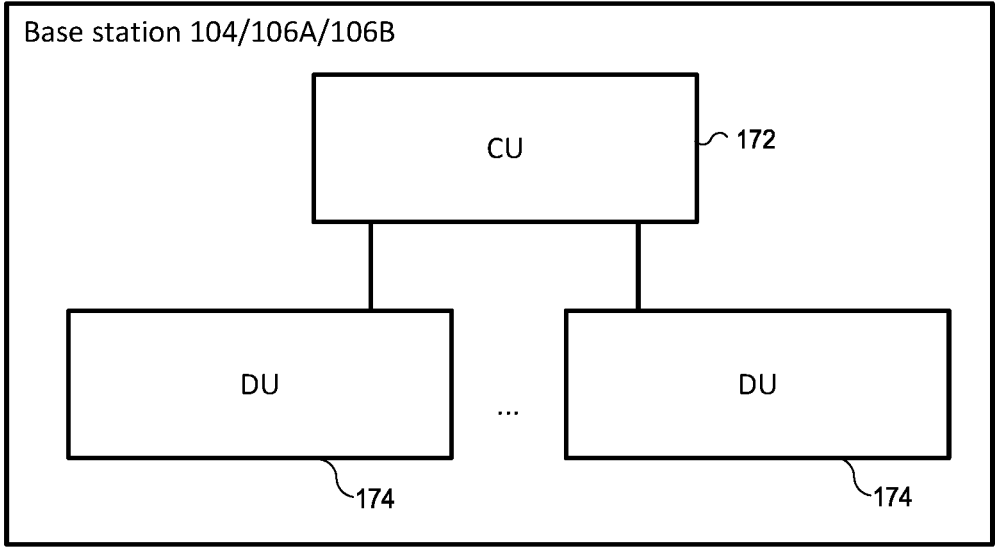
FIG. 1B is a block diagram of an example base station in which a centralized unit (CU) and distributed units (DUs) can operate in the system of FIG. 1A or FIG. 1B.

FIG. 1B depicts an example distributed implementation of a base station, such as the base station 104, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware of the CU 172 may include an RRC controller configured to manage or control one or more RRC configurations and/or RRC procedures when the base station operates as an MN, SN, or C-SN, for example.

The DU 174 is likewise equipped with processing hardware that can include one or more general-purpose processors such as CPUs and non-transitory computer-readable memory storing machine-readable instructions executable on the one or more general-purpose processors, and/or special-purpose processing units. In some implementations, the processing hardware includes a medium access control (MAC) controller configured to manage or control one or more MAC operations or procedures (e.g., a random access procedure) and a radio link control (RLC) controller configured to manage or control one or more RLC operations or procedures when the base station operates as an MN, SN, or C-SN. The processing hardware may also include a physical layer (PHY) controller configured to manage or control one or more physical layer operations or procedures.

Figure 2A:
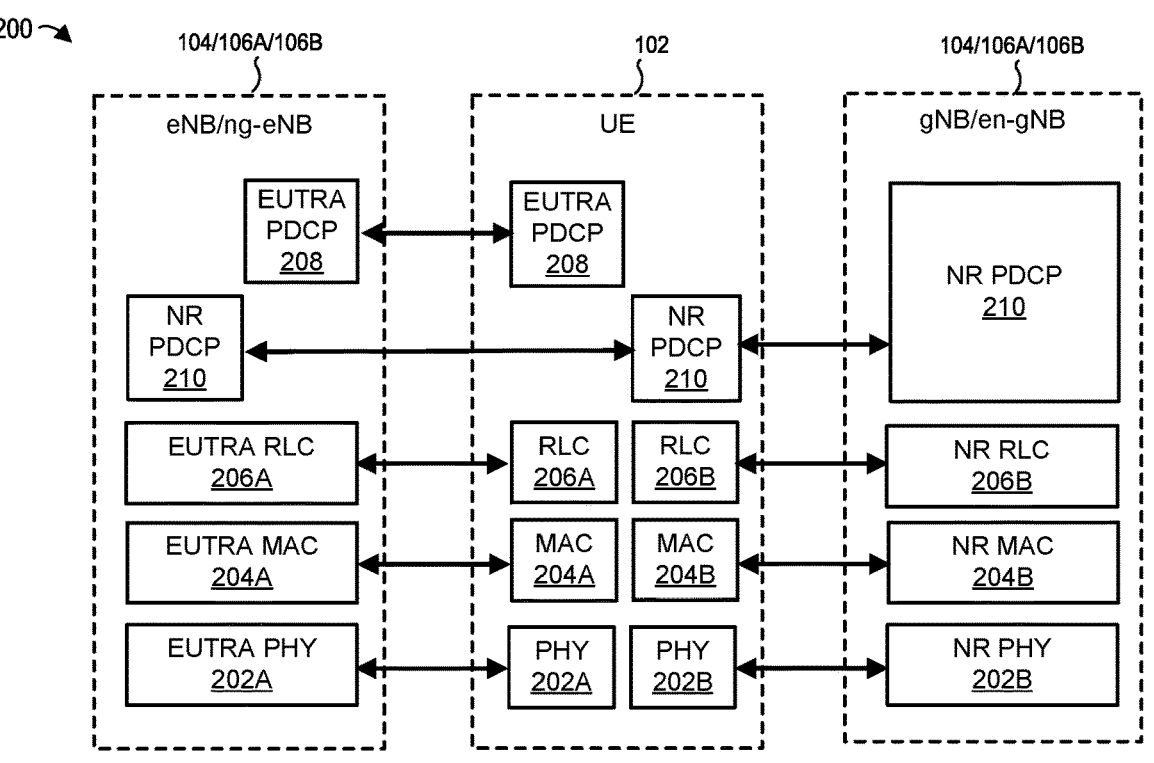
FIG. 2A is a block diagram of an example protocol stack according to which a UE of FIG. 1A can communicate with the base stations of FIG. 1A.

Next, FIG. 2A illustrates in a simplified manner an example radio protocol stack 200 according to which the UE 102 can communicate with an eNB/ng-eNB or a gNB. Each of the base stations 104, 106A, or 106B can be the eNB/ng-eNB or the gNB depending on the implementation and scenario.

The PHY 202A of EUTRA provides transport channels to the EUTRA MAC sublayer 204A, which in turn provides logical channels to the EUTRA RLC sublayer 206A. The EUTRA RLC sublayer 206A in turn provides RLC channels to an EUTRA PDCP sublayer 208 and, in some cases, to an NR PDCP sublayer 210. Similarly, a PHY 202B of NR provides transport channels to an NR MAC sublayer 204B, which in turn provides logical channels to an NR RLC sublayer 206B. The NR RLC sublayer 206B in turn provides RLC channels to an NR PDCP sublayer 210. The UE 102 in some implementations supports both the EUTRA and the NR stack, to support handover between EUTRA and NR base stations, and/or to support DC over EUTRA and NR interfaces. Further, as illustrated in FIG. 2A, the UE 102 can support layering of the NR PDCP 210 sublayer over EUTRA RLC sublayer 206A.

The EUTRA PDCP sublayer 208 and the NR PDCP sublayer 210 receive packets (e.g., from an IP layer not shown in FIG. 2A and layered directly or indirectly over the PDCP layer 208 or 210), which can be referred to as service data units (SDUs), and output packets (e.g., to the RLC sublayer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange RRC messages, for example. On a user plane, the EUTRA PDCP sublayer 208 and the NR PDCP sublayer 210 provide DRBs to support data exchange.

When the UE 102 operates in EN-DC, with the base station 104 operating as an MeNB and the base station 106A operating as an SgNB, the RAN 105 can provide the UE 102 with an MN-terminated bearer that uses the EUTRA PDCP sublayer 208 or an MN-terminated bearer that uses the NR PDCP sublayer 210. The RAN 105 in various scenarios can also provide the UE 102 with an SN-terminated bearer, which uses only the NR PDCP sublayer 210. The MN-terminated bearer can be an MCG bearer, a split bearer, or a MN-terminated SCG bearer, the SN-terminated bearer can be an SCG bearer, a split bearer, or a SN-terminated MCG bearer, and the MN-terminated bearer can be an SRB (e.g., SRB1 or SRB2) or a DRB. The SN-terminated bearer can an SRB or a DRB.

Figure 2B:
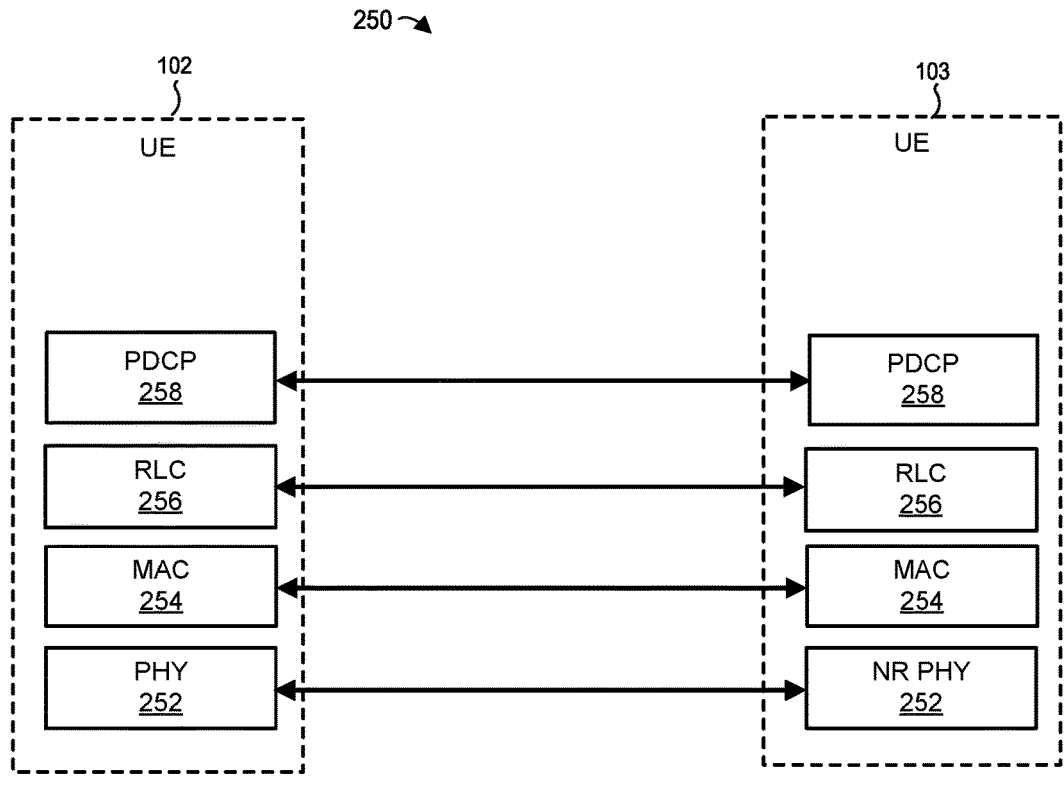
FIG. 2B is a block diagram of an example protocol stack according to which two UEs of FIG. 1A can communicate with each other via a sidelink.

FIG. 2B illustrates, in a simplified manner, an example protocol stack 250 for sidelink communication between the UE 102 and the UE 103. In the example stack 250, a PHY sublayer 252 provides transport channels to a MAC sublayer 254, which in turn provides logical channels to an RLC sublayer 256. The RLC sublayer 256 in turn provides RLC channels to a PDCP sublayer 258. In some implementations, the example stack 250 complies with EUTRA or NR.

The PDCP sublayer 258 receives packets (e.g., from an IP layer, not shown in FIG. 2B, that is layered directly or indirectly over the PDCP sublayer 258) that can be referred to as SDUs, and outputs packets (e.g., to the RLC sublayer 256) that can be referred to as PDUs. As noted above, except where the difference between SDUs and PDUs is relevant, this disclosure for simplicity refers to both SDUs and PDUs as "packets." On a control plane, the PDCP sublayer 258 can provide one or more sidelink SRBs to exchange RRC messages between the UEs 102 and 103, for example. On a user plane, the PDCP sublayer 258 can provide one or more sidelink DRBs to support data exchange between the UEs 102 and 103.

Next, several example scenarios in which a base station initiates a conditional handover procedure are discussed (with reference to FIGS. 3A through 4D), followed by a discussion of example scenarios in which a base station initiates a conditional PSCell addition or change procedure (with reference to FIGS. 5A through 5H).

Figure 3A:
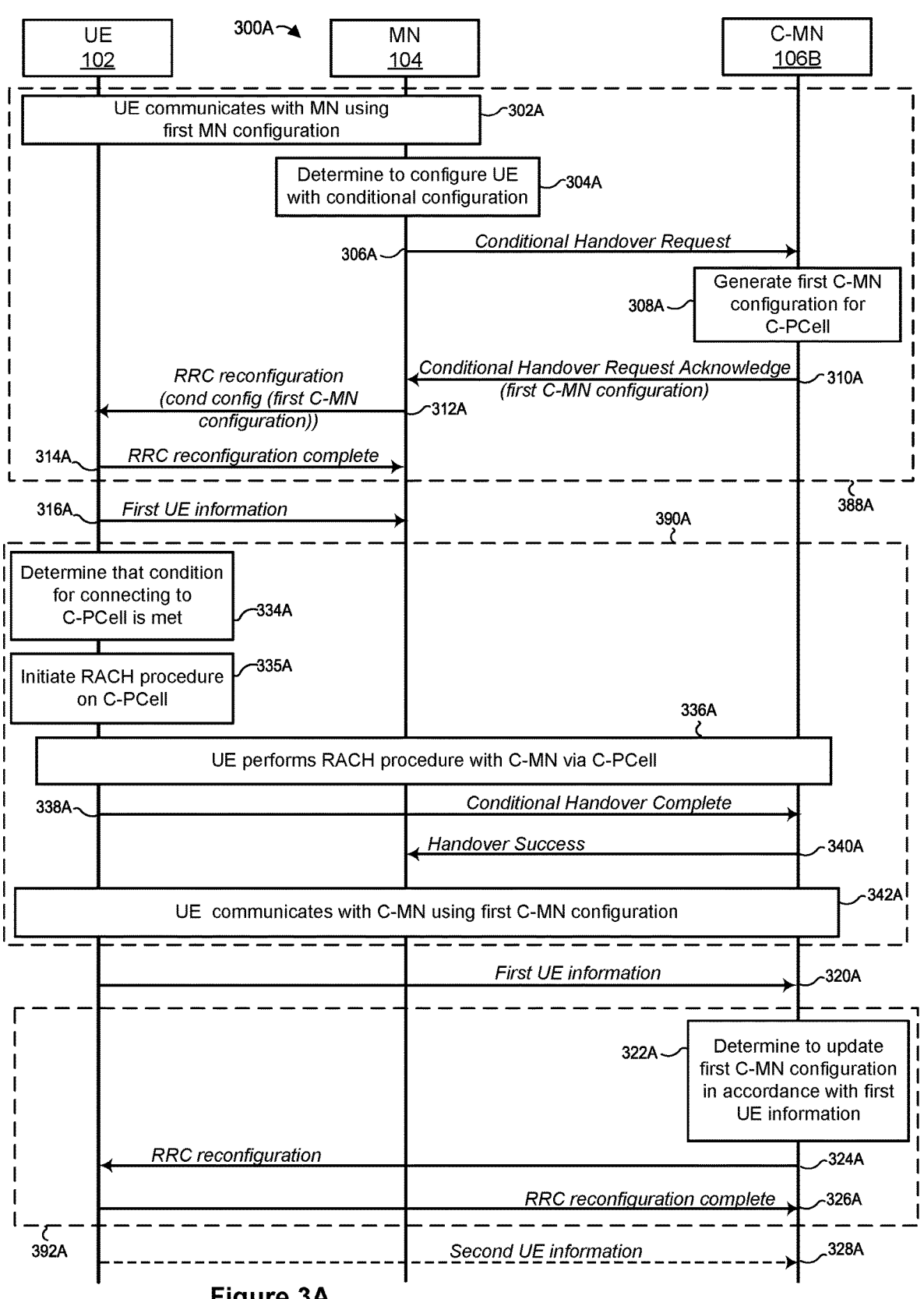
FIGS. 3A through 3D are example message sequences corresponding to scenarios in which the RAN prepares a conditional handover procedure for a UE from one base station to another.

Referring first to FIG. 3A, a scenario 300A involves a conditional handover procedure. In the scenario 300A, the base station 104 operates as a source base station (MN), and the base station 106B operates as a candidate base station (C-MN) for the conditional handover. Initially, the UE 102 communicates 302A with the MN 104 in accordance with a first MN configuration. The UE 102 may be in SC with the MN 104, or in DC with the MN 104 and SN 106A, for example. The MN 104 then determines 304A to configure the UE 102 with a conditional configuration. The MN 104 can make the determination 304A based on one or more measurement results that the MN 104 received from the UE 102 directly (e.g., via an SRB established between the UE 102 and the MN 104 or via a physical control channel), based on one or more measurement results that the MN 104 obtains from measurements of signals received from the UE 102 on data or control channels, or based on some other suitable event. In response to the determination 304A, the MN 104 sends 306A a Conditional Handover Request message to the C-MN 106B.

In response to the Conditional Handover Request message, the C-MN 106B generates 308A a first C-MN configuration. The first C-MN configuration is a configuration for a candidate PCell (C-PCell) 126B of the C-MN 106B. The C-MN 106B then sends 310A a Conditional Handover Request Acknowledge message that includes the first C-MN configuration to the MN 104. The MN 104 then includes the first C-MN configuration in a conditional configuration, and sends 312A an RRC reconfiguration message that includes the conditional configuration to the UE 102. The UE 102 may then send 314A an RRC reconfiguration complete message to the MN 104 in response to the RRC reconfiguration message. Events 302A, 304A, 306A, 308A, 310A, 312A and 314A are collectively referred to herein as conditional handover (CHO) configuration procedure 388A.

In some implementations, the Conditional Handover Request message at event 306A can be a Handover Request message as defined in 3GPP TS 36.423 or TS 38.423, and the MN 104 may include a conditional handover request indication in the Handover Request message. In some implementations, the MN 104 may include the first MN configuration in the Handover Request message. In other implementations, the MN 104 does not include the first MN configuration in the Handover Request message.

Later, but before the UE 102 determines that the condition associated with the conditional configuration has been satisfied, the UE 102 sends 316A first UE information to the MN 104. In the first UE information, the UE 102 can include preferred configurations, IDC assistance information, sidelink information, or MBS interest information, for example. In some implementations, the UE 102 sends 316A an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331.

In some implementations and scenarios, the UE 102 sends 316A the first UE information to the MN 104 due to an event taking place, such as, for example: (1) the UE 102 deciding to save power (e.g., the UE 102 being in or desiring to enter a power saving mode); (2) heavy application processing by the UE 102; (3) high ambient temperature (i.e., the UE 102 experiencing overheating); (4) the UE 102 not requiring power saving (e.g., the UE 102 not being in or deciding to exit a power saving mode); (5) a low ambient temperature (e.g., the UE 102 no longer experiencing overheating); (6) the UE 102 engaging in sidelink communication with another UE; (7) the UE 102 releasing sidelink communication with another UE; (8) the UE 102 experiencing an IDC problem; (9) the UE 102 no longer experiencing an IDC problem; (10) the UE 102 deciding that an MBS is of interest; or (11) the UE 102 deciding that an MBS is no longer of interest.

In other implementations and scenarios, the UE 102 sends 316A the first UE information to the MN 104 in response to the UE 102 determining that a particular, threshold-based condition is satisfied. This condition may be, for example: (1) battery power capacity at the UE 102 being lower than or equal to a first power threshold; (2) the battery power capacity being higher than or equal to a second power threshold that is the same as or different than the first power threshold; (3) one or more applications of the UE 102 requiring a data rate that is higher than or equal to a first predetermined data rate; (4) one or more applications of the UE 102 requiring a data rate that is lower than or equal to a second predetermined data rate that is the same as or different than the first predetermined data rate; (5) ambient temperature at the UE 102 being higher than or equal to a first temperature threshold; (6) ambient temperature at the UE 102 being lower than or equal to a second temperature threshold that is the same as or different than the first temperature threshold; (7) a condition relating to interest in sidelink communication, a request for sidelink resources, or the provision of sidelink assistance information (e.g., sidelink traffic pattern(s)); (8) a condition relating to a request to release sidelink communication or a lack of interest in sidelink communication, or a change of sidelink assistance information (e.g., change of sidelink traffic pattern(s)); (9) a condition relating to interest in receiving an MBS; or (10) a condition relating to a lack of interest in receiving an MBS.

In some implementations, if the UE 102 detects condition (1), (3), or (5) above, the UE 102 can suggest to the MN 104 that the MN 104 disables DC, uses a larger minimum scheduling offset(s) or a DRX cycle with longer off duration, or reduces the maximum number of SCells, the maximum number of MIMO layers, and/or the maximum aggregated bandwidth, e.g., by including, in the first UE information, a preferred configuration that indicates (or includes) disabling DC (e.g., a preferred maximum number of SCells, including PSCell, being set to zero), minimum scheduling offset(s), a preferred DRX configuration, a preferred maximum number of SCells, a preferred maximum number of MIMO layers, or a preferred maximum aggregated bandwidth.

In some implementations, if the UE 102 had previously transmitted old UE information in response to detecting condition (1), (3) or (5) above, and then detects condition (2), (4) or (6), the UE 102 can suggest to the MN 104 that the MN 104 re-enables DC, uses a smaller minimum scheduling offset(s) or a DRX cycle with longer on duration, or increases the maximum number of SCells, the maximum number of MIMO layers, and/or the maximum aggregated bandwidth, e.g., by including, in the first UE information, a preferred configuration that indicates (or includes) disabling DC (e.g., a preferred maximum number of SCells, including PSCell, set to zero), minimum scheduling offset(s), a preferred DRX configuration, a preferred maximum number of SCells, a preferred maximum number of MIMO layers, or a preferred maximum aggregated bandwidth.

In some implementations, if the UE 102 detects condition (7) above, the UE 102 can indicate that the UE 102 is interested in sidelink communication on one or more frequencies, or request sidelink resources for the sidelink communication, and/or update sidelink traffic pattern(s), e.g., by including, in the first UE information, frequency information of the one or more frequencies (e.g., a first SL-RxInterestedFreqList), sidelink transmission resources request information (e.g. SL-TxResoureReq), or sidelink assistance information.

In some implementations, if the UE 102 had previously transmitted old UE information in response to detecting condition (7) above, and the UE 102 then detects condition (8), the UE 102 can indicate that the UE 102 is no longer interested in sidelink communication on the one or more frequencies, request releasing sidelink resources for the sidelink communication, and/or update sidelink traffic pattern(s), e.g., by including, in the first UE information, frequency information of the one or more frequencies (e.g., a first SL-RxInterestedFreqList), sidelink transmission resources request information (e.g., SL-TxResoureReq), or new sidelink assistance information.

In some implementations, if the UE 102 detects condition (10) above, the UE 102 can indicate that the UE 102 is interested in receiving an MBS on one or more frequencies, e.g., by including, in the first UE information, frequency information of the one or more frequencies.

If the UE 102 transmitted previously transmitted old UE information due to detecting condition (10) and detects condition (11), the UE 102 in some implementations can indicate that the UE 102 is no longer interested in receiving an MBS on the one or more frequencies, by including, in the first UE information, frequency information of the one or more frequencies.

In some implementations, the UE 102 may start a prohibit timer (e.g., t346a, t346b, t346c, t346d, t346e, t346f) in response to transmitting 316A the first UE information. During the prohibit timer running, the UE 102 refrains from transmitting the first UE information (i.e., the same UE information that the UE 102 lastly transmitted) to the MN 104 or RAN 105. The MN 104 can configure the UE 102 to start the prohibit timer by transmitting an RRC reconfiguration message including a timer value for the prohibit timer to the UE 102. In response, the UE 102 starts the prohibit timer value with the configured timer value.

Sometime after sending 316A the first UE information (e.g., any arbitrary amount of time later), the UE 102 may determine 334A that a first condition for connecting to the C-PCell 126B is satisfied, and in response initiate 335A a random access procedure (also called a "random access channel" or "RACH" procedure) on the C-PCell 126B. In response to the initiation 335A, the UE 102 can perform 336A the RACH procedure with the C-MN 106B via the C-PCell 126B, e.g., using a random access configuration included in the C-MN configuration. The UE 102 may disconnect from the PCell 124 of the MN 104 in response to the initiation 334A or the determination 335A. The RACH procedure can be a two-step procedure or a four-step procedure, for example, and a contention-based procedure or a contention-free procedure. The UE 102 sends 338A a Conditional Handover Complete message to the C-MN 106B, via the C-PCell 126B, during or after performing 336A the RACH procedure. After performing 336A the RACH procedure or receiving the Conditional Handover Complete message, the C-MN 106B sends 340A a Handover Success message to inform the MN 104 that the UE 102 handed over to the C-MN 106B. After receiving the Handover Success message, the MN 104 can send a SN Status Transfer message (not shown in FIG. 3A) to the C-MN 106B, including uplink and/or downlink PDCP sequence numbers, forward PDCP SDUs, and/or release resources and configurations of the UE 102.

Depending on the implementation, the MN 104 can include the condition that the UE 102 evaluates at event 334A, or various portions of that condition (i.e., component or sub-conditions) in the message sent at event 312A. For example, the MN 104 may include the condition in the C-MN configuration, in a part of the conditional configuration other than the C-MN configuration, and/or in a part of the RRC reconfiguration message other than the conditional configuration.

After the UE 102 successfully completes the RACH procedure, and/or after sending 338A the Conditional Handover Complete message, the UE 102 can communicate 342A with the C-MN 106B via the C-PCell 126B (now, PCell 126B) in accordance with the first C-MN configuration. The UE 102 may send 338A the Conditional Handover Complete message during or after the RACH procedure. For example, the UE 102 may send 338A the Conditional Handover Complete message in a message 3 of a four-step RACH procedure, or in a message A of a two-step RACH procedure. Events 334A, 335A, 336A, 338A, 340A, and 342A are collectively referred to herein as CHO execution procedure 390A.

After sending 338A the Conditional Handover Complete message, and possibly also after further communicating 342A with the C-MN 106B (now MN 106B), the UE 102 again sends 320A the first UE information, now to the MN 106B. In some implementations, the UE 102 sends 320A the first UE information to the MN 106B only if the UE 102 determines that the situation that triggered the first sending 316A of the first UE information still exists, or determines that the condition that triggered the first sending 316A is still satisfied (e.g., as described above for the event 316A). If the situation has changed, or if the second condition is no longer satisfied, then the UE 102 does not send 320A the first UE information to the MN 106B. If the prohibit timer is running, the UE 102 stops the prohibit timer to send 320A the first UE information to the MN 106B. Thus, the UE 102 is not blocked by the running prohibit timer from sending 320A the first UE information to the MN 106B. Alternatively, if the prohibit timer is running, the UE 102 keeps the prohibit timer running and sends 320A the first UE information to the MN 106B while the prohibit timer is running. In either alternative above, the UE 102 starts or restarts the prohibit timer after transmitting 320A the first UE information to the MN 106B. Alternatively, if the UE 102 keeps the prohibit timer, the UE 102 does not start or restart the prohibit timer after transmitting 320A the first UE information to the MN 106B.

In some implementations, the C-MN configuration generated 308A by the C-MN 106B (and referred to in FIG. 3A as the "first" C-MN configuration) is a complete and self-contained configuration (i.e., a "full" configuration). Within the C-MN configuration, the C-MN 106B may include a full configuration indication (e.g., an IE or field) that indicates the C-MN configuration is a complete and self-contained configuration. The UE 102 can directly use the C-MN configuration to communicate with the C-MN 104B without referring to the first MN configuration the UE 102 was previously using. In other implementations, the C-MN configuration can include one or more configurations on top of the first MN configuration (i.e., a "delta" configuration). The UE 102 can use this delta C-MN configuration, together with the first MN configuration, to communicate with the C-MN 106B at event 342A.

The C-MN configuration can include multiple configuration parameters for the UE 102 to communicate with the C-MN 106B via the C-PCell 126B. These configuration parameters may configure radio resources for the UE 102 to communicate with the C-MN 106B via the C-PCell 126B and zero, one, or more candidate secondary cells (C-SCells) of the C-MN 106B. The multiple configuration parameters may configure zero, one, or more radio bearers, where the radio bearer(s) can include one or more SRBs and/or one or more DRBs. The SRB(s) may include SRB1 and/or SRB2.

The delta C-MN configuration is not a complete configuration and does not include a full configuration indication. The UE 102 cannot use only the delta C-MN configuration to communicate with the C-MN 106B, and instead also refers to the first MN configuration stored at the UE 102. The delta C-MN configuration can include one or multiple configuration parameters for the UE 102 to communicate with the C-MN 106B via the C-PCell 126B. These configuration parameters may configure radio resources for the UE 102 to communicate with the C-MN 106B via the C-PCell 126B and zero, one, or more C-SCells of the C-MN 106B. The configuration parameters may configure zero, one, or more radio bearers. The radio bearer(s) can include one or more SRBs and/or one or more DRBs. The configuration parameters may or may not include a measurement configuration and/or a security configuration.

The first MN configuration that was used by the UE 102 to communicate 302A with the MN 104 (and possibly to communicate 342A with the C-MN 106B, if the first C-MN configuration is a delta configuration) can include multiple configuration parameters for the UE 102 to communicate with the MN 104 via the PCell 124 and zero, one, or more secondary cells (SCells) of the MN 104. These configuration parameters may configure radio resources for the UE 102 to communicate with the MN 104 via the PCell 124 and zero, one, or more SCells of the MN 104. The configuration parameters may configure zero, one, or more radio bearers. The one or more radio bearers can include one or more SRBs and/or one or more DRBs. The SRB(s) may include SRB1 and/or SRB2.

If the first C-MN configuration is a full configuration, the MN 106B may optionally determine 322A to update the C-MN configuration (i.e., configure new configuration(s), modify existing configuration(s), and/or release existing configuration(s) in the C-MN configuration). In response to the determination 322A, the MN 106B generates a second MN configuration updating the C-MN configuration in accordance with the first UE information, and sends 324A an RRC reconfiguration message including the second MN configuration to the UE 102.

If the first C-MN configuration is instead a delta configuration, the MN 106B can determine 322A to update the C-MN configuration and/or the first MN configuration (i.e., configure new configuration(s), modify existing configuration(s) and/or release existing configuration(s) in the C-MN configuration and/or the first MN configuration). In response to the determination 322A, the MN 106B generates a second MN configuration updating the C-MN configuration(s) and/or the first MN configuration in accordance with the first UE information, and sends 324A the RRC reconfiguration message including the second MN configuration to the UE 102.

In response to the RRC reconfiguration message, the UE 102 updates the first C-MN configuration and/or the first MN configuration using the second MN configuration, and sends 326A an RRC reconfiguration complete message to the MN 106B. Thus, the UE 102 communicates with the MN 106B in accordance with the updated first C-MN configuration and/or the updated first MN configuration. Events 322A, 324A, and 326A are collectively referred to herein as RRC reconfiguration procedure 392A.

The C-MN configuration can include a group configuration (CellGroupConfig) IE that configures the C-PCell 126B and may configure zero, one, or more C-SCells of the C-MN 106B. In some implementations, the C-MN configuration is in an RRCReconfiguration message, RRCReconfiguration-IEs, or a CellGroupConfig IE conforming to 3GPP specification 38.331. In these implementations, the Conditional Handover Complete message at event 338A can be an RRCReconfigurationComplete message. In other implementations, the C-MN configuration can include a RadioResourceConfigDedicated IE and/or a MobilityControlInfo IE configuring the C-PCell 126B, and may or may not include SCellToAddModList IE configuring one or more C-SCells of the C-MN 106B. In other implementations, the C-MN configuration can be an RRCConnectionReconfiguration message or RRCConnectionReconfiguration-IEs conforming to 3GPP specification 36.331. In these implementations, the Conditional Handover Complete message can be an RRCConnectionReconfigurationComplete message.

In some implementations, the first (or second) MN configuration can include a CellGroupConfig IE configuring the PCell 124 (or 126B) and zero, one, or more SCells of the MN 104. In some implementations, the first (or second) MN configuration is an RRCReconfiguration message, RRCReconfiguration-IEs, or the CellGroupConfig IE conforming to 3GPP specification 38.331, or includes configurations in the RRCReconfiguration message, RRCReconfiguration-IEs, or CellGroupConfig IE. In other implementations, the first (or second) MN configuration can include a RadioResourceConfigDedicated IE and/or a MobilityControlInfo IE configuring the PCell 124 (or 126B), and may or may not include an SCellToAddModList IE configuring one or more SCells of the MN 104. In still other implementations, the first (or second) MN configuration can include configurations in the RadioResourceConfigDedicated IE and/or MobilityControlInfo IE.

If the MN 104 is implemented as a gNB, the RRC reconfiguration message of event 312A and the RRC reconfiguration complete message of event 314A can be an RRCReconfiguration message and an RRCConnectionReconfigurationComplete message, respectively. If the MN 104 is implemented as an eNB or ng-eNB, the RRC reconfiguration message of event 312A and RRC reconfiguration complete message of event 314A can be implemented as RRCReconfiguration and RRCConnectionReconfigurationComplete messages, respectively.

If the C-MN 106B is implemented as a gNB, the RRC reconfiguration message of event 324A and RRC reconfiguration complete message of event 326A can be an RRCReconfiguration message and an RRCConnectionReconfigurationComplete message, respectively. If the C-MN 106B is implemented as an eNB or a ng-eNB, the RRC reconfiguration message 324A and the RRC reconfiguration complete message 326 can be implemented as RRCReconfiguration and RRCConnectionReconfigurationComplete messages, respectively.

Optionally, after the RRC reconfiguration procedure 392A, the UE 102 may, at some later time, send 328A other, second UE information to the MN 106B. The second UE information may include any of the various types of information discussed above with reference to the first UE information, for example. In alternative scenarios, the UE 102 does not send 328A the second UE information, and/or the UE 102 and MN 106B do not perform the RRC reconfiguration procedure 392A.

In some implementations, the C-MN 106B includes a CU 172 and one or more DUs 174, as shown in FIG. 1B. In these implementations, the CU 172 may receive the Conditional Handover Request message from the MN 104 at event 306A, and send the Conditional Handover Request Acknowledge message to the MN 104 at event 310A in response. The DU 174 may generate the first C-MN configuration or part of the first C-MN configuration (e.g., a C-DU configuration), and send the C-MN configuration or part of the C-MN configuration to the CU 172. In implementations and/or scenarios where the DU 174 generates part of the C-MN configuration, the CU 172 may generate the rest of the C-MN configuration. In one implementation, the DU 174 can perform 336A the RACH procedure with the UE 102 and identify the UE 102 in the RACH procedure. In response to the identification, the DU 174 communicates with the UE 102 using C-MN configuration or part of the C-MN configuration. After identifying the UE 102, the DU 174 can send the CU 172 a DU-to-CU interface message (e.g., an Access Success message or a Downlink Data Deliver message) indicating that the UE 102 connects to the DU 174. In response to receiving the DU-to-CU interface message, the CU 172 and DU 174 communicate with the UE 102 using the rest of the C-MN configuration and with part of the C-MN configuration, respectively.

If the C-MN 106B identifies the UE 102 on the C-PCell 126B at event 336A, the C-MN 106B (now MN 106B) determines that (1) the C-PCell 126B becomes PCell 126B and (2) the one or more C-SCells become SCells. The MN 106B begins to transmit one or more downlink control information (DCI) commands on one or more physical downlink control channels (PDCCH(s)), and one or more reference signals or data, to the UE 102 via the PCell 126B and/or one or more C-SCells (if configured in the C-MN configuration), according to configuration parameters in the first C-MN configuration. Moreover, the MN 106B receives one or more signals on one or more PUCCHs, and one or more sounding reference signals or data, from the UE 102 via the PCell 126B and/or one or more C-SCells (if configured in the C-MN configuration), according to configuration parameters in the first C-MN configuration. The UE 102 receives the DCI command(s) on the PDCCH(s), and the reference signal(s) or data, from the MN 106B via the PCell 126B and/or one or more C-SCells (if configured in the C-MN configuration), and transmits the signal(s) on the PUCCH(s), and the sounding reference signal(s) or data, to the MN 106B via the PCell 126B and one or more SCells (if configured in the C-MN configuration), according to configuration parameters in the first C-MN configuration.

In some scenarios and implementations, the UE 102 performs an immediate handover to a target MN (e.g., base station 106A, 106B) instead of the CHO execution procedure 390A. If the UE 102 performs the immediate handover while or immediately after transmitting the first UE information at event 316A, the UE 102 may fail to transmit the first UE information to the MN 104. In one scenario, the failure may be caused by the UE 102 interrupting transmission of the first UE information to perform (the random access procedure in) the immediate handover. In another scenario, the MN 104 may receive the first UE information after transmitting the target MN a handover request message for preparing the immediate handover. In one implementation, if the UE 102 has not received an acknowledgement (e.g., an RLC acknowledgement) for RLC PDU(s) including the first UE information from MN 104 before interrupting the transmission of the first UE information, the UE 102 can transmit the first UE information to the target MN after the immediate handover, similar to event 320A. In another implementation, if the UE 102 transmitted the first UE information during the last X second(s) preceding performance of the immediate handover, reception of a handover command message for the immediate handover, performance of the random access procedure in the immediate handover, or transmission of a handover complete message to the target MN, the UE 102 may transmit the first UE information to the target MN (if the triggering condition for transmitting the first UE information is still satisfied), similar to event 320A. Otherwise, the UE 102 may not transmit the first UE information to the target MN after completing the immediate handover. For example, X can be about 1 or 2. In another example, X is within a range (e.g., 0.9 to 2). In another example, X is a suitable integer such as 1, 2, or 3. If the prohibit timer is running, the UE 102 stops the prohibit timer to send the first UE information to the target MN. Thus, the UE 102 is not blocked by the running prohibit timer from sending the first UE information to the target MN. Alternatively, if the prohibit timer is running, the UE 102 keeps the prohibit timer running and sends the first UE information to the target MN while the prohibit timer is running. In either alternative above, the UE 102 starts or restarts the prohibit timer after transmitting the first UE information to the target MN. Alternatively, if the UE 102 does not stop the prohibit timer, the UE 102 keeps the prohibit timer running. If the target MN is a gNB, the handover command and handover complete messages can be RRCReconfiguration and RRCReconfigurationComplete messages, respectively. The RRCReconfiguration message can include a ReconfigurationWithSync IE. If the target MN is an eNB or a ng-eNB, the handover command and handover complete messages can be RRCConnectionReconfiguration and RRCConnectionReconfigurationComplete messages, respectively. The RRCConnectionReconfiguration message can include a MobilityControlInfo IE.

Figure 3B:
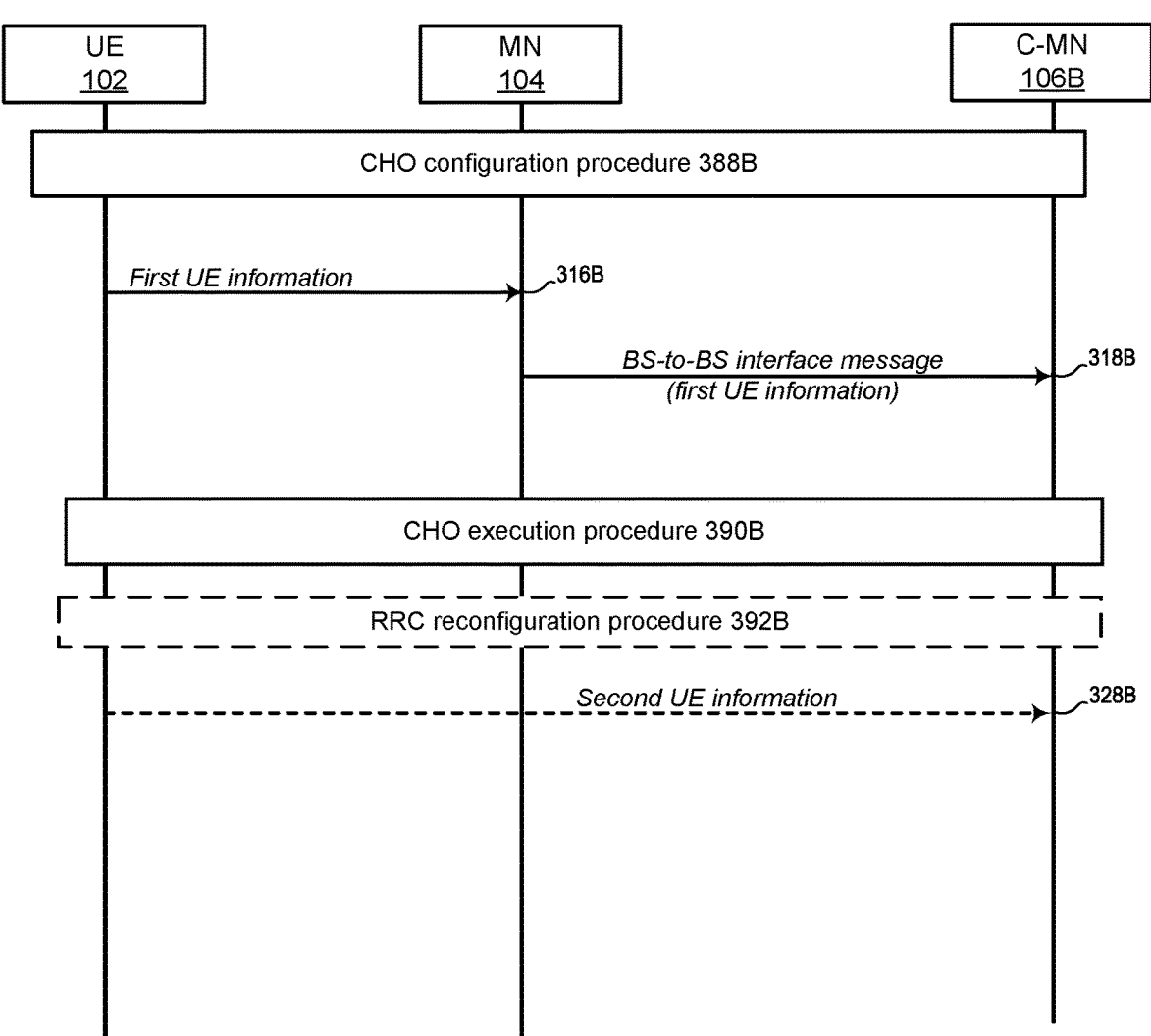

Referring now to FIG. 3B, in a scenario 300B, the base station 104 again operates as a source base station (MN), and the base station 106B as a candidate base station (C-MN), for a conditional handover. However, FIG. 3B corresponds to a different implementation than FIG. 3A. In particular, while FIG. 3A depicts an implementation in which the UE 102 re-sends UE information (at event 320A) to ensure that the C-MN 106B receives the UE information, FIG. 3B depicts an alternative implementation in which the source base station (MN 104) forwards the UE information to the candidate base station (C-MN 106B).

Initially, the UE 102, MN 104, and C-MN 106B perform a conditional handover (CHO) configuration procedure 388B, which may be similar to the CHO configuration procedure 388A of FIG. 3A. Later, but before the UE 102 determines that the condition associated with the conditional configuration has been satisfied, the UE 102 sends 316B first UE information to the MN 104. The first UE information may be similar to any of the types of UE information discussed above, and the UE 102 may send 316B the first UE information in response to a trigger (e.g., detecting a situation or determining that a condition is met) similar to any of the triggers discussed above in connection with FIG. 3A, for example. In some implementations, the UE 102 sends 316B an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331.

After receiving the first UE information at event 316B, the MN 104 forwards/sends 318B the first UE information to the C-MN 106B in a base station to base station (BS-to-BS) interface message (e.g., the X2 or Xn interface between base stations 104, 106B shown in FIG. 1A). Sometime after the UE 102 sends 316B the first UE information (e.g., any arbitrary amount of time later), when the condition associated with the CHO procedure is satisfied (and either before or after event 318B depending on the implementation and/or scenario), the UE 102, MN 104, and C-MN 106B perform a CHO execution procedure 390B, which may be similar to CHO execution procedure 390A of FIG. 3A.

In some implementations, the MN 104 sends 318B the first UE information to the C-MN 106B in response to receiving the first UE information at event 316B (e.g., immediately after receiving the first UE information at event 316B). In other implementations, the MN 104 sends 318B the first UE information to the C-MN 106B at a later time, such as during the CHO execution procedure 390B. In some of these latter implementations, for example, the MN 104 sends 318B the first UE information to the C-MN 106B in response to receiving a Handover Success message from the C-MN 106B (e.g., in an event similar to event 340A of FIG. 3A). In this manner, the MN 104 only sends 318B the first UE information after the MN 104 confirms that the conditional handover has been executed, and therefore avoids wasting resources by forwarding UE information in scenarios where the conditional handover never occurs (e.g., due to the condition never being met, or the MN 104 causing the UE 102 to release the conditional configuration, etc.). Nonetheless, the MN 104 may send 318B the first UE information before waiting for a Handover Success message (or any other confirmation of handover completion), e.g., to allow the C-MN 106B to attempt to modify the conditional configuration, e.g., in the RRC reconfiguration procedure 392B, or for other reasons.

After the CHO execution procedure 390B, the C-MN 106B (now MN 106B) and the UE 102 may perform RRC reconfiguration procedure 392B, which may be similar to RRC reconfiguration procedure 392A of FIG. 3A. Further, the UE 102 may, at some later time, send 328B other, second UE information to the MN 106B. The second UE information may include any of the various types of UE information discussed above, and may be sent by the UE 102 in response to any of the various types of triggers discussed above. In alternative scenarios, the UE 102 does not send 328B the second UE information, and/or the UE 102 and MN 106B do not perform the RRC reconfiguration procedure 392B.

In some implementations, the C-MN 106B includes a CU 172 and one or more DUs 174, as shown in FIG. 1B. In these implementations, the CU 172 and a DU 174 may perform the various operations of scenario 300B as described above with reference to scenario 300A of FIG. 3A.

If the UE 102 performs the CHO execution 390B while or immediately after transmitting the first UE information, the UE 102 may fail to transmit the first UE information to the MN 104. The failure may be caused by the UE 102 interrupting transmission of the first UE information to perform (the random access procedure in) the CHO execution procedure 390B. In one implementation, if the UE 102 has not received an acknowledgement (e.g., an RLC acknowledgement) for RLC PDU(s) including the first UE information from MN 104 before interrupting the transmission of the first UE information, the UE 102 can retransmit the first UE information to the MN 106B after the CHO execution procedure 390B, similar to event 320A. In another implementation, if the UE 102 transmitted the first UE information during the last X second(s) preceding conduct of the CHO execution procedure 390B, execution of the first C-MN configuration, performance of the random access procedure in the CHO execution procedure 390B, or transmission of the Conditional Handover Complete message, the UE 102 may transmit the first UE information to the MN 106B (if the triggering condition for transmitting the first UE information is still satisfied), similar to event 320A. Otherwise, the UE 102 may not transmit the first UE information to the MN 106B after completing the CHO execution procedure 390B. For example, X can be around 1 or 2. In another example, X is within a range (e.g., 0.9 to 2). In another example, X is a suitable integer such as 1, 2, or 3. In yet another implementation, if the UE 102 is triggered to perform the CHO execution 390B while transmitting the first UE information, the UE 102 performs the CHO execution 390B after successfully transmitting the first UE information.

Figure 3C:
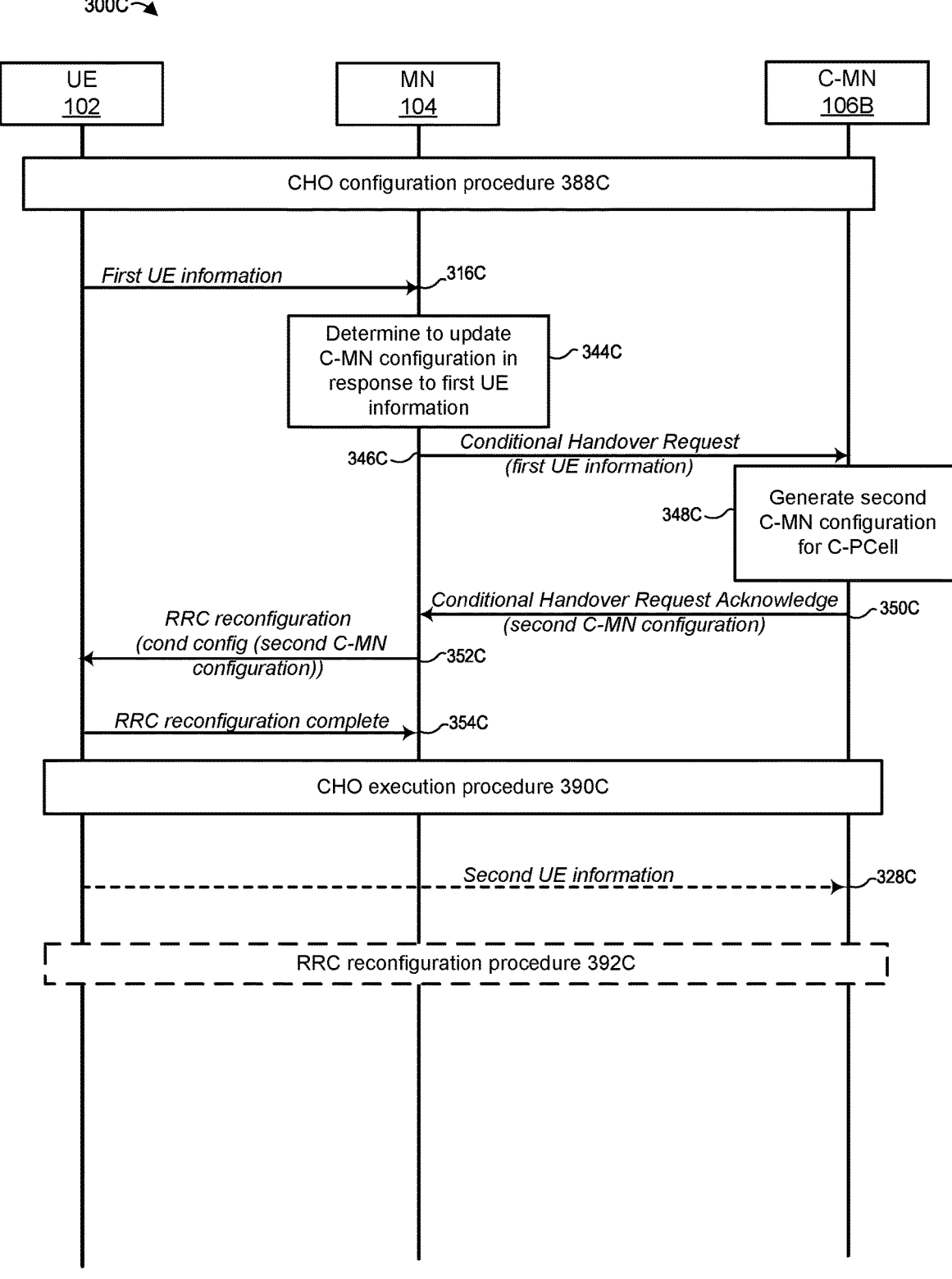

Referring now to FIG. 3C, in a scenario 300C, the base station 104 again operates as a source base station (MN), and the base station 106B as a candidate base station (C-MN), for a conditional handover. In the implementation of FIG. 3C, however, the MN 104 ensures that the C-MN 106B receives the UE information not just by forwarding the UE information, but by sending the C-MN 106B a new Conditional Handover Request message that includes the UE information.

Initially, the UE 102, MN 104, and C-MN 106B perform a CHO configuration procedure 388C, which may be similar to the CHO configuration procedure 388A of FIG. 3A. Later, but before the UE 102 determines that the condition associated with the conditional configuration has been satisfied, the UE 102 sends 316C first UE information to the MN 104. The first UE information may be similar to the first UE information described above with reference to FIG. 3A, and the UE 102 may send 316C the first UE information in response to a trigger (e.g., detecting a situation or determining that a condition is met) similar to any of the triggers discussed above in connection with FIG. 3A, for example. In some implementations, the UE 102 sends 316C an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331.

In response to receiving the first UE information at event 316C, the MN 104 determines 344C to update the C-MN configuration (e.g., generate a C-MN configuration similar to the C-MN configuration generated at event 308A of FIG. 3A). In response to the determination 344C, the MN 104 triggers the release by sending 346C the C-MN 106B the first UE information in a Conditional Handover Request message.

In response to receiving the Conditional Handover Request message containing the first UE information, the C-MN 106B generates 348C a new, second C-MN configuration for a C-PCell (e.g., cell 126B) of the C-MN 106B. The C-MN 106B may generate 348C the second C-MN configuration such that the updated configuration is in accordance with the first UE information (e.g., in accordance with a UE-preferred configuration indicated in the first UE information).

In alternative implementations, the conditional handover request message of event 346C does not include the first UE information. In these implementations, the MN 104 may instead determine (e.g., within event 344C) one or more configuration restrictions based on the first UE information. For example, the configuration restriction(s) may include maximum resource allocations such as a maximum number of SCells, a maximum number of MIMO layers, a maximum aggregated bandwidth, and so on. Other configuration restrictions are also possible (e.g., minimum scheduling offsets, impermissible modes, etc.). The MN 104 may then generate information indicative of the configuration restriction(s), and include that information in the conditional handover request message of event 346C. The C-MN 106B can then generate the second C-MN configuration, at event 348C, based on the indicated configuration restriction(s).

After event 348C, the C-MN 106B sends 350C the second C-MN configuration to the MN 104 in a Conditional Handover Request Acknowledge message. The MN 104 then includes the second C-MN configuration in a conditional configuration, and sends 352C an RRC reconfiguration message that includes the conditional configuration to the UE 102. The UE 102 may then send 354A an RRC reconfiguration complete message to the MN 104 in response to the RRC reconfiguration message. In some implementations, the UE 102 replaces the first C-MN configuration with the second C-MN configuration. In other implementations, the UE 102 replaces the conditional configuration including the C-MN configuration with the conditional configuration received at event 352C.

In some implementations, the Conditional Handover Request message at event 346C can be a Handover Request message as defined in 3GPP TS 36.423 or TS 38.423, and the MN 104 may include a conditional handover request indication in the Handover Request message. In some implementations, the MN 104 may include the MN configuration that the UE 102 had used to communicate with the MN 104 in the Handover Request message. In other implementations, the MN 104 does not include the MN configuration in the Handover Request message.

Sometime after the UE 102 sends 354C the RRC reconfiguration complete message (e.g., any arbitrary amount of time later), when the condition associated with the CHO procedure is satisfied, the UE 102, MN 104, and C-MN 106B perform a CHO execution procedure 390C, which may be similar to CHO execution procedure 390A of FIG. 3A. After the CHO execution procedure 390C, the C-MN 106B (now MN 106B), the UE 102 may, at some later time, send 328C other, second UE information to the MN 106B. The second UE information may include any of the various types of UE information discussed above, and may be sent by the UE 102 in response to any of the various types of triggers discussed above. The UE 102 may perform RRC reconfiguration procedure 392C in accordance with the second UE information, which may be similar to RRC reconfiguration procedure 392A of FIG. 3A. In alternative scenarios, the UE 102 does not send 328C the second UE information, and/or the UE 102 and MN 106B do not perform the RRC reconfiguration procedure 392C.

In some implementations, the C-MN 106B includes a CU 172 and one or more DUs 174, as shown in FIG. 1B. In these implementations, the CU 172 and a DU 174 may perform the various operations of scenario 300C as described above with reference to scenario 300A of FIG. 3A.

Figure 3D:
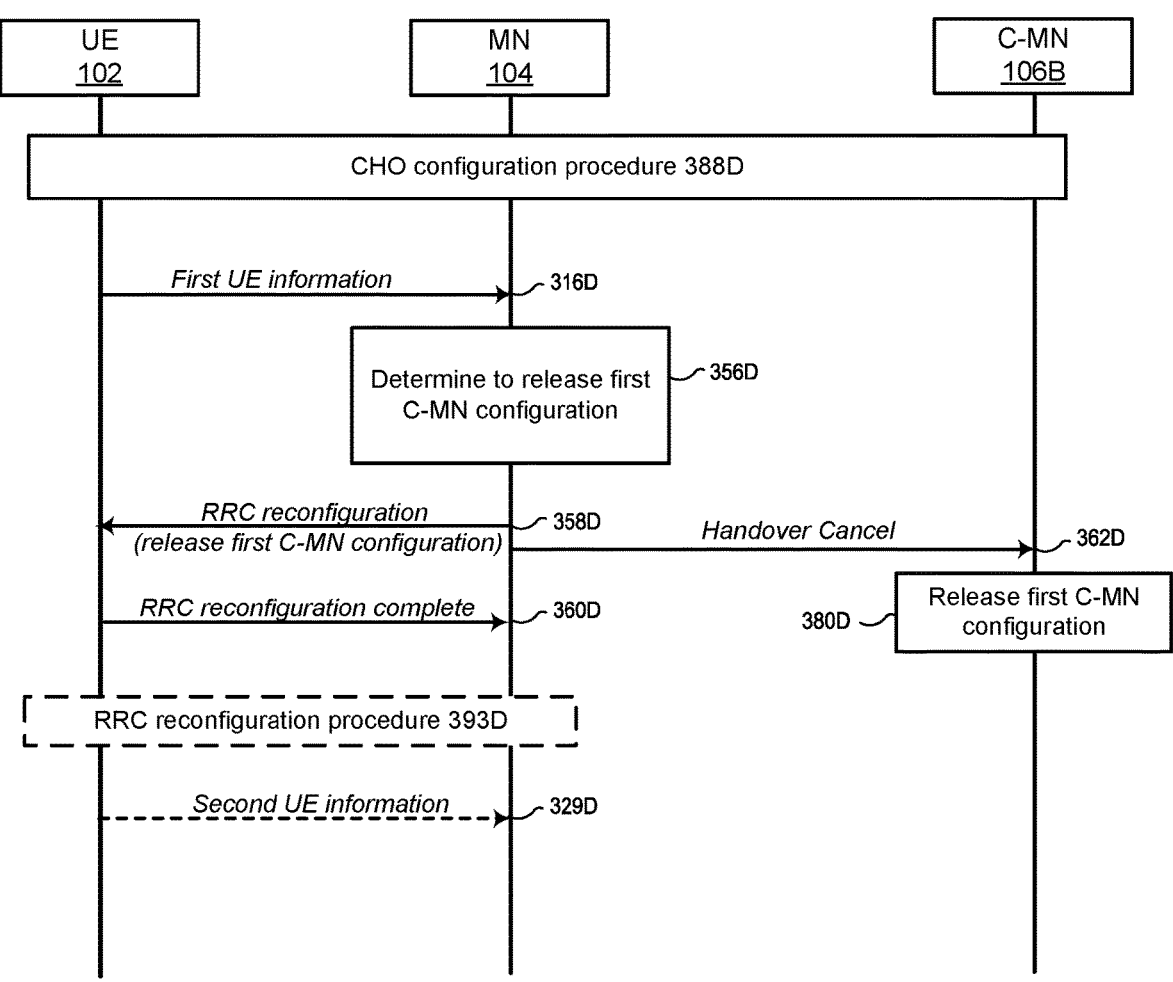

Referring now to FIG. 3D, in a scenario 300D, the base station 104 again operates as a source base station (MN), and the base station 106B as a candidate base station (C-MN), for a conditional handover. In the implementation of FIG. 3D, however, neither the MN 104 nor the UE 102 (necessarily) ensures that the C-MN 106B receives the first UE information. Instead, the MN 104 cancels the CHO procedure, and the MN 104 itself (optionally) reconfigures the UE 102 in accordance with the UE information.

Initially, the UE 102, MN 104, and C-MN 106B perform a CHO configuration procedure 388D, which may be similar to the CHO configuration procedure 388A of FIG. 3A. Later, but before the UE 102 determines that the condition associated with the conditional configuration has been satisfied, the UE 102 sends 316D first UE information to the MN 104. The first UE information may be similar to the first UE information described above with reference to FIG. 3A, and the UE 102 may send 316D the first UE information in response to a trigger (e.g., detecting a situation or determining that a condition is met) similar to any of the triggers discussed above in connection with FIG. 3A, for example. In some implementations, the UE 102 sends 316D an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331.

In response to receiving the first UE information at event 316D, the MN 104 determines 356D to release the first C-MN configuration (e.g., a C-MN configuration similar to the C-MN configuration generated at event 308A of FIG. 3A). Additionally or equivalently, the MN 104 may determine 356D to cancel the conditional handover procedure. In response to the determination 356D, the MN 104 sends 358D to the UE 102 an RRC reconfiguration message indicating (e.g., in an IE or field) that the UE 102 is to release the first C-MN configuration (or, more generally, a conditional configuration that includes the first C-MN configuration).

In response to the indication in the RRC reconfiguration message, the UE 102 releases the first C-MN configuration (e.g., releases a conditional configuration that includes the first C-MN configuration). After (e.g., in response to) releasing the configuration, or in response to receiving the RRC reconfiguration message, the UE 102 sends 360D the MN 104 an RRC reconfiguration complete message.

Also in response to the determination 356D, the MN 104 sends 362D a Handover Cancel message to the C-MN 106B, which causes the C-MN 106B to release 380D the first C-MN configuration. Event 362D may occur before event 358D, after event 360D, or between events 358D and 360D, for example.

In some scenarios, the MN 104 and UE 102 then perform an RRC reconfiguration procedure 393D. The RRC reconfiguration procedure 393D may be similar to the RRC reconfiguration procedure 392A, but takes place between the UE 102 and MN 104 rather than the UE 102 and C-MN 106B. In the RRC reconfiguration procedure 393D, the MN 104 may determine to update the MN configuration in accordance with the first UE information (e.g., similar to determination 322A of FIG. 3A, but updating the MN 104 configuration rather than the MN 106B configuration).

The UE 102 may then, at some later time, send 329D other, second UE information to the MN 104. The second UE information may include any of the various types of UE information discussed above, and may be sent by the UE 102 in response to any of the various types of triggers discussed above. In alternative scenarios, the UE 102 does not send 329D the second UE information, and/or the UE 102 and MN 104 do not perform the RRC reconfiguration procedure 393D.

FIGS. 4A through 4D depict additional conditional handover scenarios. Unlike FIGS. 3A through 3D, however, FIGS. 4A through 4D depict scenarios in which the serving base station (MN 104) is a distributed base station with a CU 172 and at least two DUs 174, and prepares a conditional handover from a source DU (S-DU) 174A to a candidate DU (C-DU) 174B.

Figure 4A:
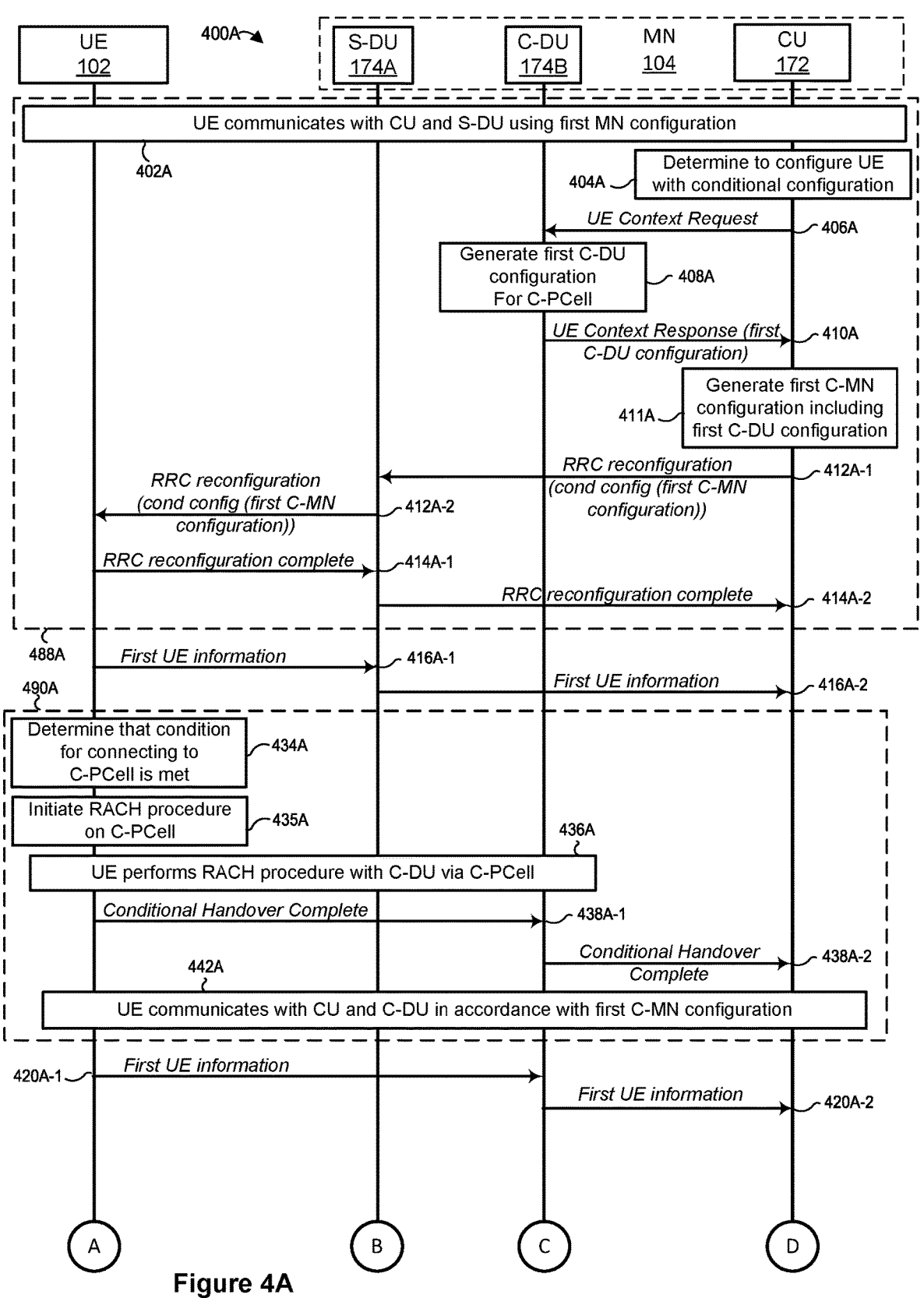
FIGS. 4A through 4D are example message sequences corresponding to scenarios in which the RAN prepares a conditional handover procedure for a UE from one DU of a base station to another DU of the base station.
Figure 4A:
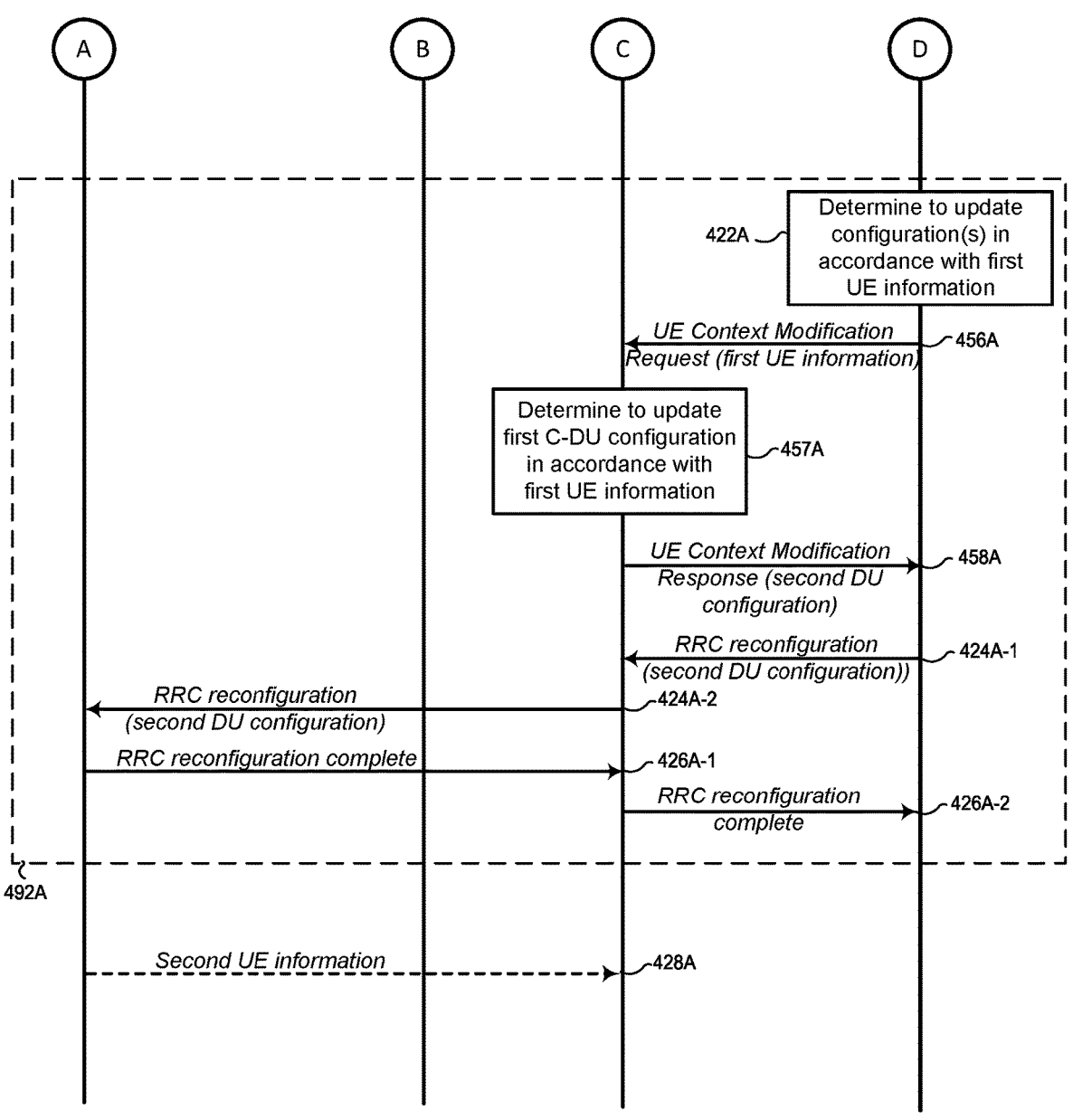

Referring first to FIG. 4A, in a scenario 400A, the UE 102 initially communicates 402A with the MN 104 in accordance with a first MN configuration. The UE 102 may be in SC with the MN 104, or in DC with the MN 104 and SN 106A, for example. The CU 172 then determines 404A to configure the UE 102 with a conditional configuration. The CU 172 can make the determination 404A based on one or more measurement results that the S-DU 174A received from the UE 102 directly (e.g., via an SRB established between the UE 102 and the S-DU 174A or via a physical control channel), based on one or more measurement results that the CU 172 obtains from measurements of signals received from the UE 102 on data or control channels, or based on some other suitable event. In response to the determination 404A, the CU 172 sends 406A a UE context request message to the C-DU 174B.

In response to the UE context request message, the C-DU 174B generates 408A a first C-DU configuration for a C-PCell associated with the C-DU 174B (e.g., cell 124, or another cell of MN 104 if cell 124 is associated with the S-DU 174A). The C-DU 174B then sends 410A to the CU 172 a UE context response message that includes the first C-DU configuration. The UE context request message of event 406A and the UE context response message of event 410A may be UE Context Setup Request and UE Context Setup Response messages, respectively. Alternatively, the UE context request and UE context response messages may be UE Context Modification Request and UE Context Modification Response messages, respectively.

The CU 172 then generates 411A a first C-MN configuration that includes the first C-DU configuration. The first C-MN configuration may be a "full" configuration or a "delta" configuration, as discussed above with reference to FIG. 3A, and the configuration parameters may be similar to those discussed above with reference to FIG. 3A. The CU 172 then includes the first C-MN configuration in a conditional configuration, and sends 412A-1 an RRC reconfiguration message that includes the conditional configuration to the S-DU 174A. The S-DU 174A then sends 412A-2 an RRC reconfiguration that includes the conditional configuration to the UE 102. The UE 102 responds by sending 414A-1 an RRC reconfiguration complete message to the S-DU 174A, and in response the S-DU 174A sends 414A-2 an RRC reconfiguration complete message to the CU 172. Events 402A, 404A, 406A, 408A, 410A, 411A, 412A-1, 412A-2, 414A-1, and 414A-2 are collectively referred to herein as CHO configuration procedure 488A.

Later, but before the UE 102 determines that the condition associated with the conditional configuration has been satisfied, the UE 102 sends 416A-1 first UE information to the S-DU 174A. The first UE information may be similar to the first UE information described above with reference to FIG. 3A, and the UE 102 may send 416A-1 the first UE information in response to a trigger (e.g., detecting a situation or determining that a condition is met) similar to any of the triggers discussed above in connection with FIG. 3A, for example. In some implementations, the UE 102 sends 416A-1 an RRC message including the first UE information to the S-DU 174A, such as a UEAssistanceInformation message, an InDeviceCoexIndication message, a SidelinkUEInformation message, or a SidelinkUEInformationNR message as specified in 3GPP specification 36.331 or 38.331. After (e.g., in response to) receiving the first UE information, the S-DU 174A sends 416A-2 the first UE information to the CU 172.

Sometime after sending 416A-1 the first UE information (e.g., any arbitrary amount of time later), the UE 102 may determine 434A that a condition for connecting to the C-PCell (e.g., cell 124) of the C-DU 174B is satisfied, and in response initiate 435A a RACH procedure on the C-PCell. In response to the initiation 435A, the UE 102 can perform 436A the RACH procedure with the C-DU 174B 106B via the C-PCell, e.g., using a random access configuration included in the first C-DU configuration. The UE 102 may disconnect from the PCell of the S-DU 174A in response to the initiation 434A or the determination 435A. The RACH procedure can be a two-step procedure or a four-step procedure, for example, and a contention-based procedure or a contention-free procedure. The UE 102 sends 438A-1 a Conditional Handover Complete message to the C-DU 174B, via the C-PCell, during or after performing 436A the RACH procedure. After (e.g., in response to) performing 436A the RACH procedure or receiving the Conditional Handover Complete message, the C-DU 174B sends 438A-2 a Conditional Handover Complete message to the CU 172 to inform the CU 172 that the UE 102 handed over to the C-DU 174B.

Depending on the implementation, the CU 172 can include the condition that the UE 102 evaluates at event 434A, or various portions of that condition (i.e., component or sub-conditions) in the message sent at event 412A-2. For example, the CU 172 may include the condition in the first C-MN configuration, in a part of the conditional configuration other than the first C-MN configuration, and/or in a part of the RRC reconfiguration message other than the conditional configuration.

After the UE 102 successfully completes the RACH procedure, and/or after sending 438A-1 the Conditional Handover Complete message, the UE 102 can communicate 442A with the C-DU 174B via the C-PCell (now a PCell) in accordance with the first C-DU configuration. The UE 102 may send 438A-1 the Conditional Handover Complete message during or after the RACH procedure. For example, UE 102 may send 438A-1 the Conditional Handover Complete message in a message 3 of a four-step RACH procedure, or in a message A of a two-step RACH procedure. Events 434A, 435A, 436A, 438A-1, 438A-2, and 442A are collectively referred to herein as CHO execution procedure 490A.

After sending 438A-1 the Conditional Handover Complete message, and possibly also after communicating 442A further with the C-DU 174B (now DU 174B), the UE 102 again sends 420A-1 the first UE information, now to the DU 174B. The DU 174B then forwards/sends 420A-2 the first UE information to the CU 172. In some implementations, the UE 102 sends 420A-1 the first UE information to the DU 174B only if the UE 102 determines that the situation that triggered the first sending 416A-1 of the first UE information still exists, or determines that the condition that triggered the first sending 416A-1 is still satisfied (e.g., as described above for the event 316A in FIG. 3A). If the situation has changed, or if the second condition is no longer satisfied, then the UE 102 does not send 420A-1 the first UE information to the DU 174B.

The CU 172 may optionally determine 422A to update the C-MN and/or C-DU configurations (i.e., configure new configuration(s), modify existing configuration(s), and/or release existing configuration(s) in the C-MN configuration). In response to the determination 422A, the CU 172 sends 456A a UE Context Modification Request message including the first UE information to the DU 174B. In response, the DU 174B may determine 457A to update the first C-DU configuration in accordance with the first UE information (e.g., to align with a preferred configuration of the UE as indicated in the first UE information). The C-DU 174B can then send 458A this updated, second DU configuration (full or delta) to the CU 172 in a UE Context Modification Response message.

The CU 172 then sends 424A-1 an RRC reconfiguration message that includes the second DU configuration to the DU 174B. If the CU 172 had determined (at event 422A) to also update other portions of the MN configuration, then the CU 172 may also include these new configurations in the RRC reconfiguration message. The DU 174B then sends 424A-2 an RRC reconfiguration message that includes the second DU configuration to the UE 102. While not shown in FIG. 4A, in response to the RRC reconfiguration message received at event 424A-2, the UE 102 updates or replaces the first C-DU configuration (and possibly other portions of the first MN configuration) using the second DU configuration. Thus, the UE 102 communicates with the DU 174B in accordance with the new/updated DU configuration, and possibly communicates (indirectly) with the CU 172 in accordance with a new/updated MN configuration. Events 422A, 456A, 457A, 458A, 424A-1, 424A-2, 426A-1, and 426A-2 are collectively referred to herein as RRC reconfiguration procedure 492A.

The various RRC reconfiguration messages of FIG. 4A may take various forms depending on whether the MN 104 is implemented as a gNB, eNB, or ng-eNB, as discussed above with reference to FIG. 3A.

Optionally, after the RRC reconfiguration procedure 492A, the UE 102 may, at some later time, send 428A other, second UE information to the DU 174B. The second UE information may include any of the various types of information discussed above with reference to the first UE information, for example. In alternative scenarios, the UE 102 does not send 428A the second UE information, and/or the UE 102, DU 174B, and CU 172 do not perform the RRC reconfiguration procedure 492A.

If the C-DU 174B identifies the UE 102 on the C-PCell (e.g., cell 124) at event 436A, the C-DU 174B (now DU 174B) determines that (1) the C-PCell becomes a PCell and (2) any C-SCells become SCells. The DU 174B begins to transmit one or more DCI commands on one or more PDCCH(s), and one or more reference signals or data, to the UE 102 via the PCell and/or one or more SCells (if configured in the C-MN configuration), according to configuration parameters in the first C-MN configuration. Moreover, the DU 174B receives one or more signals on one or more PUCCHs, and one or more sounding reference signals or data, from the UE 102 via the PCell and/or one or more SCells (if configured in the C-MN configuration), according to configuration parameters in the first C-MN configuration. The UE 102 receives the DCI command(s) on the PDCCH(s), and the reference signal(s) or data, from the DU 174B via the PCell and/or one or more SCells (if configured in the C-MN configuration), and transmits the signal(s) on the PUCCH(s), and the sounding reference signal(s) or data, to the DU 174B via the PCell and one or more C-SCells (if configured in the C-MN configuration), according to configuration parameters in the first C-MN configuration.

Figure 4B:
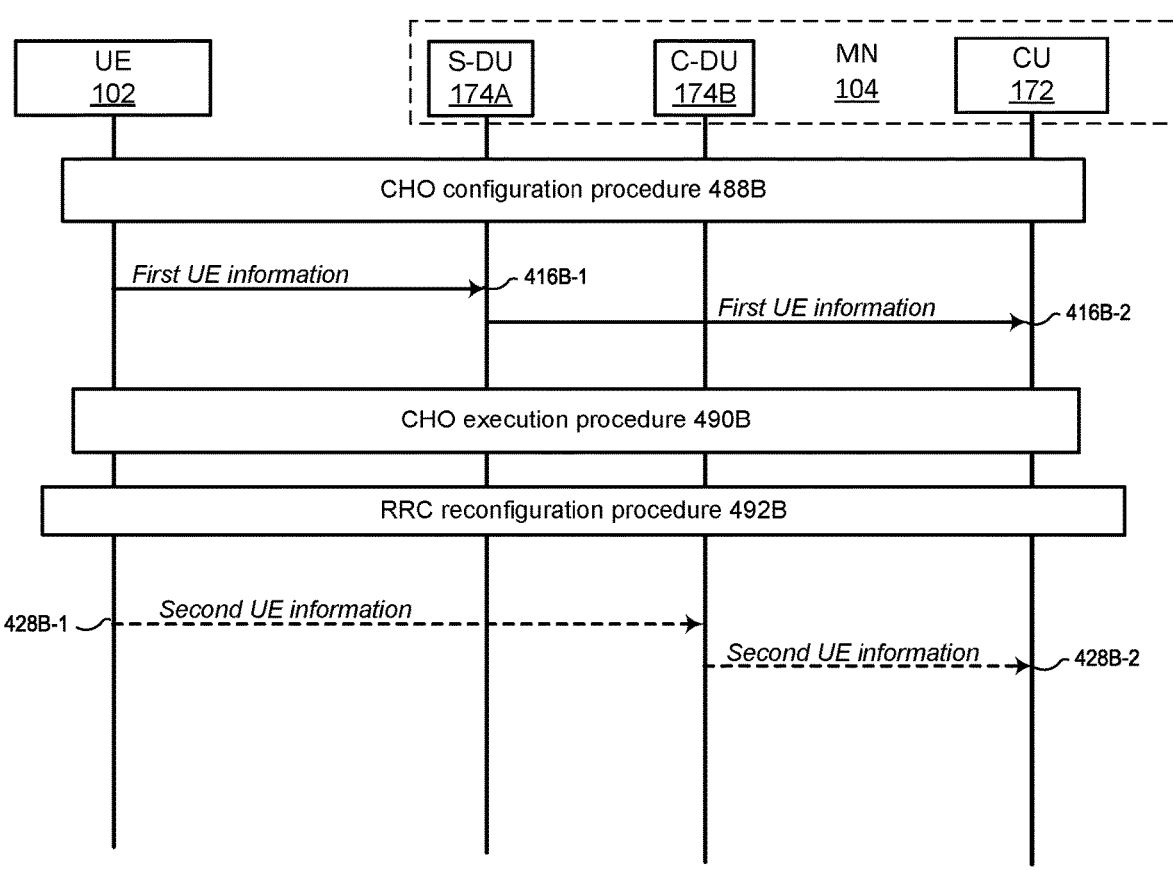

Referring now to FIG. 4B, in a scenario 400B, base station 104 again operates as a distributed, serving base station (MN 104), with a CU 172 and at least two DUs 174, and prepares a conditional handover from a source DU (S-DU) 174A to a candidate DU (C-DU) 174B. In the implementation of FIG. 4B, however, the CU 172 ensures that the C-DU 174B receives the UE information by storing/maintaining UE information throughout the CHO execution procedure, and then forwarding the UE information to the C-DU 174B (when operating as DU 174B) in a UE Context Modification Request message.

Initially, the UE 102, CU 172, S-DU 174A, and C-DU 174B perform a CHO configuration procedure 488B, which may be similar to the CHO configuration procedure 488A of FIG. 4A. Later, but before the UE 102 determines that the condition associated with the conditional configuration has been satisfied, the UE 102 sends 416B-1 first UE information to the S-DU 174A. The first UE information may be similar to the first UE information described above with reference to FIG. 3A, and the UE 102 may send 416B-1 the first UE information in response to a trigger (e.g., detecting a situation or determining that a condition is met) similar to any of the triggers discussed above in connection with FIG. 3A, for example. In some implementations, the UE 102 sends 416B-1 an RRC message including the first UE information to the S-DU 174A, such as a UEAssistanceInformation message, an InDeviceCoexIndication message, a SidelinkUEInformation message, or a SidelinkUEInformationNR message as specified in 3GPP specification 36.331 or 38.331. After (e.g., in response to) receiving the first UE information, the S-DU 174A forwards/sends 416B-2 the first UE information to the CU 172.

Sometime after sending 416B-1 the first UE information (e.g., any arbitrary amount of time later), when the condition associated with the CHO procedure is satisfied, the UE 102, CU 172, S-DU 174A, and C-DU 174B perform a CHO execution procedure 490B, which may be similar to CHO execution procedure 490A of FIG. 4A, for example. After the CHO execution procedure 490B, the C-DU 174B (now DU 174B), CU 172, and UE 102 may perform RRC reconfiguration procedure 492B, which may be similar to RRC reconfiguration procedure 492A of FIG. 4A. As discussed above with reference to FIG. 4A and the various events of RRC reconfiguration procedure 492A, this can result in the UE 102 being reconfigured to a new DU configuration (or more generally, a new MN configuration), which may better align with the preferences and/or circumstances indicated in the first UE information.

The UE 102 may, at some later time, send 428B-1 other, second UE information to the DU 174B, which the DU 174B then forwards/sends 428B-2 to the CU 172. The second UE information may include any of the various types of UE information discussed above, and may be sent by the UE 102 in response to any of the various types of triggers discussed above. In alternative scenarios, events 428B-1 and 428B-2 do not occur.

Figure 4C:
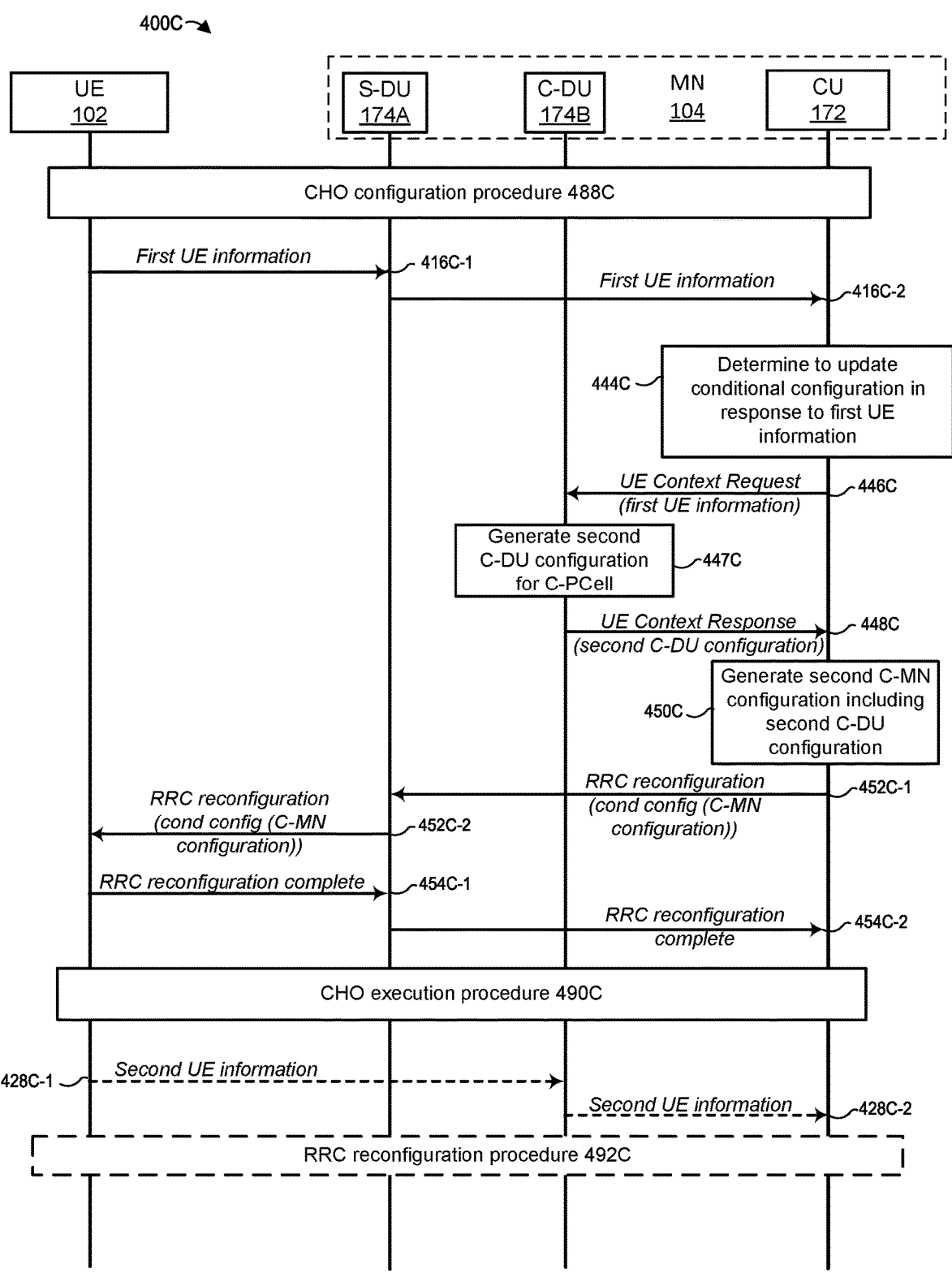

Referring now to FIG. 4C, in a scenario 400C, base station 104 again operates as a distributed, serving base station (MN 104), with a CU 172 and at least two DUs 174, and prepares a conditional handover from a source DU (S-DU) 174A to a candidate DU (C-DU) 174B. In the implementation of FIG. 4C, however, the CU 172 ensures that the C-DU 174B receives the UE information not just by forwarding the UE information, but by sending the C-DU 174B a UE context request (e.g., UE Context Setup Request or UE Context Modification Request) message that includes the UE information.

Initially, the UE 102, CU 172, S-DU 174A, and C-DU 174B perform a CHO configuration procedure 488C, which may be similar to the CHO configuration procedure 488A of FIG. 4A. Later, but before the UE 102 determines that the condition associated with the conditional configuration has been satisfied, the UE 102 sends 416C-1 first UE information to the S-DU 174A. The first UE information may be similar to the first UE information described above with reference to FIG. 3A, and the UE 102 may send 416C-1 the first UE information in response to a trigger (e.g., detecting a situation or determining that a condition is met) similar to any of the triggers discussed above in connection with FIG. 3A, for example. In some implementations, the UE 102 sends 416C-1 an RRC message including the first UE information to the S-DU 174A, such as a UEAssistanceInformation message, an InDeviceCoexIndication message, a SidelinkUEInformation message, or a SidelinkUEInformationNR message as specified in 3GPP specification 36.331 or 38.331. After (e.g., in response to) receiving the first UE information, the S-DU 174A forwards/sends 416C-2 the first UE information to the CU 172.

In response to receiving the first UE information at event 416C-2, the CU 172 determines 444C to update the conditional configuration that the S-DU 174A had provided to the UE 102 during CHO configuration procedure 488C. In response to the determination 444C, the CU 172 triggers this update by sending 446C the C-DU 174B the first UE information in a UE context request message.

In response to receiving the UE context request message containing the first UE information, the C-DU 174B generates 448C a new, second C-DU configuration for a C-PCell (e.g., cell 126B) of the C-DU 174B. The C-DU 174B may generate 448C the second C-DU configuration such that the updated configuration is in accordance with the first UE information (e.g., in accordance with a UE-preferred configuration indicated in the first UE information), and then sends 448C the second C-DU configuration to the CU 172 in a UE context response message. The UE context request message of event 446C and the UE context response message of event 448C may be UE Context Setup Request and UE Context Setup Response messages, respectively. Alternatively, the UE context request and UE context response messages may be UE Context Modification Request and UE Context Modification Response messages, respectively.

Thereafter, the CU 172 generates 450C a second C-MN configuration that includes the second C-DU configuration. The second C-MN configuration may be a "full" configuration or a "delta" configuration, as discussed above with reference to FIG. 3A, and the configuration parameters may be similar to those discussed above with reference to FIG. 3A. The CU 172 then includes the first C-MN configuration in a conditional configuration, and sends 452C-1 an RRC reconfiguration message that includes the conditional configuration to the S-DU 174A. The S-DU 174A then sends 452C-2 an RRC reconfiguration that includes the conditional configuration to the UE 102. The UE 102 responds by sending 454C-1 an RRC reconfiguration complete message to the S-DU 174A, and in response the S-DU 174A sends 454C-2 an RRC reconfiguration complete message to the CU 172.

In alternative implementations, the UE context request message of event 446C does not include the first UE information. In these implementations, the CU 172 may instead determine (e.g., within event 444C) one or more configuration restrictions based on the first UE information. For example, the configuration restriction(s) may include maximum resource allocations such as a maximum number of SCells, a maximum number of MIMO layers, a maximum aggregated bandwidth, and so on. Other configuration restrictions are also possible (e.g., minimum scheduling offsets, impermissible modes, etc.). The CU 172 may then generate information indicative of the configuration restriction(s), and include that information in the UE context request message of event 446C. The C-DU 174B can then generate the second C-DU configuration, at event 447C, based on the indicated configuration restriction(s).

Sometime after event 454C-2 (e.g., any arbitrary amount of time later), when the condition associated with the CHO procedure is satisfied, the UE 102, CU 172, S-DU 174A, and C-DU 174B perform a CHO execution procedure 490C, which may be similar to CHO execution procedure 490A of FIG. 4A, for example. After the CHO execution procedure 490C, the UE 102 may also, at some later time, send 428D-1 other, second UE information to the DU 174B, which the DU 174B then forwards/sends 428D-2 to the CU 172. The second UE information may include any of the various types of UE information discussed above, and may be sent by the UE 102 in response to any of the various types of triggers discussed above. The UE 102 may perform RRC reconfiguration procedure 492C in accordance with the second UE information, which may be similar to RRC reconfiguration procedure 492A of FIG. 4A. In alternative scenarios, events 428C-1 and 428C-2, and/or RRC reconfiguration procedure 492C, do not occur.

Figure 4D:
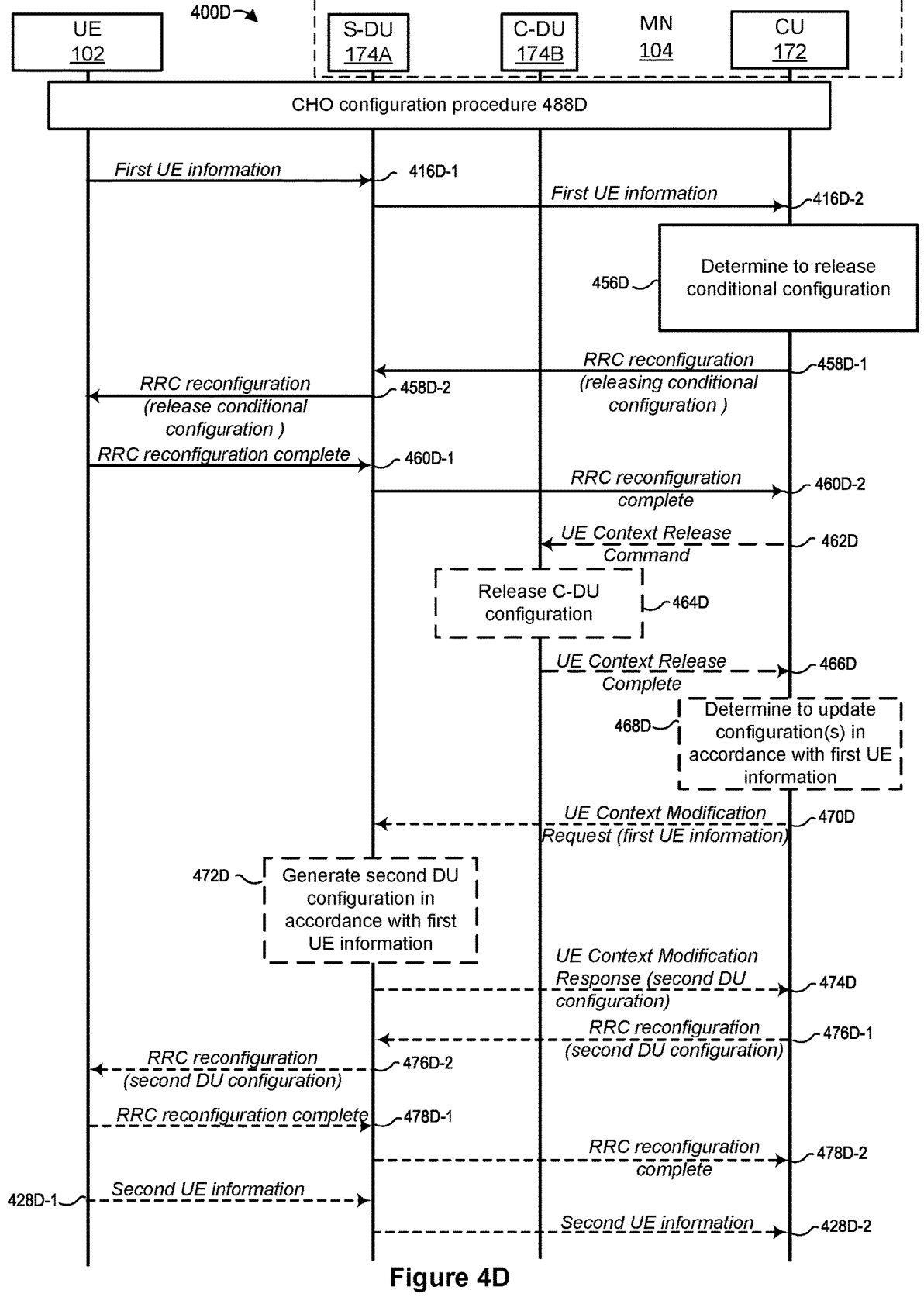

Referring now to FIG. 4D, in a scenario 400D, base station 104 again operates as a distributed, serving base station (MN 104), with a CU 172 and at least two DUs 174, and prepares a conditional handover from a source DU (S-DU) 174A to a candidate DU (C-DU) 174B. In the implementation of FIG. 4D, however, neither the CU 172 nor the UE 102 (necessarily) ensures that the C-DU 174B receives the first UE information. Instead, the CU 172 cancels the CHO procedure, and (optionally) causes the UE 102 to be reconfigured in accordance with the first UE information.

Initially, the UE 102, CU 172, S-DU 174A, and C-DU 174B perform a CHO configuration procedure 488D, which may be similar to the CHO configuration procedure 488A of FIG. 4A. Later, but before the UE 102 determines that the condition associated with the conditional configuration has been satisfied, the UE 102 sends 416D-1 first UE information to the S-DU 174A. The first UE information may be similar to the first UE information described above with reference to FIG. 3A, and the UE 102 may send 416D-1 the first UE information in response to a trigger (e.g., detecting a situation or determining that a condition is met) similar to any of the triggers discussed above in connection with FIG. 3A, for example. In some implementations, the UE 102 sends 416D-1 an RRC message including the first UE information to the S-DU 174A, such as a UEAssistanceInformation message, an InDeviceCoexIndication message, a SidelinkUEInformation message, or a SidelinkUEInformationNR message as specified in 3GPP specification 36.331 or 38.331. After (e.g., in response to) receiving the first UE information, the S-DU 174A forwards/sends 416D-2 the first UE information to the CU 172.

In response to receiving the first UE information at event 416D-2, the CU 172 determines 456D to release the conditional configuration that the S-DU 174A had provided to the UE 102 during CHO configuration procedure 488D. In response to the determination 456D, the CU 172 triggers the release by sending 458D-1 the S-DU 174A an RRC reconfiguration message that includes information (e.g., an IE or field) indicating that the UE 102 is to release the conditional configuration. The S-DU 174A then sends 458D-2 the UE 102 an RRC reconfiguration message including information (e.g., an IE or field) indicating that the UE 102 is to release the conditional configuration. In response to event 458D-2, the UE 102 releases the conditional configuration, and sends 460D-1 an RRC reconfiguration complete message to the S-DU 174A. The S-DU 174A then sends 460D-2 an RRC reconfiguration complete message to the CU 172.

Thereafter, in some implementations and/or scenarios, the CU 172 sends 462D a UE Context Release Command message to the C-DU 174B. In response, the C-DU 174B releases 464D the C-DU configuration, and sends 466D the CU 172 a UE Context Release Complete message. The CU 172 may then determine 468D to update, or trigger the update of, the DU and/or MN configuration in accordance with the first UE information. In response to the determination 468D, the CU 172 may send 470D the S-DU 174A a UE Context Modification Request message that includes the first UE information. In response, the S-DU 174A may generate 472D a new, second C-DU configuration that is in accordance with the first UE information (e.g., in accordance with a UE-preferred configuration indicated in the first UE information), and sends 474D the CU 172 a UE Context Modification Response message that includes the second DU configuration.

The CU 172 may then send 476D-1 the S-DU 174A an RRC reconfiguration message that includes the second DU configuration, after which the S-DU 174A may send 476D-2 the UE 102 an RRC reconfiguration message that includes the second DU configuration. In response to event 476D-2, the UE 102 uses the second DU configuration to communicate with the S-DU 174A, and sends 478D-1 an RRC reconfiguration complete message to the S-DU 174A. The S-DU 174A then sends 478D-2 an RRC reconfiguration complete message to the CU 172.

The UE 102 may then, at some later time, send 428D-1 other, second UE information to the MN 104, and the S-DU 174A may forward/send 428D-2 the second UE information to the CU 172. The second UE information may include any of the various types of UE information discussed above, and may be sent by the UE 102 in response to any of the various types of triggers discussed above. In alternative scenarios, events 428D-1 and 428D-2 do not occur.

Figure 5A:
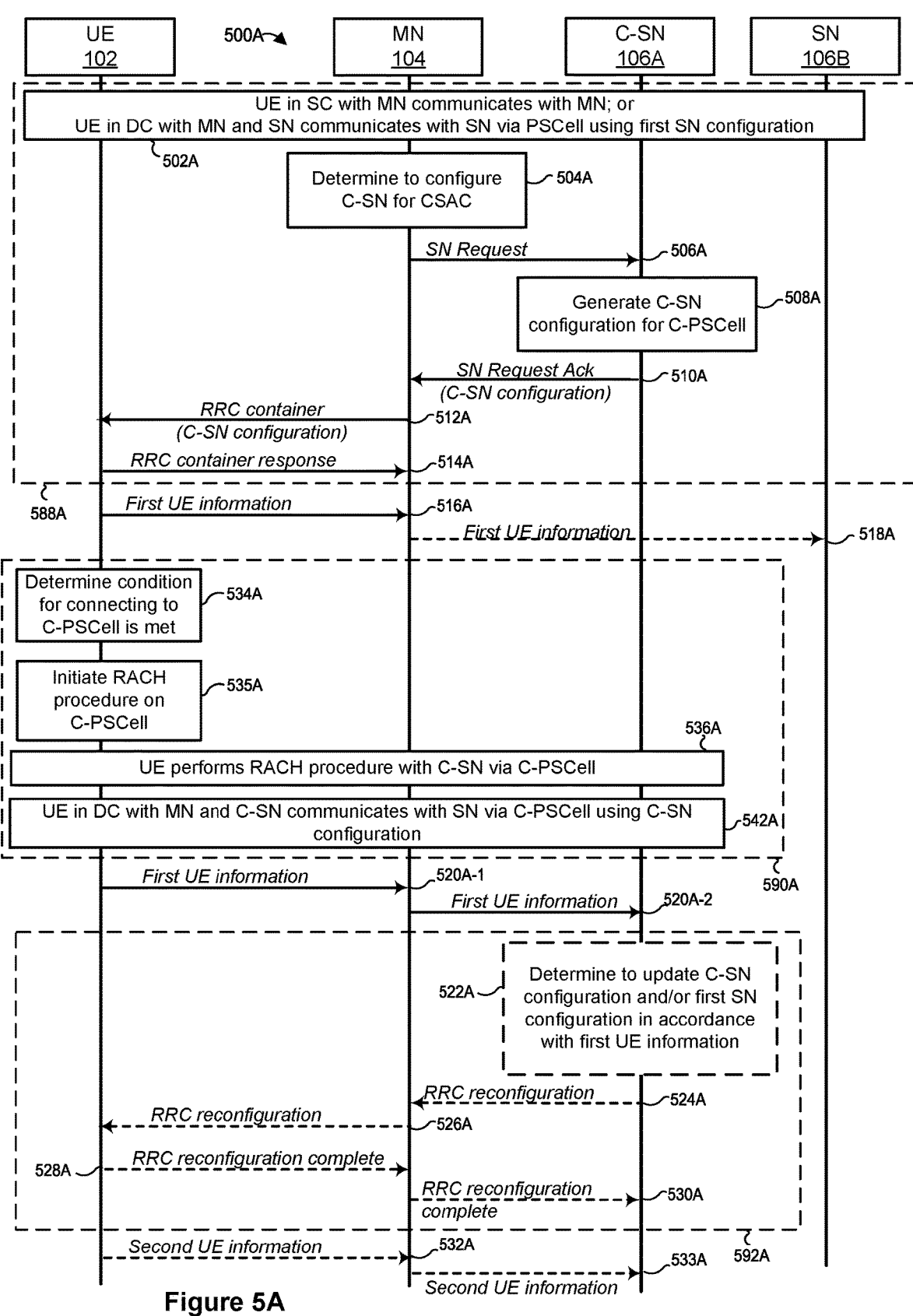

Whereas FIGS. 3A through 3D and 4A through 4D depict conditional handover scenarios, FIGS. 5A through 5H depict conditional SN addition or change (CSAC) scenarios. Referring first to FIG. 5A, in a scenario 500A, the base station 104 operates as an MN, the base station 106B operates as an SN, and the base station 106A operates as a C-SN.

Initially, in some scenarios, the UE 102 operates 502A in SC with the MN 104, and exchanges UL data PDUs and/or DL data PDUs with MN 104 via a PCell (e.g., cell 124). In the scenario 500A depicted in FIG. 5A, however, the UE 102 initially operates 502A in DC with the MN 104 and the SN 106B, and exchanges UL data PDUs and/or DL data PDUs with SN 106B via a PSCell (e.g., cell 126B), in accordance with a first SN configuration.

The MN 104 at some point determines 504A to configure the base station 106A as a C-SN for the purposes of a CSAC procedure, to allow the UE 102 to start using the SN 106A instead of the SN 106B when the UE 102 detects that the corresponding condition is satisfied. The MN 104 may make the determination 504A based on one or more measurement results received from the UE 102, or in response to receiving a message indicating that a conditional SN change is required (e.g., an SN Change Required message), for example. In response to the determination 504A, the MN 104 can send 506A an SN Request message to the C-SN 106A to initiate the CSAC. In some implementations, the MN 104 can indicate to the base station 106A in the SN Request message that the base station 106A is requested to be a C-SN for the UE 102. In response to the SN Request message, the C-SN 106A can generate 508A a C-SN configuration for a C-PSCell (e.g., cell 126A), for the CSAC.

The C-SN 106A can send 510A the MN 104 an SN Request Acknowledge message that includes the C-SN configuration, in response to the SN Request message. The C-SN configuration can configure a C-PSCell and also may configure zero, one, or more C-SCells. The MN 104 may then include the C-SN configuration in a conditional configuration, and send 512A an RRC container message including the conditional configuration to the UE 102. In some implementations, the UE 102 sends 514A an RRC container response message to the MN 104 in response to the RRC container message. In some implementations, the MN 104 sends an SN Reconfiguration Complete message (not shown in FIG. 5A) to the C-SN 106A in response to receiving 514A the RRC container response message. In other implementations, and as shown in FIG. 5A, the MN 104 does not send the SN Reconfiguration Complete message to the C-SN 106A. Events 502A, 504A, 506A, 508A, 510A, 512A, and 514A are collectively referred to as CSAC configuration procedure 588A.

In some implementations, the SN Request message at event 506A is an SN Addition Request, and the SN Request Acknowledge message is be an SN Addition Request Acknowledge message. In other implementations, the SN Request message is an SN Modification Request, and the SN Request Acknowledge message is an SN Modification Request Acknowledge message.

In some implementations, the MN 104 includes the C-SN configuration in an RRC reconfiguration message, includes the RRC reconfiguration message in the conditional configuration, and includes the conditional configuration in the RRC container message that the MN 104 sends 512A to the UE 102. If the MN 104 is implemented as a gNB, the RRC reconfiguration message can be an RRCReconfiguration message. If the MN 104 is instead implemented as an eNB or a ng-eNB, the RRC reconfiguration message can be an RRCConnectionReconfiguration message.

Later, but before the UE 102 determines that the condition associated with the conditional configuration has been satisfied, the UE 102 transmits 516A first UE information for an SN to the MN 104. The first UE information may be similar to any of the types of UE information discussed above, and the UE 102 may send 516A the first UE information in response to a trigger (e.g., detecting a situation or determining that a condition is met) similar to any of the triggers discussed above in connection with FIG. 3A, for example. In some implementations, the UE 102 sends 516A an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331. In some implementations, the UE 102 can send 516A an uplink RRC container message including this RRC message to the MN 104. In some implementations, the UE 102 may start a prohibit timer (e.g., t346*a*, t346*b*, t346*c*, t346*d*, t346*e*, t346*f*) in response to or after transmitting 516A the first UE information, similar to the description for event 316A.

In scenarios where the UE 102 is in DC with the MN 104 and SN 106B, the MN 104 forward/sends 518A the first UE information to the SN 106B. In some implementations, the MN 104 sends 518A an RRC Transfer message including the first UE information to the SN 106B. In other implementations, the MN 104 sends 518A a SN Modification Request message including the first UE information to the SN 106B.

After sending 516A the first UE information, the UE 102 (e.g., any arbitrary amount of time later) determines 534A that a condition for connecting to the C-PSCell 126A is satisfied, and initiates 535A a RACH procedure on the C-PSCell 126A in response to the detection. In response to the initiation 535A, the UE 102 performs 536A the RACH procedure with the C-SN 106A via the C-PSCell 126A using a random access configuration in the C-SN configuration. The UE 102 (if the UE 102 is in DC) may also disconnect from the SN 106B (i.e., the PSCell and all of SCell(s) of the SN 106B, if configured) in response to the initiation 535A or the determination 534A. The random access procedure may be a four-step procedure or a two-step procedure, for example, and can be contention-based or contention-free. After the UE 102 successfully completes the RACH procedure at event 536A, the C-SN 106A starts operating as SN 106A, and the UE 102 operates 542A in DC with the MN 104 and the SN 106A via the C-PSCell 126A (i.e., the new PSCell), in accordance with the C-SN configuration. Events 534A, 535A, 536A, and 542A are collectively referred to herein as CSAC execution procedure 590A.

In some implementations, the UE 102 sends an RRC reconfiguration complete message (for the C-SN 106A) to the MN 104 in response to the determination 534A or initiation 535A, either before, during, or after performing 536A the RACH procedure. In turn, the MN 104 may forward the RRC reconfiguration complete message to the C-SN 106A, e.g., in an SN Reconfiguration Complete message or an RRC Transfer message. In some implementations, the UE 102 may transmit the RRC reconfiguration complete message to the MN 104 by transmitting an additional, second uplink RRC container message, including the RRC reconfiguration complete message, to the MN 104.

If the MN 104 is implemented as a gNB, the first or second uplink RRC container message can be a ULInformationTransferMRDC message or an RRCReconfigurationComplete message. If the MN 104 is implemented as an eNB or a ng-eNB, the first or second uplink RRC container message can be an ULInformationTransferMRDC message or an RRCConnectionReconfigurationComplete message.

In other implementations, the UE 102 may transmit an RRC reconfiguration complete message (for the MN 104) to the MN 104 in response to the determination 534A or initiation 535A, either before, during, or after performing 536A the RACH procedure. In these implementations, the MN 104 does not send the RRC reconfiguration complete message for the MN 104 to the C-SN 106A.

After performing 536A (i.e., after completing) the RACH procedure, or after sending the RRC reconfiguration complete message for the MN 104 or C-SN 106A to the MN 104, the UE 102 again sends 520A-1 the first UE information to the MN 104, which in turn sends 520A-2 the first UE information to the C-SN 106A. In some implementations, the UE 102 sends 520A the first UE information to the C-SN 106A only if the UE 102 determines that the situation that triggered the first sending 516A of the first UE information still exists, or determines that the condition that triggered the first sending 516A is still satisfied (e.g., as described above for the event 316A). If the situation has changed, or if the second condition is no longer satisfied, then the UE 102 does not send 520A the first UE information to the C-SN 106A. If the prohibit timer is running, the UE 102 stops the prohibit timer to send 520A the first UE information to the MN 104. Thus, the UE 102 is not blocked by the running prohibit timer from sending 520A the first UE information to the MN 104. Alternatively, if the prohibit timer is running, the UE 102 keeps the prohibit timer running and sends 520A the first UE information to the MN 106B while the prohibit timer is running. In either alternative above, the UE 102 starts or restarts the prohibit timer after transmitting 520A the first UE information to the MN 106B. Alternatively, if the UE 102 keeps the prohibit timer running, the UE 102 does not start or restart the prohibit timer after transmitting 520A the first UE information to the MN 106B.

In some implementations, the C-SN 106A identifies the UE 102 by retrieving the identity of the UE 102 from a MAC PDU, which the UE 102 sends while performing 536A the RACH procedure. The C-SN 106A can then include the identity of the UE 102 in the C-SN configuration. In other implementations, the C-SN 106A identifies the UE 102 if the C-SN 106A receives a dedicated random access preamble from the UE 102 when performing 536A the RACH procedure. The C-SN 106A can then include the dedicated random access preamble in the C-SN configuration.

In some implementations, the C-SN configuration is a full configuration, i.e., the C-SN 106A generates the C-SN configuration as a complete and self-contained configuration. In other implementations, the C-SN 106A only determines it should generate a full configuration for the C-SN configuration in certain situations. For example, the C-SN 106A may determine to generate a full C-SN configuration if the C-SN 106A determines that the SN 106B is implemented by a different manufacturer, and certain compatibility issues may therefore be expected. As another example, the C-SN 106A may determine to generate a full C-SN configuration if the C-SN 106A is not able to generate a delta configuration for the C-SN configuration in accordance with the SN configuration received in the SN Request message at event 506A (e.g., if the MN 104A indicates the SN configuration is not up-to-date, such that the C-SN 106A cannot use the SN configuration to generate a delta configuration for the C-SN configuration). As another example, the MN 104 may indicate that the C-SN 106A should generate a complete C-SN configuration. In some implementations, the C-SN 106A determines to include a delta C-SN configuration in an SN Request Acknowledge message, during a conditional SN change procedure, if the C-SN 106A determines that the SN 106B is from the same manufacturer, for example, or if the C-SN 106A is preconfigured to do so.

In some implementations, the C-SN 106A includes a full configuration indication in the C-SN configuration in scenarios where the C-SN 106A generates a full configuration for the C-SN configuration. In other implementations, the C-SN 106A does not include a full configuration indication in the C-SN configuration. Instead, in these latter implementations, the MN 104 may include a full configuration indication in an RRC reconfiguration message at event 510A. The full configuration indication may be an endc-ReleaseAndAdd field or a mrdc-ReleaseAndAdd field, for example.

In other implementations, the C-SN configuration can include one or more configurations on top of the first SN configuration (i.e., a delta configuration). The delta C-SN configuration is not a complete configuration and does not include a full configuration indication. The UE 102 cannot use the delta C-SN configuration alone to communicate with the C-SN 106A, and must also refer to the SN configuration stored in the UE 102.

If the C-SN configuration is a full configuration, the SN 106A can determine 522A to update the C-SN configuration(s) (i.e., configure new configuration(s), modify existing configuration(s), and/or release existing configuration(s) in the C-SN configuration(s)). In response to the determination 522A, the SN 106A generates a second SN configuration updating the C-SN configuration in accordance with the first UE information, and sends 524A an RRC reconfiguration message including the second SN configuration to the MN 104. In turn, the MN 104 sends 526A an RRC reconfiguration message including the second SN configuration to the UE 102. The UE 102 uses the second SN configuration to communicate with the SN 106A.

If the C-SN configuration is a delta configuration, the SN 106A can determine 522A to update the C-SN configuration and/or the first SN configuration (i.e., configure new configuration(s), modify existing configuration(s), and/or release existing configuration(s) in the C-MN configuration(s) and/or the first MN configuration). In response to the determination 522A, the SN 106A generates a second SN configuration updating the C-SN configuration and/or the first C-SN configuration in accordance with the first UE information, and sends 524A an RRC reconfiguration message including the second SN configuration to the MN 104. In turn, the MN 104 sends 526A an RRC reconfiguration message including the second SN configuration to the UE 102. In some implementations, the MN 104 send 526A another RRC container message, including the RRC reconfiguration message, to the UE 102.

The UE 102 updates the C-SN configuration and/or the first SN configuration using the second C-SN configuration, and sends 528A an RRC reconfiguration complete message to the MN 104, in response to the RRC reconfiguration message. In turn, the MN 104 sends 530A an RRC reconfiguration complete message to the SN 106A. Thus, the UE 102 communicates with the SN 106A in accordance with the updated C-SN configuration and/or the updated SN configuration. In some implementations, the UE 102 sends 528A another RRC container response message, including the RRC reconfiguration complete message, to the MN 104. Events 522A, 524A, 526A, 528A, and 530A are collectively referred to as RRC reconfiguration procedure 592A.

The C-SN configuration can include one or multiple configuration parameters for the UE 102 to communicate with the C-SN 106A via the C-PSCell 126A. The multiple configuration parameters may configure radio resources for the UE 102 to communicate with the C-SN 106A via the C-PSCell 126A and zero, one, or more than one C-SCell of the C-SN 106A. The multiple configuration parameters may configure zero, one, or more than one radio bearer. The radio bearer(s) can include an SRB and/or DRB(s). The multiple configuration parameters may or may not include a measurement configuration and/or a security configuration.

The first (or second) SN configuration discussed above can include multiple configuration parameters for the UE 102 to communicate with the SN 106B via the PSCell 126B and zero, one, or more than one secondary cell (SCell) of the SN 106B. The multiple configuration parameters may configure radio resources for the UE 102 to communicate with the SN 106B via the PSCell 126B and zero, one, or more than one SCell of the SN 106B. The multiple configuration parameters may configure zero, one, or more than one radio bearer. The one or more radio bearers can include an SRB and/or DRB(s).

The C-SN configuration can include a group configuration (CellGroupConfig) IE that configures the C-PSCell 126A and may configure zero, one, or more than one C-SCell of the C-SN 106A. In one implementation, the C-SN configuration is an RRCReconfiguration message, RRCReconfiguration-IEs, or the CellGroupConfig IE conforming to 3GPP specification 38.331. In other implementations, the C-SN configuration includes a RadioResourceConfigDedicated IE and/or a MobilityControlInfo IE configuring the C-PSCell 126A, and may or may not include an SCellToAddModList IE configuring one or more C-SCells of the C-SN 106A. In one implementation, the C-SN configuration is an RRCConnectionReconfiguration message or RRCConnectionReconfiguration-IEs conforming to 3GPP specification 36.331.

In some implementations, the first (or second) SN configuration includes a CellGroupConfig IE, that configures the PSCell 126B (or 126A) and may configure zero, one, or more than one SCell of the SN 106A. In one implementation, the first (or second) SN configuration is an RRCReconfiguration message, RRCReconfiguration-IEs, or CellGroupConfig IE conforming to 3GPP specification 38.331, or include configurations in the RRCReconfiguration message, RRCReconfiguration-IEs, or CellGroupConfig IE. In other implementations, the first (or second) MN configuration includes a RadioResourceConfigDedicated IE and/or a MobilityControlInfo IE configuring the PSCell 126B (or 126A), and may or may not include an SCellToAddModList IE configuring one or more SCells of the SN 106A. In still other implementations, the first (or second) SN configuration can include configurations in the RadioResourceConfigDedicated IE and/or MobilityControlInfo IE.

If the MN 104 is implemented as a gNB, the RRC container message and the RRC reconfiguration complete message discussed above can be an RRCReconfiguration message and an RRCConnectionReconfigurationComplete message, respectively. If the MN 104 is implemented as an eNB or a ng-eNB, the RRC container message and the RRC container response message can be implemented as an RRCConnectionReconfiguration message and an RRCConnectionReconfigurationComplete message, respectively.

Figure 5B:
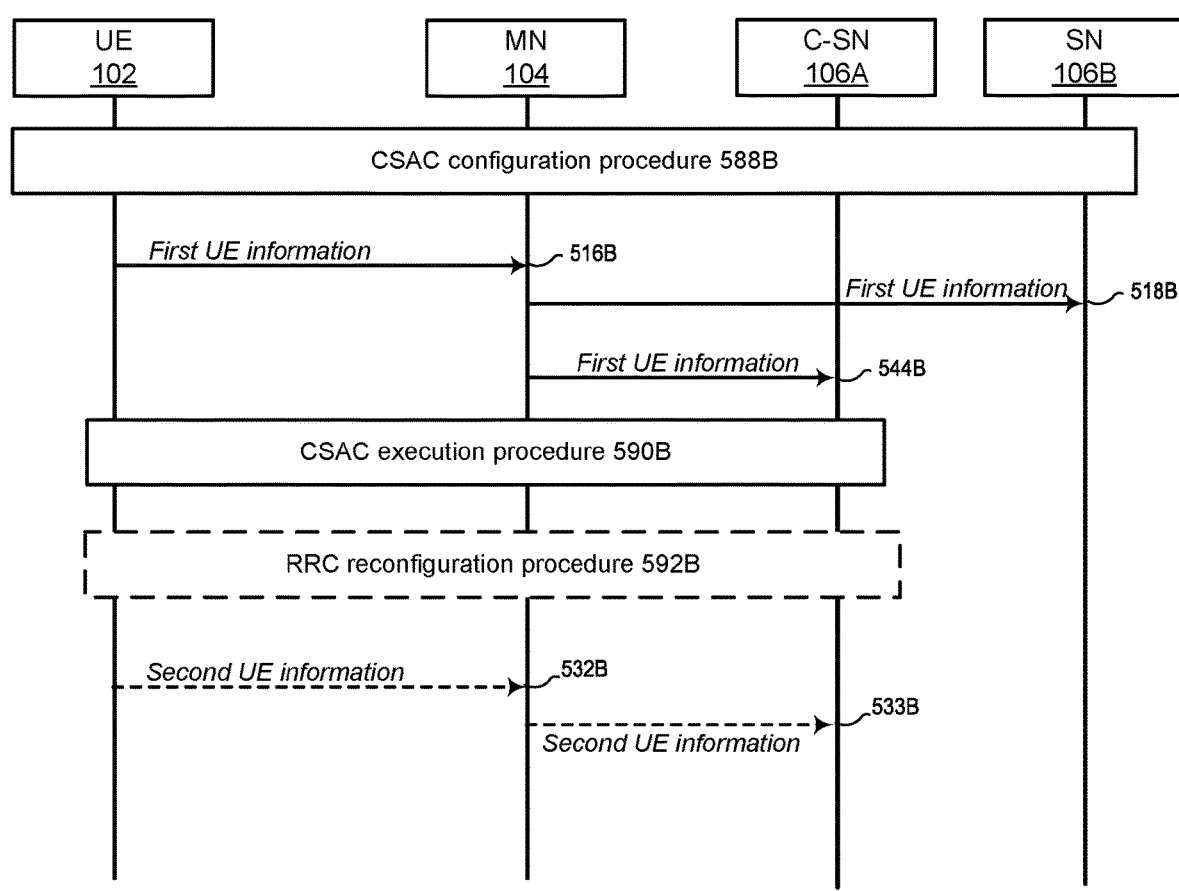

Referring next to FIG. 5B, in a scenario 500B, the base station 104 again operates as an MN, and the base stations 106A and 106B as C-SN and SN, respectively, in a CSAC procedure. Whereas FIG. 5A depicts an implementation in which the UE 102 re-sends UE information (at event 520A) to ensure that the C-SN 106B (when operating as SN 106B) receives the UE information, FIG. 5B depicts an alternative implementation in which the MN 104 forwards the UE information to the C-SN 106B.

Initially, the UE 102, MN 104, C-SN 106A, and SN 106B perform a CSAC configuration procedure 588B, which may be similar to CSAC configuration procedure 588A, for example. Later, but before the UE 102 determines that the condition associated with the conditional configuration has been satisfied, the UE 102 transmits 516B first UE information for an SN to the MN 104. The first UE information may be similar to any of the types of UE information discussed above, and the UE 102 may send 516B the first UE information in response to a trigger (e.g., detecting a situation or determining that a condition is met) similar to any of the triggers discussed above in connection with FIG. 3A, for example. In some implementations, the UE 102 sends 516B an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331. In some implementations, the UE 102 can send 516B an uplink RRC container message including this RRC message to the MN 104.

In scenarios where the UE 102 is in DC with the MN 104 and SN 106B, the MN 104 forward/sends 518B the first UE information to the SN 106B. In some implementations, the MN 104 sends 518B an RRC Transfer message including the first UE information to the SN 106B.

After receiving the first UE information at event 516B, and either before or after event 518B, the MN 104 forwards/sends 544B the first UE information to the C-SN 106A in a base station to base station (BS-to-BS) interface message (e.g., the X2 or Xn interface between base stations 104, 106A shown in FIG. 1A). Sometime after the UE 102 sends 518B the first UE information (e.g., any arbitrary amount of time later), when the condition associated with the CSAC procedure is satisfied (and either before or after event 544B depending on the implementation and/or scenario), the UE 102, MN 104, and C-SN 106A perform a CSAC execution procedure 590B, which may be similar to the CSAC execution procedure 590A of FIG. 5A.

In some implementations, the MN 104 sends 544B the first UE information to the C-SN 106A in response to receiving the first UE information at event 516B (e.g., immediately after receiving the first UE information at event 516B). In other implementations, the MN 104 sends 544B the first UE information to the C-SN 106A at a later time, such as during the CSAC execution procedure 590B. For example, the MN 104 may only send 544B the first UE information to the C-SN 106A after the MN 104 confirms that the CSAC procedure has been executed, and therefore avoids wasting resources by forwarding UE information in scenarios where the SN addition or change never occurs (e.g., due to the condition never being met, or the MN 104 causing the UE 102 to release the conditional configuration, etc.). Nonetheless, the MN 104 may send 544B the first UE information earlier, e.g., to allow the C-MN 106B to attempt to modify the conditional configuration, or for other reasons.

After the CSAC execution procedure 590B, the C-SN 106A (now SN 106A), the MN 104, and the UE 102 may perform RRC reconfiguration procedure 592B, which may be similar to RRC reconfiguration procedure 592A of FIG. 5A. Further, the UE 102 may, at some later time, send 532B other, second UE information to the MN 104, which may in turn forward/send 533B the second UE information to the SN 106A. The second UE information may include any of the various types of UE information discussed above, and may be sent by the UE 102 in response to any of the various types of triggers discussed above. In alternative scenarios, events 532B, 533B, and/or 592B do not occur.

The C-SN configuration that the MN 104 sends to the UE 102 (e.g., in CSAC configuration procedure 588B, at an event similar to event 512A), and the SN configuration that the MN 104 sends to the UE 102 (e.g., in RRC reconfiguration procedure 592B, at an event similar to event 526A), may be full or delta configurations, and may be similar to the configurations discussed above with reference to FIG. 5A.

Referring next to FIG. 5C, in a scenario 500C, the base station 104 again operates as an MN, and the base stations 106A and 106B as a C-SN and SN, respectively, in a CSAC procedure. In the implementation of FIG. 5C, however, the MN 104 ensures that the C-SN 106A receives the UE information not just by forwarding the UE information, but by sending the C-SN 106A an SN Request message that includes the UE information.

Initially, the UE 102, MN 104, C-SN 106A, and SN 106B perform a CSAC configuration procedure 588C, which may be similar to CSAC configuration procedure 588A, for example. Later, but before the UE 102 determines that the condition associated with the conditional configuration has been satisfied, the UE 102 transmits 516C first UE information for an SN to the MN 104. The first UE information may be similar to any of the types of UE information discussed above, and the UE 102 may send 516C the first UE information in response to a trigger (e.g., detecting a situation or determining that a condition is met) similar to any of the triggers discussed above in connection with FIG. 3A, for example. In some implementations, the UE 102 sends 516C an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331. In some implementations, the UE 102 can send 516C an uplink RRC container message including this RRC message to the MN 104.

In scenarios where the UE 102 is in DC with the MN 104 and SN 106B, the MN 104 forward/sends 518C the first UE information to the SN 106B. In some implementations, the MN 104 sends 518C an RRC Transfer message including the first UE information to the SN 106B.

After receiving the first UE information at event 516C, and either before or after event 518C, the MN 104 determines 554C to update the C-SN configuration in response to the first UE information. In response to the determination 554C, the MN 104 sends 556C the C-SN 106A an SN Request message that includes the first UE information. In response, the C-SN 106A generates 558C a second C-SN configuration for a C-PSCell (e.g., cell 126A) based on the first UE information, and sends 560C the MN 104 an SN Request Acknowledge message that includes the second C-SN configuration.

In alternative implementations, the SN Request message of event 556C does not include the first UE information. In these implementations, the MN 104 may instead determine (e.g., within event 554C) one or more configuration restrictions based on the first UE information. For example, the configuration restriction(s) may include maximum resource allocations such as a maximum number of SCells, a maximum number of MIMO layers, a maximum aggregated bandwidth, and so on. Other configuration restrictions are also possible (e.g., minimum scheduling offsets, impermissible modes, etc.). The MN 104 may then generate information indicative of the configuration restriction(s), and include that information in the SN Request message of event 556C. The C-SN 106A can then generate the second C-SN configuration, at event 558C, based on the indicated configuration restriction(s).

After event 560C, the MN 104 can send 562C the UE 102 an RRC reconfiguration message that includes the second C-SN configuration. In response, the UE 102 can send the MN 104 an RRC reconfiguration complete message. Events 554C, 556C, 558C, 560C, 562C, and 564C are collectively referred to herein as CSAC configuration update procedure 594C.

After the CSAC configuration update procedure 594C, the UE 102, MN 104, and C-SN 106A perform CSAC execution procedure 590C, which may be similar to CSAC execution procedure 590A of FIG. 5A, for example. After the CSAC execution procedure 590C, the UE 102 may, at some later time, send 532C other, second UE information to the MN 104, which may in turn forward/send 533C the second UE information to the C-SN 106A (now SN 106A). The second UE information may include any of the various types of UE information discussed above, and may be sent by the UE 102 in response to any of the various types of triggers discussed above. The SN 106A, the MN 104, and the UE 102 may perform RRC reconfiguration procedure 592C in accordance with the second UE information, which may be similar to RRC reconfiguration procedure 592A of FIG. 5A. In alternative scenarios, events 532C, 533C, and/or 592C do not occur.

The C-SN configuration that the MN 104 sends to the UE 102 (e.g., in CSAC configuration procedure 588C, at an event similar to event 512A), and the SN configuration that the MN 104 sends to the UE 102 (e.g., in RRC reconfiguration procedure 592C, at an event similar to event 526A), may be full or delta configurations, and may be similar to the configurations discussed above with reference to FIG. 5A.

Referring now to FIG. 5D, in a scenario 500D, the base station 104 again operates as an MN, and the base stations 106A and 106B as a C-SN and SN, respectively, in a CSAC procedure. In the implementation of FIG. 5D, however, neither the MN 104 nor the UE 102 (necessarily) ensures that the C-SN 106A receives the first UE information. Instead, the MN 104 causes the UE to release the C-SN configuration (e.g., cancels the CSAC procedure), and the MN 104 (optionally) reconfigures the UE 102 in accordance with the UE information.

Initially, the UE 102, MN 104, C-SN 106A, and SN 106B perform a CSAC configuration procedure 588D, which may be similar to the CSAC configuration procedure 588A of FIG. 5A. Later, but before the UE 102 determines that the condition associated with the conditional configuration has been satisfied, the UE 102 sends 516D first UE information to the MN 104. The first UE information may be similar to the first UE information described above with reference to FIG. 3A, and the UE 102 may send 516D the first UE information in response to a trigger (e.g., detecting a situation or determining that a condition is met) similar to any of the triggers discussed above in connection with FIG. 3A, for example. In some implementations, the UE 102 sends 516D an RRC message including the first UE information to the MN 104, such as a UEAssistanceInformation message, an InDeviceCoexIndication message, a SidelinkUEInformation message, or a SidelinkUEInformationNR message as specified in 3GPP specification 36.331 or 38.331.

In response to receiving the first UE information at event 516D, the MN 104 determines 572D to release the C-SN configuration. In response to the determination 572D, the MN 104 sends 574D the UE 102 an RRC reconfiguration message indicating (e.g., in an IE or field) that the UE 102 is to release the C-SN configuration.

In response to the indication in the RRC reconfiguration message, the UE 102 releases the C-SN configuration. After (e.g., in response to) releasing the C-SN configuration, or in response to receiving the RRC reconfiguration message, the UE 102 sends 576D the MN 104 an RRC reconfiguration complete message.

Also in response to the determination 572D, the MN 104 sends 578D an SN Release Request message to the C-SN 106A, which causes the C-SN 106A to release 580D the C-SN configuration. Events 578D and/or 580D may occur before event 574D, after event 576D, or between events 574D and 576D, for example. The C-SN 106A also sends 582D an SN Release Request Acknowledge message to the MN 104. Events 572D, 574D, 576D, 580D, and 582D are collectively referred to herein as CSAC configuration release procedure 596D.

In some scenarios, the MN 104 and UE 102 then perform an RRC reconfiguration procedure 593D. The RRC reconfiguration procedure 593D may be similar to the RRC reconfiguration procedure 592A, but takes place between the UE 102, MN 104, and possibly SN 106B rather than the UE 102, MN 104, and C-SN 106A. In the RRC reconfiguration procedure 593D, the SN 106B may determine to update a configuration for the SN 106B in accordance with the first UE information and/or the MN 104 may determine to update a configuration for the MN 104 in accordance with the first UE information.

Further, the UE 102 may, at some later time, send 532D other, second UE information to the MN 104, which may in turn forward/send 533D the second UE information to the SN 106B. The second UE information may include any of the various types of UE information discussed above, and may be sent by the UE 102 in response to any of the various types of triggers discussed above. In alternative scenarios, events 532D, 533D, and/or 593D do not occur.

FIGS. 5E through 5H correspond to the scenarios of FIGS. 5A through 5D, but in implementations and/or scenarios where the UE communicates the first UE information directly to the SNs.

Figure 5E:
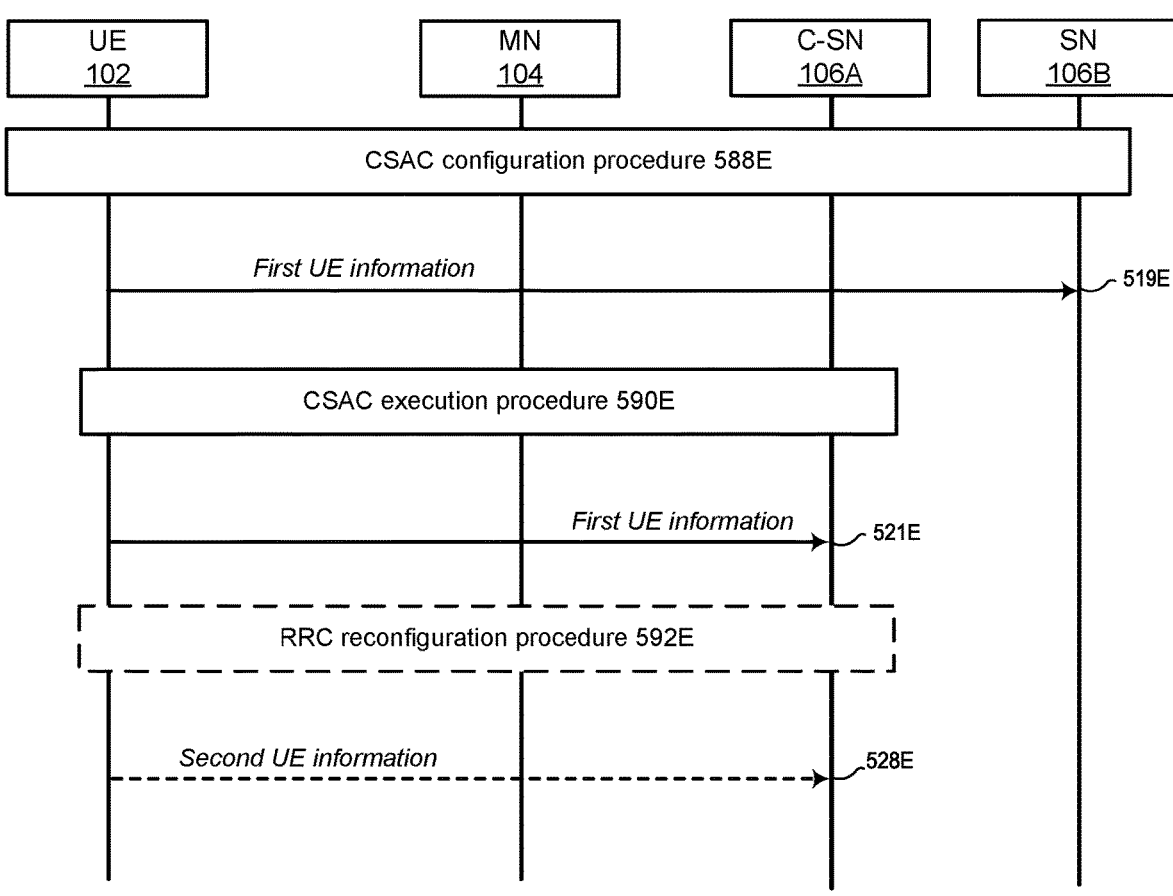

Referring first to FIG. 5E, in a scenario 500E, the UE 102, MN 104, C-SN 106A, and SN 106B initially perform CSAC configuration procedure 588E, which may be similar to CSAC configuration procedure 588A, for example. At some point in time after the CSAC configuration procedure 588E, the UE 102 sends 519E first UE information to the SN 106B directly via an SRB (e.g., SRB3). The first UE information may be similar to the first UE information described above with reference to FIG. 3A, and the UE 102 may send 519E the first UE information in response to a trigger (e.g., detecting a situation or determining that a condition is met) similar to any of the triggers discussed above in connection with FIG. 3A, for example. In some implementations, the UE 102 sends 519E an RRC message including the first UE information to the SN 106B, such as a UEAssistanceInformation message, an InDeviceCoexIndication message, a SidelinkUEInformation message, or a SidelinkUEInformationNR message as specified in 3GPP specification 36.331 or 38.331. In some implementations, the UE 102 may start a prohibit timer (e.g., t346a, t346b, t346c, t346d, t346e, t346f) in response to or after transmitting 519E the first UE information, similar to the description for event 316A.

At some point in time after event 519E, when the condition associated with the CSAC procedure is satisfied, the UE 102, MN 104, and C-SN 106A perform CSAC execution procedure 590E, which may be similar to CSAC execution procedure 590A, for example. The UE 102 then sends 521E the first UE information to the C-SN 106A directly via an SRB (e.g., SRB3). The UE 102 and C-SN 106A (now SN 106A) may then (optionally) perform RRC reconfiguration procedure 592E directly with the UE 102, rather than via the MN 104. The RRC reconfiguration procedure 592E may be similar to RRC reconfiguration procedure 592A. If the prohibit timer is running, the UE 102 stops the prohibit timer to send 521E the first UE information to the SN 106A. Thus, the UE 102 is not blocked by the running prohibit timer from sending 521E the first UE information to the SN 106A. Alternatively, if the prohibit timer is running, the UE 102 keeps the prohibit timer running and sends 521E the first UE information to the SN 106A while the prohibit timer is running. In either alternative above, the UE 102 starts or restarts the prohibit timer after transmitting 521E the first UE information to the SN 106A. Alternatively, if the UE 102 keeps the prohibit timer, the UE 102 does not start or restart the prohibit timer after transmitting 521E the first UE information to the SN 106A.

Further, the UE 102 may, at some later time, send 528E other, second UE information to the C-SN 106A. The second UE information may include any of the various types of UE information discussed above, and may be sent by the UE 102 in response to any of the various types of triggers discussed above. In alternative scenarios, events 528E and/or 592E do not occur.

In some scenarios and implementations, the UE 102 performs an immediate PSCell change to a target SN (e.g., base station 106A, 106B) instead of the CSAC execution procedure 590E. If the UE 102 performs the immediate PSCell change while or immediately after transmitting the first UE information at event 519E, the UE 102 may fail to transmit the first UE information to the SN 106B. In one scenario, the failure may be caused by that the UE 102 interrupts transmission of the first UE information to perform (the random access procedure in) the immediate PSCell change. In another scenario, the SN 106B may receive the first UE information after transmitting the target SN a SN Change Required message for preparing the immediate PSCell change. In one implementation, if the UE 102 has not received an acknowledgement (e.g., an RLC acknowledgement) for RLC PDU(s) including the first UE information from SN 106B before interrupting the transmission of the first UE information, the UE 102 can transmit the first UE information to the target SN after the immediate PSCell change, similar to event 521E. In another implementation, if the UE 102 transmitted the first UE information during the last X second(s) preceding conduct of the immediate PSCell change, reception of a PSCell change message for the immediate PSCell change, conduct of the random access procedure in the immediate PSCell change or transmission of a PSCell change complete message to the MN 104, the UE 102 may transmit the first UE information to the target SN (if the triggering condition for transmitting the first UE information is still satisfied), similar to event 521E. Otherwise, the UE 102 may not transmit the first UE information to the target SN after completing the immediate PSCell change. For example, X can be around 1 or 2. In another example, X can be within a range (e.g., 0.9 to 2). In another example, X is a suitable integer such as 1, 2, or 3. If the prohibit timer is running, the UE 102 stops the prohibit timer to send the first UE information to the target SN. Thus, the UE 102 is not blocked by the running prohibit timer from sending the first UE information to the target SN. Alternatively, if the prohibit timer is running, the UE 102 keeps the prohibit timer running and sends the first UE information to the target SN while the prohibit timer is running. In either alternative above, the UE 102 starts or restarts the prohibit timer after transmitting the first UE information to the target SN. Alternatively, if the UE 102 does not stop the prohibit timer, the UE 102 keeps the prohibit timer running. If the target SN is a gNB, the PSCell change command and PSCell change complete messages can be RRCReconfiguration and RRCReconfigurationComplete messages, respectively. The RRCReconfiguration message can include a ReconfigurationWithSync IE. If the target SN is an eNB or a ng-eNB, the PSCell change command and PSCell change complete messages can be RRCConnectionReconfiguration and RRCConnectionReconfigurationComplete messages, respectively. The RRCConnectionReconfiguration message can include a MobilityControlInfo IE.

Figure 5F:
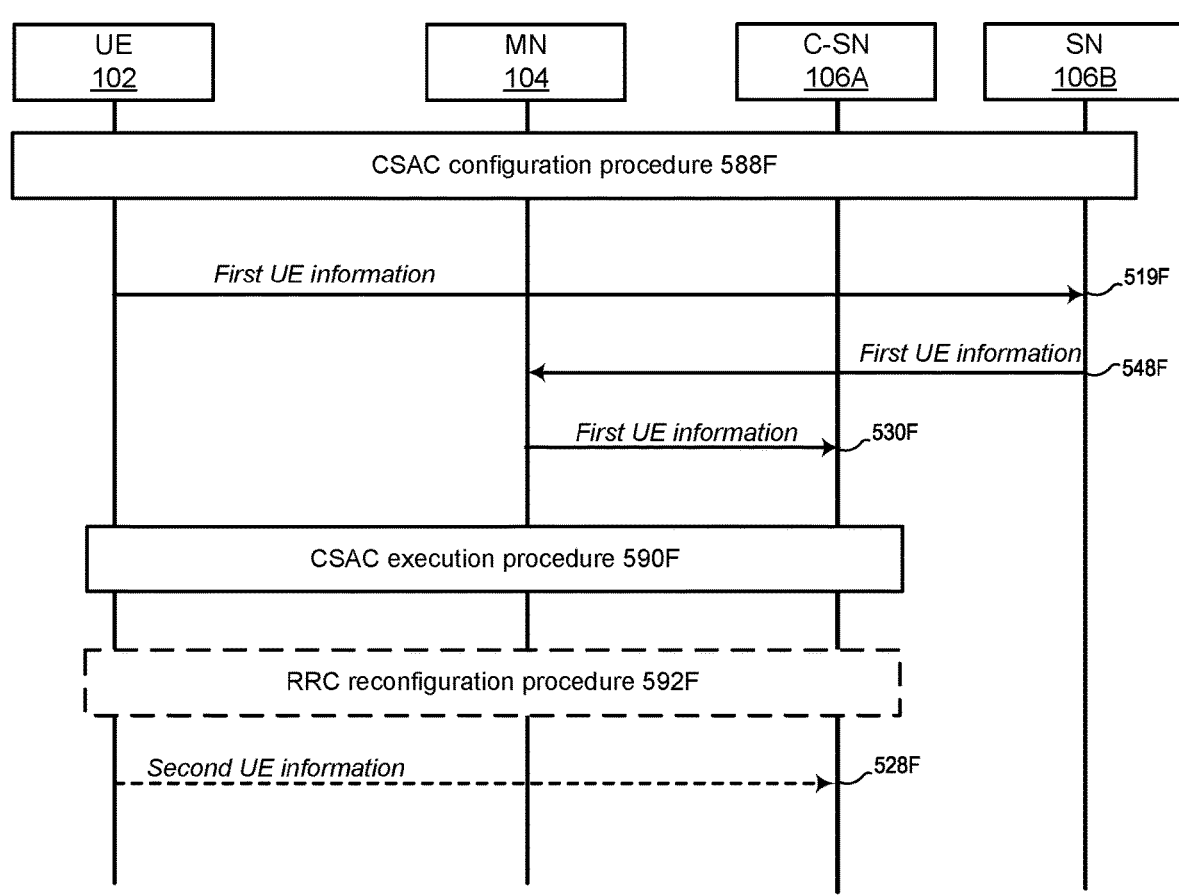

Referring next to FIG. 5F, in a scenario 500F, the UE 102, MN 104, C-SN 106A, and SN 106B initially perform CSAC configuration procedure 588F, which may be similar to CSAC configuration procedure 588A, for example. At some point in time after the CSAC configuration procedure 588F, the UE 102 sends 519F first UE information to the SN 106B directly via an SRB (e.g., SRB3). The first UE information may be similar to the first UE information described above with reference to FIG. 3A, and the UE 102 may send 519F the first UE information in response to a trigger (e.g., detecting a situation or determining that a condition is met) similar to any of the triggers discussed above in connection with FIG. 3A, for example. In some implementations, the UE 102 sends 519F an RRC message including the first UE information to the SN 106B, such as a UEAssistanceInformation message, an InDeviceCoexIndication message, a SidelinkUEInformation message, or a SidelinkUEInformationNR message as specified in 3GPP specification 36.331 or 38.331.

The SN 106B then forwards/sends 548F the first UE information to the MN 104, and the MN 104 then forwards/sends 530F the first UE information to the C-SN 106A. At some point in time after event 530F, when the condition associated with the CSAC procedure is satisfied, the UE 102, MN 104, and C-SN 106A perform CSAC execution procedure 590F, which may be similar to CSAC execution procedure 590A, for example. At some point in time after event 590F, the UE 102 and C-SN 106A (now SN 106A) may then (optionally) perform RRC reconfiguration procedure 592F directly with the UE 102, rather than via the MN 104, which may be similar to RRC reconfiguration procedure 592A.

Further, the UE 102 may, at some later time, send 528F other, second UE information to the C-SN 106A. The second UE information may include any of the various types of UE information discussed above, and may be sent 528F by the UE 102 in response to any of the various types of triggers discussed above. In alternative scenarios, events 528F and/or 592F do not occur.

Figure 5G:
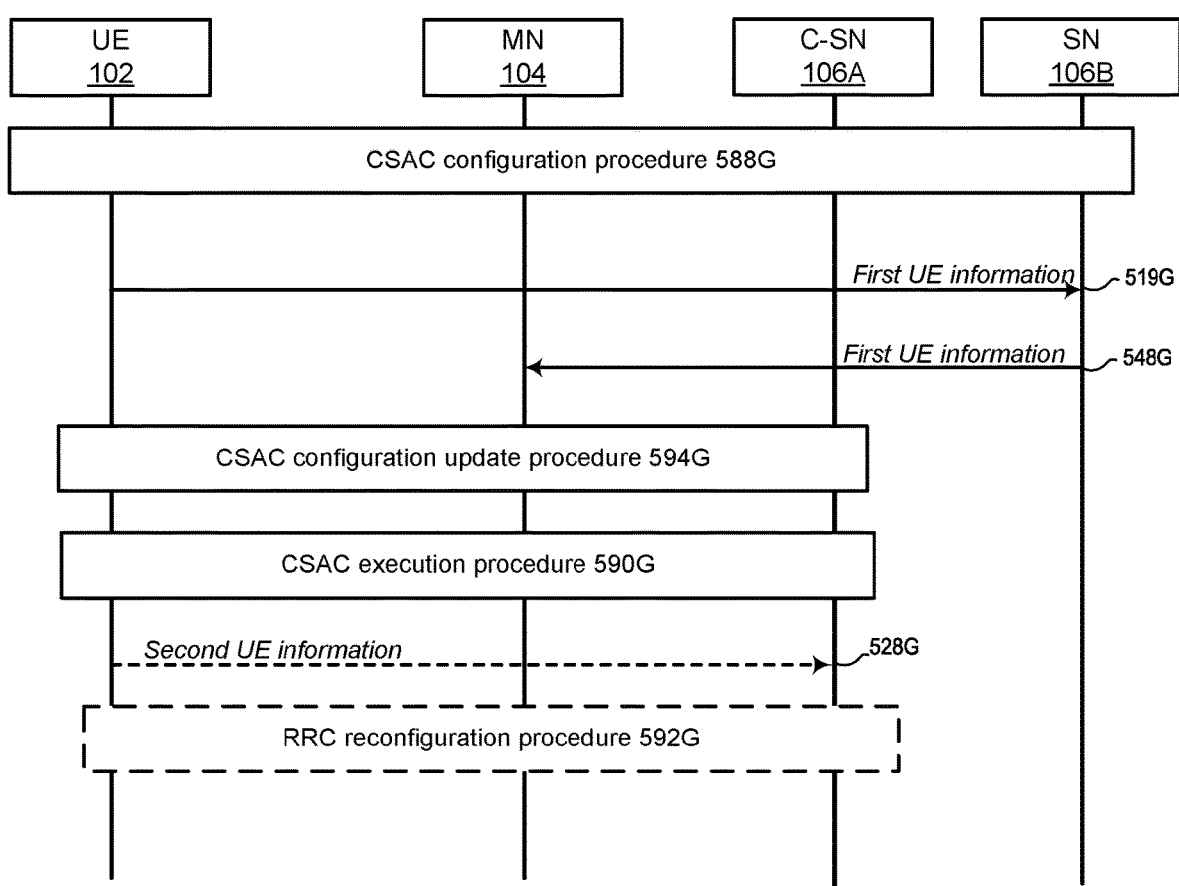

Referring next to FIG. 5G, in a scenario 500G, the UE 102, MN 104, C-SN 106A, and SN 106B initially perform CSAC configuration procedure 588G, which may be similar to CSAC configuration procedure 588A, for example. At some point in time after the CSAC configuration procedure 588G, the UE 102 sends 519G first UE information to the SN 106B directly via an SRB (e.g., SRB3). The first UE information may be similar to the first UE information described above with reference to FIG. 3A, and the UE 102 may send 519G the first UE information in response to a trigger (e.g., detecting a situation or determining that a condition is met) similar to any of the triggers discussed above in connection with FIG. 3A, for example. In some implementations, the UE 102 sends 519G an RRC message including the first UE information to the SN 106B, such as a UEAssistanceInformation message, an InDeviceCoexIndication message, a SidelinkUEInformation message, or a SidelinkUEInformationNR message as specified in 3GPP specification 36.331 or 38.331.

The SN 106B then forwards/sends 548G the first UE information to the MN 104. In response to event 548G, the MN 104 initiates a CSAC configuration update procedure 594G, which may be similar to CSAC configuration update procedure 594C of FIG. 5C.

At some point in time after the CSAC configuration update procedure 594G, when the condition associated with the CSAC procedure is satisfied, the UE 102, MN 104, and C-SN 106A perform CSAC execution procedure 590G, which may be similar to CSAC execution procedure 590A, for example.

At some point in time after event 590G, the UE 102 may send 528G other, second UE information to the C-SN 106A (now SN 106A). The second UE information may include any of the various types of UE information discussed above, and may be sent 528G by the UE 102 in response to any of the various types of triggers discussed above. The UE 102 and SN 106A may then (optionally) perform RRC reconfiguration procedure 592G directly (i.e., rather than via the MN 104) in accordance with the second UE information. The RRC reconfiguration procedure 592G may be similar to RRC reconfiguration procedure 592A. In alternative scenarios, events 528G and/or 592G do not occur.

Figure 5H:
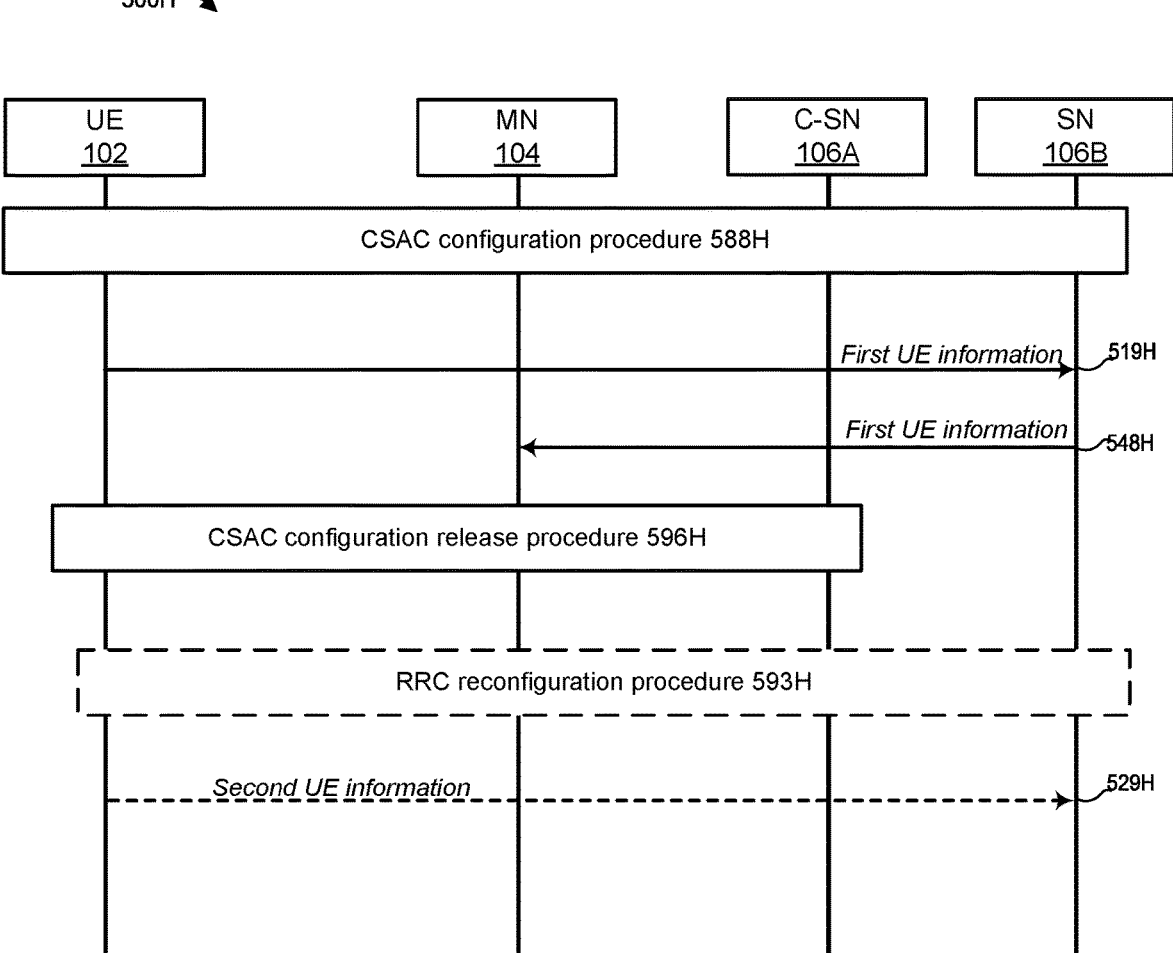

Referring next to FIG. 5H, in a scenario 500H, the UE 102, MN 104, C-SN 106A, and SN 106B initially perform CSAC configuration procedure 588H, which may be similar to CSAC configuration procedure 588A, for example. At some point in time after the CSAC configuration procedure 588H, the UE 102 sends 519H first UE information to the SN 106B. The first UE information may be similar to the first UE information described above with reference to FIG. 3A, and the UE 102 may send 519H the first UE information in response to a trigger (e.g., detecting a situation or determining that a condition is met) similar to any of the triggers discussed above in connection with FIG. 3A, for example. In some implementations, the UE 102 sends 519H an RRC message including the first UE information to the SN 106B, such as a UEAssistanceInformation message, an InDeviceCoexIndication message, a SidelinkUEInformation message, or a SidelinkUEInformationNR message as specified in 3GPP specification 36.331 or 38.331.

The SN 106B then forwards/sends 548H the first UE information to the MN 104. In response to event 548H, the MN 104 initiates a CSAC configuration release procedure 596H, which may be similar to CSAC configuration release procedure 596D of FIG. 5D.

At some point in time after the CSAC configuration release procedure 596G, the UE 102, MN 104, and SN 106B may (optionally) perform RRC reconfiguration procedure 593H with the UE 102 directly (i.e., rather than via the MN 104). The RRC reconfiguration procedure 593H may be similar to RRC reconfiguration procedure 593D, for example. Further, the UE 102 may, at some later time, send 529H other, second UE information to the SN 106B. The second UE information may include any of the various types of UE information discussed above, and may be sent 529H by the UE 102 in response to any of the various types of triggers discussed above. In alternative scenarios, events 529H and/or 593H do not occur.

In any of the above implementations and scenarios described above with reference to FIGS. 3A through 5H, the UE 102 is able to determine the conditional mobility procedure to which a received configuration pertains. In some cases, for example, the UE 102 determines whether a configuration (and thus, the associated mobility procedure) relates to an MN or an SN in a DC scenario, where (according to the terminology used herein) a single base station in SC scenarios can be considered to operate as an MN. To this end, the UE 102 can determine, for example, the SRB over which the RAN provided the configuration information. If the UE 102 receives the configuration information over an SRB1, the UE 102 may determine that the configuration information relates to an MN. Conversely, if the UE 102 receives the configuration information over an SRB3, the UE 102 may determine that the configuration information relates to an SN. In some implementations, a conditional configuration related to an MN pertains to a conditional handover, while a conditional configuration related to an SN pertains to a CPAC or a CSAC.

Additionally or alternatively, the UE 102 can use the current type of connectivity (e.g., SC, NE-DC, EN-DC, etc.) to determine the conditional mobility procedure to which the conditional configuration pertains. For example, when the UE 102 receives a conditional configuration in an EUTRA RRC message and the UE 102 is operating in SC, the UE 102 can determine that the conditional configuration relates to the MN (e.g., a conditional handover). However, when the UE 102 receives a conditional configuration in an EUTRA RRC message and the UE 102 is operating in NE-DC, the UE 102 can determine that the conditional configuration relates to the SN (e.g., a conditional addition or change procedure), because information that relates to the MN would have instead arrived via an NR message. More generally, the UE 102 can use the type of an RRC message carrying a conditional configuration to determine the conditional mobility procedure to which the conditional configuration pertains. For example, when the UE 102 receives a conditional configuration in an MN RRC message (i.e., an RRC message generated by the MN), the UE 102 can determine that the conditional configuration relates to the MN, and when the UE 102 receives a conditional configuration in a SN RRC message (i.e., an RRC message generated by the SN), the UE 102 can instead determine that the conditional configuration relates to the SN.

Moreover, the UE 102 can rely on a PDU, a message, an IE, a field, or a particular value that includes or references the conditional configuration to determine the conditional mobility procedure to which the conditional configuration pertains. For example, a base station can use a first field or value to indicate that the conditional mobility procedure is a conditional handover, a second field or value to indicate that the conditional mobility procedure is a conditional SN addition/change, and third field or value to indicate that the conditional mobility procedure is a conditional PSCell addition/change. In the discussion above, the terms "PDU," "message," "IE," and "field" can be used interchangeably, unless a more specific meaning is clear from the context of their use.

Further, the UE 102 can determine the conditional mobility procedure using an indication of the RAT via which the UE 102 received the conditional configuration. For example, when the UE 102 receives a conditional configuration via a relatively less-advanced RAT (e.g., EUTRA) while operating in SC or in certain types of DC, the UE 102 can determine that the conditional configuration must relate to the MN.

In general, the UE 102 can rely on any suitable combination of the techniques above, and/or other suitable techniques, to determine whether a conditional configuration relates to the MN or SN, and to determine whether the conditional mobility procedure is a conditional handover, a CSAC, a CPAC, or some other conditional mobility procedure.

FIGS. 6 through 13 are flow diagrams depicting methods for performing various techniques of this disclosure.

Referring first to FIG. 6, a method 600 may be implemented in a UE (e.g., UE 102) that is in communication with a RAN (e.g., RAN 105). For example, the method 600 may be implemented by processing hardware 150. In the method 600, at block 602, the UE receives a conditional configuration from the RAN (e.g., event 312A, 412A-2, or 512A).

At block 604, the UE determines that a first condition, for transmitting first UE information, is satisfied. At block 606, the UE transmits the first UE information to the RAN (e.g., event 316A, 416A-1, or 516A). At block 608, the UE determines that a second condition, for connecting to a candidate cell, is satisfied (e.g., event 334A, 434A, or 534A). At block 610, the UE connects to the candidate cell in accordance with the conditional configuration that was received at block 602 (e.g., as in procedure 390A, 490A, or 590A).

At block 612, the UE determines whether the first condition is still satisfied. If so, at block 614, the UE transmits the first UE information on the candidate call (e.g., event 320A, 420A-1, or 520A). If not, the UE transmits different, second UE information on the candidate cell, at block 616. Alternatively, the UE may not transmit any UE information to the RAN at block 616.

Figure 7A:
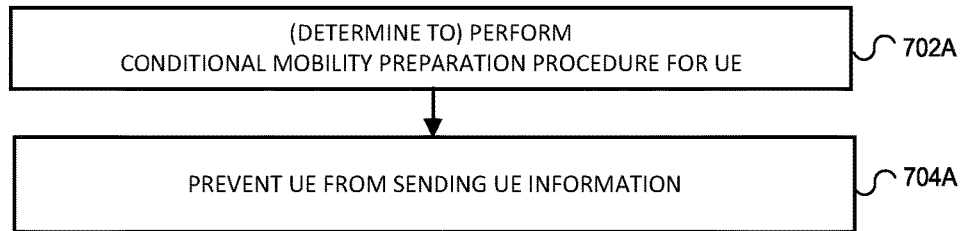
FIGS. 7A and 7B depict flow diagrams of methods for preventing a UE from sending UE information when the RAN has already prepared a conditional mobility procedure for the UE.

Referring next to FIG. 7A, a method 700A may be implemented in a RAN node (e.g., base station 104) that is in communication with a UE (e.g., UE 102). For example, the method 700A may be implemented by processing hardware 130. In the method 700A, at block 702A, the RAN node determines to perform, or performs, a conditional mobility preparation (e.g., CHO or CSAC) procedure for the UE. At block 704A, in response to the determining or performing at block 702A, the RAN node prevents the UE from sending UE information. For example, block 704A may include sending the UE an RRC message that disables a capability of the UE to generate and/or send UE information to the RAN.

Figure 7B:
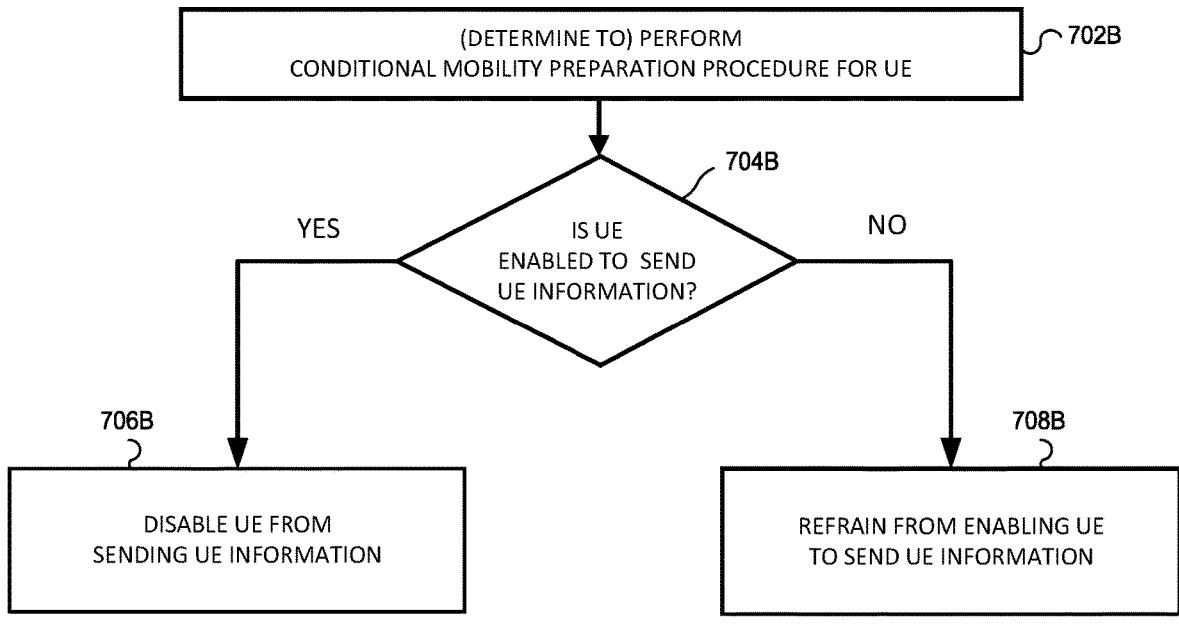

FIG. 7B depicts a method 700B, which is a more specific implementation of the method 700A. The method 700B may be implemented in a RAN node (e.g., base station 104) that is in communication with a UE (e.g., UE 102). For example, the method 700B may be implemented by processing hardware 130. In the method 700B, at block 702B, the RAN node determines to perform, or performs, a conditional mobility preparation (e.g., CHO or CSAC) procedure for the UE. At block 704B, the RAN node determines whether the UE is currently enabled to send UE information. If so, the RAN node disables the UE from sending UE information (e.g., by sending the UE an RRC message), at block 706B. If not, the RAN node refrains from enabling (e.g., determines not to enable) the UE to send UE information to the RAN, at block 708B.

Figure 8A:
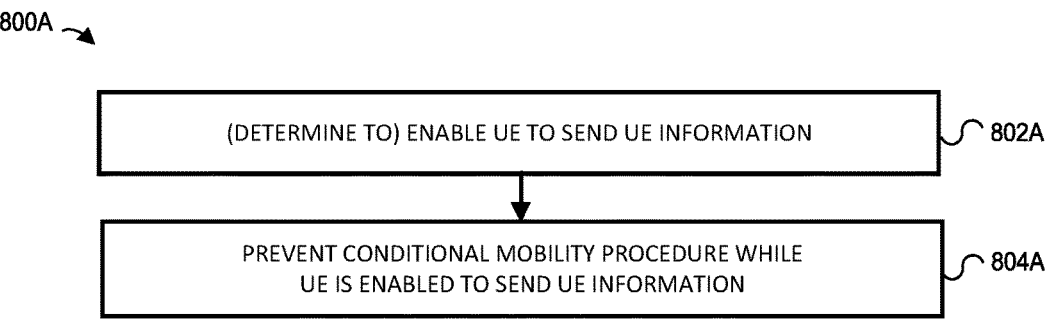
FIGS. 8A and 8B depict flow diagrams of methods for preventing execution of a conditional mobility procedure for a UE while the UE is enabled to send UE information.

Referring next to FIG. 8A, a method 800A may be implemented in a RAN node (e.g., base station 104) that is in communication with a UE (e.g., UE 102). For example, the method 800A may be implemented by processing hardware 130. In the method 800A, at block 802A, the RAN node determines to enable, or enables (e.g., by sending the UE an RRC message to the UE), the UE to send UE information to the RAN. At block 804A, in response to the determining or enabling at block 802A, the RAN node prevents a conditional mobility procedure from occurring while the UE is enabled to send UE information to the RAN. For example, block 804A may include the RAN node determining that conditions for a conditional mobility procedure (e.g., a CHO or CSAC procedure) have been met, but then determining to nonetheless refrain from initiating the conditional mobility procedure based on information, stored at the RAN node, indicating that the UE is currently enabled to send UE information to the RAN. Alternatively, block 804A may include causing the UE to release a conditional configuration (e.g., by sending the UE an RRC message).

Figure 8B:
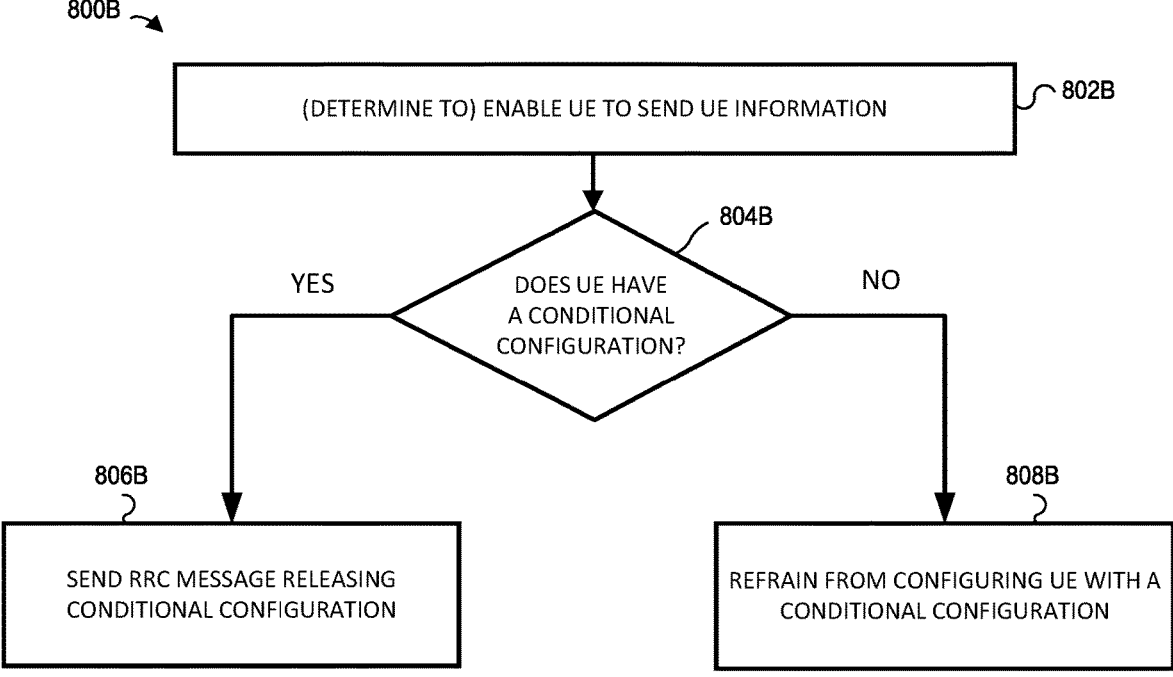

FIG. 8B depicts a method 800B, which is a more specific implementation of the method 800A. The method 800B may be implemented in a RAN node (e.g., base station 104) that is in communication with a UE (e.g., UE 102). For example, the method 800B may be implemented by processing hardware 130. In the method 800B, at block 802B, the RAN node determines to enable, or enables (e.g., by sending the UE an RRC message), the UE to send UE information. In response to the determining or enabling at block 802B, at block 804B, the RAN node determines whether the UE has a conditional configuration. If so, the RAN node sends the UE an RRC message releasing the conditional configuration (e.g., similar to event 358D, 458D-2, or 574D), at block 806B. If not, the RAN node refrains from configuring (e.g., determines not to configure) the UE with a conditional configuration, at block 808B.

Figure 9:
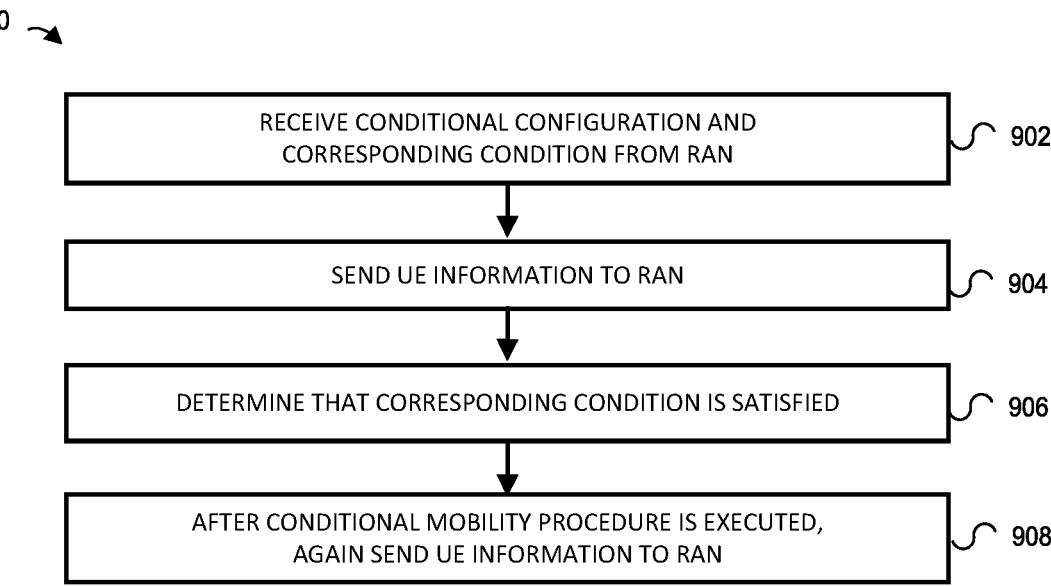
FIGS. 9 through 11 depict flow diagrams of methods for providing, to a candidate node, UE information that a UE had sent to a source node after the RAN had prepared a conditional mobility procedure for the UE.

Referring next to FIG. 9, a method 900 may be implemented in a UE (e.g., UE 102) communicating with a RAN (e.g., RAN 105). For example, the method 900 may be implemented by processing hardware 150. At block 902, the UE receives a conditional configuration and a corresponding condition for a conditional mobility procedure from the RAN (e.g., event 312A, 412A-2, or 512A, or in procedure 588E). At block 904, before the UE determines that the corresponding condition is satisfied, the UE sends UE information to the RAN (e.g., event 316A, 416A-1, 516A, or 519E). At block 906, the UE determines that the corresponding condition is satisfied (e.g., event 334A, 434A, 534A, or in procedure 590E). At block 908, after the conditional mobility procedure is executed, the UE again sends the UE information to the RAN (e.g., event 320A, 420A-1, 520A, or 521E).

Figure 10:
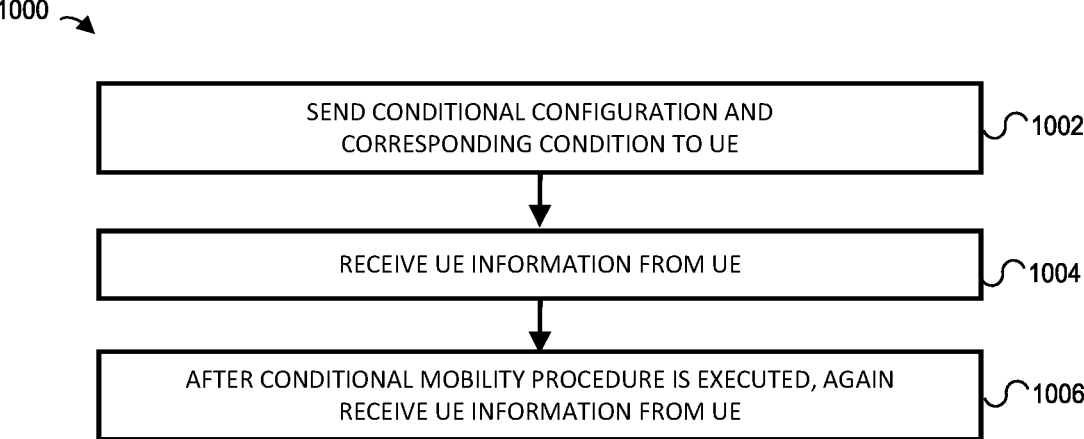

Referring next to FIG. 10, a method 1000 may be implemented in one or more RAN nodes (e.g., base station 104 and base station 106A or 106B, or a CU and DU of a distributed base station) communicating with a UE (e.g., UE 102). For example, the method 1000 may be implemented by processing hardware 130. At block 1002, the RAN node(s) send a conditional configuration and a corresponding condition for a conditional mobility procedure to the UE (e.g., event 312A, 412A-2, or 512A, or in procedure 588E). At block 1004, the RAN node(s) receive UE information from the UE (e.g., event 316A, 416A-1, 516A, or 519E). At block 1006, after the conditional mobility procedure is executed, the RAN node(s) again receive UE information (e.g., event 320A, 420A-1, 520A, 521E).

Figure 11:
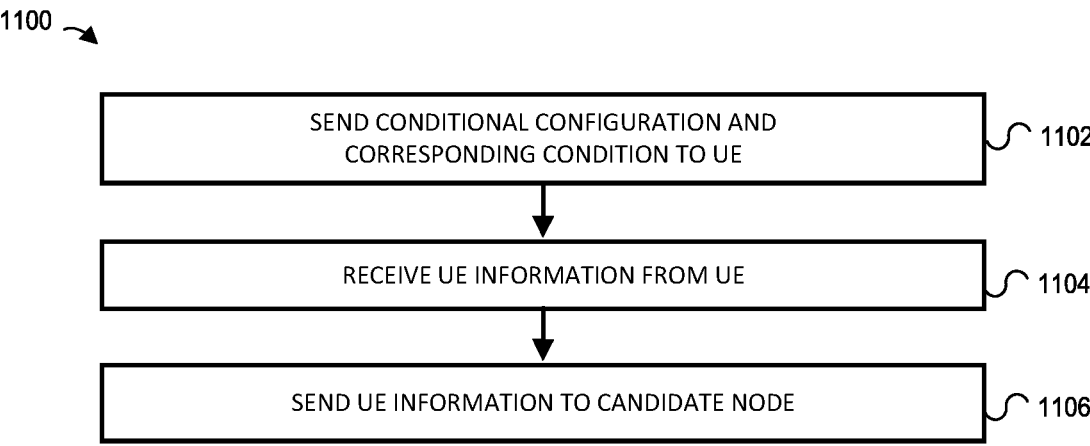

Referring next to FIG. 11, a method 1100 may be implemented in a RAN node (e.g., base station 104 or a CU of a distributed base station) communicating with a UE (e.g., UE 102). For example, the method 1100 may be implemented by processing hardware 130. At block 1102, the RAN node sends a conditional configuration and a corresponding condition for a conditional mobility procedure to the UE (e.g., within procedure 388B, 388C, 488B, 488C, 588B, 588C, 588F, or 588G). Later, at block 1104, the RAN node receives UE information from the UE (e.g., event 316B, 316C,

416B-1, 416C-1/416C-2, 516B, 516C, 519F, or 519G/ 548G). Later, at block 1106, the RAN node sends the UE information to a candidate node (e.g., event 318B, 346C, 446C, 544B, 556C, or 548F, or within procedure 492B or 594G).

Figure 12:
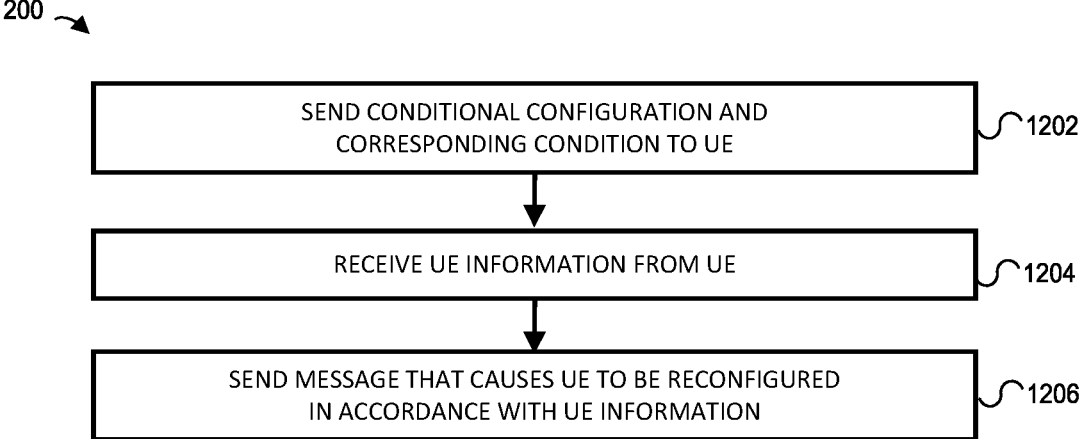
FIG. 12 depicts a flow diagram of a method for reconfiguring a UE in accordance with UE information that the UE had sent to a source node after the RAN had prepared a conditional mobility procedure for the UE.

Referring next to FIG. 12, a method 1200 may be implemented in a RAN node (e.g., base station 104 or a CU of a distributed base station) communicating with a UE (e.g., UE 102). For example, the method 1200 may be implemented by processing hardware 130. At block 1202, the RAN node sends a conditional configuration and a corresponding condition for a conditional mobility procedure to the UE (e.g., within procedure 388C, 488C, or 588C). Later, at block 1204, the RAN node receives UE information from the UE (e.g., event 316C, 416C-1/416C-2, or 516C). Later, at block 1206, the RAN node sends a message that causes the UE to be reconfigured in accordance with the UE information (e.g., event 346C, 446C, or 556C).

Figure 13:
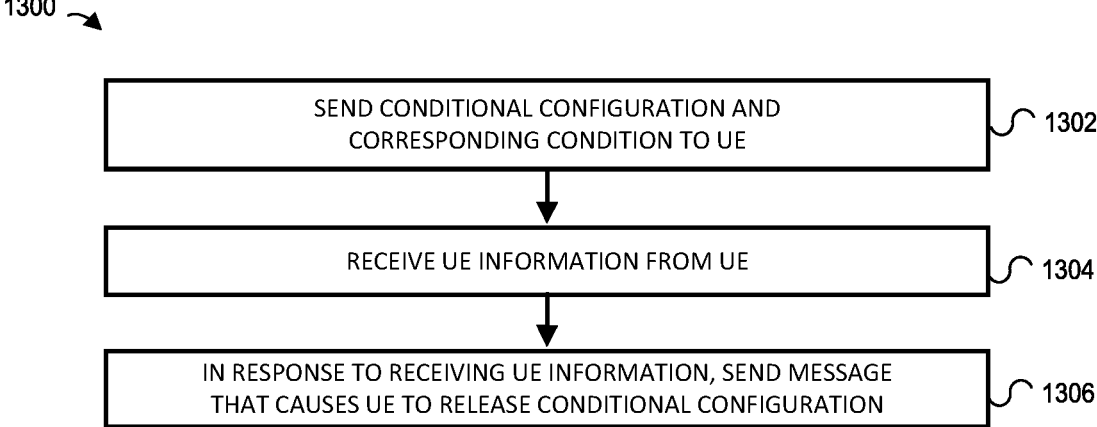
FIG. 13 depicts a flow diagram of a method for preventing execution of a conditional mobility procedure when the UE sends UE information to a source node after the RAN had prepared a conditional mobility procedure for the UE.

Referring next to FIG. 13, a method 1300 may be implemented in a RAN node (e.g., base station 104 or a CU of a distributed base station) communicating with a UE (e.g., UE 102). For example, the method 1300 may be implemented by processing hardware 130. At block 1302, the RAN node sends a conditional configuration and a corresponding condition for a conditional mobility procedure to the UE (e.g., within procedure 388D, 488D, or 588D). Later, at block 1304, the RAN node receives UE information from the UE (e.g., event 316D, 416D-1/416D-2, or 516D). Later, at block 1306 and in response to receiving the UE information, the RAN node sends a message that causes the UE to release the conditional configuration (e.g., event 358D, 458D-1/458D-2, or 574D).

The following sections, in the format of 3GPP "change requests" (CRs), provide examples of ways in which various aspects described herein may be incorporated into 3GPP specifications (specifically, 3GPP specifications 36.331 and 38.331, release 16).

5.3.5.4 Reception of an RRCConnectionReconfiguration Including the mobilityControlInfo by the UE (Handover)

If the RRCConnectionReconfiguration message includes the mobilityControlInfo and the UE is able to comply with the configuration included in this message, the UE shall:
1> if daps-HO is not configured for any DRB:
    2> stop timer T310, if running;
    2> stop timer T312, if running;
    2> if timer T316 is running:
        3> stop timer T316;
        3> clear the information included in VarRLF-Report, if any;
    2> resume MCG transmission, if suspended;
1> start timer T304 with the timer value set to t304, as included in the mobilityControlInfo;
1> stop timer T370, if running;
1> if the carrierFreq is included:
    2> consider the target PCell to be one on the frequency indicated by the carrierFreq with a physical cell identity indicated by the targetPhysCellId;
1> else:
    2> consider the target PCell to be one on the frequency of the source PCell with a physical cell identity indicated by the targetPhysCellId;
1> if T309 is running:
    2> stop timer T309 for all access categories;
    2> perform the actions as specified in 5.3.16.4.
1> start synchronising to the DL of the target PCell;
NOTE 1: The UE should perform the handover as soon as possible following the reception of the RRC message triggering the handover, which could be before confirming successful reception (HARQ and ARQ) of this message.

1> if BL UE or UE in CE:

2> if sameSFN-Indication is not present in mobility-ControlInfo:

3> acquire the MasterInformationBlock in the target PCell;

1> if makeBeforeBreak is configured:

2> perform the remainder of this procedure including and following resetting MAC after the UE has stopped the uplink transmission/downlink reception with the source PCell;

NOTE 1a: It is up to UE implementation when to stop the uplink transmission/downlink reception with the source PCell to initiate re-tuning for connection to the target cell, as specified in TS 36.133 [16], if makeBeforeBreak is configured.

NOTE 1b: It is up to UE implementation when to stop the uplink transmission/downlink reception with the source SCell(s) after receiving RRCConnectionReconfiguration message.

1> if daps-HO is configured for any DRB:

2> establish a MAC entity for the target PCell, with the same configuration as the MAC entity for the source PCell;

2> for each DRB configured with daps-HO:

3> establish the RLC entity or entities and the associated DTCH logical channel for the target PCell, with the same configurations as for the source PCell;

3> reconfigure the PDCP entity to configure DAPS as specified in TS36.323 [8].

2> for each DRB not configured with daps-HO:

3> re-establish PDCP;

3> re-establish the RLC entity and associate it, and the associated DTCH logical channel, to the target PCell;

2> for each SRB:

3> establish a PDCP entity for the target PCell, with the same configuration as the PDCP entity for the source PCell;

3> establish an RLC entity and an associated DCCH logical channel for the target PCell, with the same configuration as for the source PCell;

3> suspend the SRBs for the source PCell;

NOTE 1c: In order to understand if a daps-HO is configured, the UE needs to check the presence of the field daps-HO within the received RadioResourceConfigDedicated IE.

1> else (if daps-HO is not configured):

2> reset MCG MAC and SCG MAC, if configured;

2> release uplinkDataCompression, if configured;

2> re-establish PDCP for all RBs configured with pdcp-config that are established;

NOTE 2: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].

NOTE 2a: At handover the reestablishPDCP flag will be set for all RBs configured with NR PDCP in nr-RadioBearerConfig1 or nr-RadioBearerConfig2 TS 38.331 which will cause the PDCP entity to be re-established also for these RBs.

2> re-establish MCG RLC and SCG RLC, if configured, for all RBs that are established;

1> for each SCell configured for the UE other than the PSCell:

2> if the received RRCConnectionReconfiguration message includes sCellState for the SCell and indicates activated:

3> configure lower layers to consider the SCell to be in activated state;

2> else if the received RRCConnectionReconfiguration message includes sCellState for the SCell and indicates dormant:

3> configure lower layers to consider the SCell to be in dormant state;

2> else:

3> configure lower layers to consider the SCell to be in deactivated state;

1> apply the value of the newUE-Identity as the C-RNTI in the target MCG;

1> if the RRCConnectionReconfiguration message includes the fullConfig:

2> perform the radio configuration procedure as specified in 5.3.5.8; 1> configure lower layers in accordance with the received radioResourceConfigCommon;

1> if the received RRCConnectionReconfiguration message includes the rach-Skip:

2> configure lower layers to apply the rach-Skip for the target MCG, as specified in TS 36.213 and 36.321 [6];

1> configure lower layers in accordance with any additional fields, not covered in the previous, if included in the received mobilityControlInfo;

1> if the received RRCConnectionReconfiguration includes the sCellToReleaseList:

2> perform SCell release as specified in 5.3.10.3a;

1> if the received RRCConnectionReconfiguration includes the sCellGroupToReleaseList:

2> perform SCell group release as specified in 5.3.10.3d;

1> if the received RRCConnectionReconfiguration includes the scg-Configuration; or 1> if the current UE configuration includes one or more split DRBs and the received RRCConnectionReconfiguration includes radioResourceConfigDedicated including drb-ToAddModList:

2> perform SCG reconfiguration as specified in 5.3.10.10;

1> if the RRCConnectionReconfiguration message includes the radioResourceConfigDedicated:

2> perform the radio resource configuration procedure as specified in 5.3.10;

1> if the securityConfigHO (without suffix) is included in the RRCConnectionReconfiguration:

2> if the keyChangeIndicator received in the securityConfigHO is set to TRUE:

3> update the $K_{eNB}$ key based on the $K_{ASME}$ key taken into use with the latest successful NAS SMC procedure, as specified in TS 33.401 [32];

2> else:

3> update the $K_{eNB}$ key based on the current $K_{eNB}$ or the NH, using the nextHopChainingCount value indicated in the securityConfigHO, as specified in TS 33.401 [32];

NOTE 2b: If the UE needs to update the S-$K_{eNB}$ key as specified in 5.3.10.10, the UE updates the S-$K_{eNB}$ after updating the $K_{eNB}$ key.

2> store the nextHopChainingCount value;

2> if the securityAlgorithmConfig is included in the securityConfigHO:

3> derive the $K_{RRcint}$ key associated with the integrityProtAlgorithm, as specified in TS 33.401 [32];

3> if connected as an RN:

4> derive the $K_{UPint}$ key associated with the integrityProtAlgorithm, as specified in TS 33.401 [32];

3> derive the $K_{RRcenc}$ key and the $K_{UPenc}$ key associated with the cipheringAlgorithm, as specified in TS 33.401 [32];

2> else:

3> derive the $K_{RRcint}$ key associated with the current integrity algorithm, as specified in TS 33.401 [32];

3> if connected as an RN:

4> derive the $K_{UPint}$ key associated with the current integrity algorithm, as specified in TS 33.401 [32];

3> derive the $K_{RRcenc}$ key and the $K_{UPenc}$ key associated with the current ciphering algorithm, as specified in TS 33.401 [32];

2> configure lower layers to apply the integrity protection algorithm and the $K_{RRcint}$ key, i.e. the integrity protection configuration shall be applied to all subsequent messages received and sent by the UE, including the message used to indicate the successful completion of the procedure;

2> configure lower layers to apply the ciphering algorithm, the $K_{RRcenc}$ key and the $K_{UPenc}$ key, i.e. the ciphering configuration shall be applied to all subsequent messages received and sent by the UE, including the message used to indicate the successful completion of the procedure;

NOTE 2c: For a DRB configured for DAPS HO, the new ciphering algorithm and the $K_{UPenc}$ key is applied for traffic exchange between the UE and the target MCG while the old ciphering algorithm and $K_{UPenc}$ key is applied for traffic exchange between the UE and the source MCG.

1> else if the securityConfigHO-v1530 is included in the RRCConnectionReconfiguration:

2> if the nas-Container is received:

3> forward the nas-Container to upper layers;

2> if the keyChangeIndicator-r15 is received and is set to TRUE:

3> update the $K_{eNB}$ key based on the KAMF key, as specified in TS 33.501 [86];

2> else:

3> update the $K_{eNB}$ key based on the current $K_{eNB}$ or the NH, using the received nextHopChainingCount-r15, as specified in TS 33.501 [86];

2> store the nextHopChainingCount-r15 value;

2> if the securityAlgorithmConfig-r15 is received:

3> derive the $K_{RRcint}$ key associated with the integrityProtAlgorithm, as specified in TS 33.401 [32];

3> derive the $K_{RRcenc}$ key and the $K_{UPenc}$ key associated with the cipheringAlgorithm, as specified in TS 33.401 [32];

2> else:

3> derive the $K_{RRcint}$ key associated with the current integrity algorithm, as specified in TS 33.401 [32];

3> derive the $K_{RRcenc}$ key and the $K_{UPenc}$ key associated with the current ciphering algorithm, as specified in TS 33.401 [32];

1> if the received RRCConnectionReconfiguration includes the nr-Config and it is set to release; or 1> if the received RRCConnectionReconfiguration includes endc-ReleaseAndAdd and it is set to TRUE:

2> perform MR-DC release as specified in TS 38.331 [82], clause 5.3.5.10;

1> if the received RRCConnectionReconfiguration includes the sk-Counter:

2> perform key update procedure as specified in in TS 38.331 [82], clause 5.3.5.7;

1> if the received RRCConnectionReconfiguration includes the nr-SecondaryCellGroupConfig:

2> perform NR RRC Reconfiguration as specified in TS 38.331 [82], clause 5.3.5.3.

1> if the received RRCConnectionReconfiguration includes the nr-RadioBearerConfig1:

2> perform radio bearer configuration as specified in TS 38.331 [82], clause 5.3.5.6;

1> if the received RRCConnectionReconfiguration includes the nr-RadioBearerConfig2:

2> perform radio bearer configuration as specified in TS 38.331 [82], clause 5.3.5.6.

1> if connected as an RN:

2> configure lower layers to apply the integrity protection algorithm and the $K_{UPint}$ key, for current or subsequently established DRBs that are configured to apply integrity protection, if any;

1> if the received RRCConnectionReconfiguration includes the sCellToAddModList:

2> perform SCell addition or modification as specified in 5.3.10.3b;

1> if the received RRCConnectionReconfiguration includes the sCellGroupToAddModList:

2> perform SCell group addition or modification as specified in 5.3.10.3e;

1> if the received RRCConnectionReconfiguration includes the systemInformationBlockType1Dedicated:

2> preform the actions upon reception of the SystemInformationBlockType1 message as specified in 5.2.2.7;

1> perform the measurement related actions as specified in 5.5.6.1;

1> if the RRCConnectionReconfiguration message includes the measConfig:

2> perform the measurement configuration procedure as specified in 5.5.2;

1> perform the measurement identity autonomous removal as specified in 5.5.2.2a;

1> release reportProximityConfig and clear any associated proximity status reporting timer;

1> if the RRCConnectionReconfiguration message includes the otherConfig:

2> perform the other configuration procedure as specified in 5.3.10.9;

1> if the RRCConnectionReconfiguration message includes the sl-DiscConfig or sl-CommConfig:

2> perform the sidelink dedicated configuration procedure as specified in 5.3.10.15;

1> if the RRCConnectionReconfiguration message includes wlan-OffloadInfo:

2> perform the dedicated WLAN offload configuration procedure as specified in 5.6.12.2;

1> if handoverWithoutWT-Change is not configured:

2> release the LWA configuration, if configured, as described in 5.6.14.3;

1> release the LWIP configuration, if configured, as described in 5.6.17.3;

1> if the RRCConnectionReconfiguration message includes rclwi-Configuration:

2> perform the WLAN traffic steering command procedure as specified in 5.6.16.2;
1> if the RRCConnectionReconfiguration message includes lwa-Configuration:
  2> perform the LWA configuration procedure as specified in 5.6.14.2;
1> if the RRCConnectionReconfiguration message includes lwip-Configuration:
  2> perform the LWIP reconfiguration procedure as specified in 5.6.17.2;
1> if the RRCConnectionReconfiguration message includes the sl-V2X-ConfigDedicated or mobilityControlInfoV2X:
  2> perform the V2X sidelink communication dedicated configuration procedure as specified in 5.3.10.15a;
NOTE 2d: In case of conditional reconfiguration the text "if the received RRCConnectionReconfiguration . . ." corresponds to applying the stored RRCConnectionReconfiguration message (according to 5.3.5.9.5).
1> if the UE is configured to operate in EN-DC as result of this procedure, forward upperLayerIndication, as if the UE receives this field from SIB2, to upper layers, otherwise indicate upper layers absence of this field;
1> set the content of RRCConnectionReconfigurationComplete message as follows:
  2> if the UE has radio link failure or handover failure information available in VarRLF-Report and if the RPLMN is included in plmn-IdentityList stored in VarRLF-Report:
    3> include rlf-InfoAvailable;
  2> if the UE has MBSFN logged measurements available for E-UTRA and if the RPLMN is included in plmn-IdentityList stored in VarLogMeasReport and if T330 is not running:
    3> include logMeasAvailableMBSFN;
  2> else if the UE has logged measurements available for E-UTRA and if the RPLMN is included in Ann-IdentityList stored in VarLogMeasReport:
    3> include the logMeasAvailable;
  2> if the UE has Bluetooth logged measurements available and if the RPLMN is included in Ann-IdentityList stored in VarLogMeasReport:
    3> include logMeasAvailableBT;
  2> if the UE has WLAN logged measurements available and if the RPLMN is included in Ann-IdentityList stored in VarLogMeasReport:
    3> include logMeasAvailableWLAN;
  2> if the UE has connection establishment failure information available in VarConnEstFailReport and if the RPLMN is equal to Minn-Identity stored in VarConnEstFailReport:
    3> include connEstFailInfoAvailable;
  2> if the RRCConnectionReconfiguration message includes perCC-GapIndicationRequest:
    3> include perCC-GapIndicationList and numFreqEffective;
  2> if the frequencies are configured for reduced measurement performance:
    3> include numFreqEffectiveReduced;
  2> if the UE has flight path information available:
    3> include flightPathInfoAvailable;
  2> if the received RRCConnectionReconfiguration message included nr-SecondaryCellGroupConfig:
1> submit the RRCConnectionReconfigurationComplete message to lower layers for transmission;
1> if MAC successfully completes the random access procedure; or 1> if MAC indicates the successful reception of a PDCCH transmission addressed to C-RNTI and if rach-Skip is configured:
  2> stop timer T304;
  2> if daps-HO is configured for any DRB:
    3> stop timer T310, if running;
    3> stop timer T312, if running;
    3> for each DAPS bearer trigger UL data switching, as specified in TS 36.323 [8];
  2> release rach-Skip;
  2> apply the parts of the CQI reporting configuration, the scheduling request configuration and the sounding RS configuration that do not require the UE to know the SFN of the target PCell, if any;
  2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;
NOTE 3: Whenever the UE shall setup or reconfigure a configuration in accordance with a field that is received it applies the new configuration, except for the cases addressed by the above statements.
  2> if the UE is configured to provide IDC indications:
    3> if the UE has transmitted an InDeviceCoexIndication message during the last 1 second preceding reception of the RRCConnectionReconfiguration message including mobilityControlInfo: or
    3> if the UE transmitted an InDeviceCoexIndication message after reception of the conditional reconfiguration including the RRCConnectionReconfiguration message:
      4> initiate transmission of the InDeviceCoexIndication message in accordance with 5.6.9.3;
  2> if the UE is configured to provide power preference indications, overheating assistance information, SPS assistance information, delay budget report or maximum bandwidth preference indications:
    3> if the UE has transmitted a UEAssistanceInformation message during the last 1 second preceding reception of the RRCConnectionReconfiguration message including mobilityControlInfo: or
    3> if the UE transmitted a UEAssistanceInformation message after reception of the conditional reconfiguration including the RRCConnectionReconfiguration message:
      4> initiate transmission of the UEAssistanceInformation message in accordance with 5.6.10.3;
  2> if SystemInformationBlockType15 is broadcast by the PCell:
    3> if the UE has transmitted a MBMSInterestIndication message during the last 1 second preceding reception of the RRCConnectionReconfiguration message including mobilityControlInfo: or
    3> if the UE transmitted a MBMSInterestIndication message after reception of the conditional reconfiguration including the RRCConnectionReconfiguration message:
      4> ensure having a valid version of SystemInformationBlockType15 for the PCell;
      4> determine the set of MBMS frequencies of interest in accordance with 5.8.5.3;
      4> determine the set of MBMS services of interest in accordance with 5.8.5.3a;
      4> initiate transmission of the MBMSInterestIndication message in accordance with 5.8.5.4;

2> if SystemInformationBlockType18 is broadcast by the target PCell; and the UE transmitted a Side-linkUEInformation message indicating a change of sidelink communication related parameters relevant in target PCell (i.e. change of commRxInterested-Freq or commTxResourceReq, cortunTxRe-sourceReqUC if SystemInformationBlockType18 includes cortnTxResourceUC-ReqAllowed or cor-tunTxResourceInfoReqRelay if PCell broadcasts SystemInformationBlockType19 including discCon-figRelay) during the last 1 second preceding recep-tion of the RRCConnectionReconfiguration message including mobilityControlInfo; or 2> if SystemInformationBlockType19 is broadcast by the target PCell; and the UE transmitted a Side-linkUEInformation message indicating a change of sidelink discovery related parameters relevant in target PCell (i.e. change of discRxInterest or dis-cTxResourceReq, discTxResourceReqPS if System-InformationBlockType19 includes discConfigPS or discRxGapReq or discTxGapReq if the UE is con-figured with gapRequestsAllowedDedicated set to true or if the UE is not configured with gapRequest-sAllowedDedicated and SystemInformationBlock-Type19 includes gapRequestsAllowedCommon) during the last 1 second preceding reception of the RRCConnectionReconfiguration message including mobilityControlInfo; or 2> if SystemInformationBlockType21 is broadcast by the target PCell; and the UE transmitted a Side-linkUEInformation message indicating a change of V2X sidelink communication related parameters rel-evant in target PCell (i.e. change of v2x-CortunRx-InterestedFreqList or v2x-CommTxResourceReq) during the last 1 second preceding reception of the RRCConnectionReconfiguration message including mobilityControlInfo:

3> if the UE transmitted the SidelinkUEInformation message as described above after reception of the conditional reconfiguration including the RRCCo-nnectionReconfiguration message:

3> initiate transmission of the SidelinkUEInforma-tion message in accordance with 2> remove all the entries within VarConditionalRecon-figuration, if any;

2> for each measId of the source SpCell configuration, if the associated reportConfig is condReconfigura-tionTriggerEUTRA:

3> remove the entry with the matching measId from the measIdList within the VarMeasConfig;

3> remove the entry with the matching reportCon-figId from the reportConfigList within the VarMeasConfig;

3> if the measObjectId is only included in a MeasId-ToAddMod:

4> remove the entry with the matching measOb-jectId from the measObjectList within the VarMeasConfig;

2> the procedure ends;

NOTE 4: The UE is not required to determine the SFN of the target PCell by acquiring system information from that cell before performing RACH access in the target PCell, except for BL UEs or UEs in CE when sameSFN-Indication is not present in mobilityCon-trolInfo.

5.3.5.3 Reception of an RRCReconfiguration by the UE
The UE shall perform the following actions upon reception of the RRCReconfiguration, or upon execution of the con-ditional reconfiguration (CHO or CPC):

1> if the RRCReconfiguration is applied due to a condi-tional reconfiguration execution upon cell selection while timer T311 is running, as defined in 5.3.7.3:

2> remove all the entries within VarConditionalRecon-fig, if any;

1> if the RRCReconfiguration includes the daps-SourceRelease:

2> release source SpCell configuration;

2> reset the source MAC and release the source MAC configuration;

2> for each DAPS bearer:

3> release the RLC entity or entities as specified in TS 38.322 [4], clause 5.1.3, and the associated logical channel for the source SpCell;

3> reconfigure the PDCP entity to release DAPS as specified in TS 38.323 [5];

2> for each SRB:

3> release the PDCP entity for the source SpCell;

3> release the RLC entity as specified in TS 38.322 [4], clause 5.1.3, and the associated logical chan-nel for the source SpCell;

2> release the physical channel configuration for the source SpCell;

2> discard the keys used in the source SpCell (the $K_{gNB}$ key, the $K_{RRcenc}$ key, the $K_{RRcint}$ key, the $K_{UPint}$ key and the $K_{UPenc}$ key), if any;

1> if the RRCReconfiguration is received via other RAT (i.e., inter-RAT handover to NR):

2> if the RRCReconfiguration does not include the fullConfig and the UE is connected to 5GC (i.e., delta signalling during intra 5GC handover):

3> re-use the source RAT SDAP and PDCP configu-rations if available (i.e., current SDAP/PDCP con-figurations for all RBs from source E-UTRA RAT prior to the reception of the inter-RAT HO RRCReconfiguration message);

1> else:

2> if the RRCReconfiguration includes the fullConfig:

3> perform the full configuration procedure as speci-fied in 5.3.5.11;

1> if the RRCReconfiguration includes the masterCell-Group:

2> perform the cell group configuration for the received masterCellGroup according to 5.3.5.5;

1> if the RRCReconfiguration includes the masterKeyUp-date:

2> perform AS security key update procedure as speci-fied in 5.3.5.7;

1> if the RRCReconfiguration includes the sk-Counter:

2> perform security key update procedure as specified in 5.3.5.7;

1> if the RRCReconfiguration includes the secondary-CellGroup:

2> perform the cell group configuration for the SCG according to 5.3.5.5;

1> if the RRCReconfiguration includes the mrdc-Second-aryCellGroupConfig:

2> if the mrdc-SecondaryCellGroupConfig is set to setup:

3> if the mrdc-SecondaryCellGroupConfig includes mrdc-ReleaseAndAdd:

4> perform MR-DC release as specified in clause 5.3.5.10;

3> if the received mrdc-SecondaryCellGroup is set to nr-SCG:

4> perform the RRC reconfiguration according to 5.3.5.3 for the RRCReconfiguration message included in nr-SCG;

3> if the received mrdc-SecondaryCellGroup is set to eutra-SCG:

4> perform the RRC connection reconfiguration as specified in TS 36.331 [10], clause 5.3.5.3 for the RRCConnectionReconfiguration message included in eutra-SCG;

2> else (mrdc-SecondaryCellGroupConfig is set to release):

3> perform MR-DC release as specified in clause 5.3.5.10;

1> if the RRCReconfiguration message includes the radioBearerConfig:

2> perform the radio bearer configuration according to 5.3.5.6;

1> if the RRCReconfiguration message includes the radioBearerConfig2:

2> perform the radio bearer configuration according to 5.3.5.6;

1> if the RRCReconfiguration message includes the measConfig:

2> perform the measurement configuration procedure as specified in 5.5.2;

1> if the RRCReconfiguration message includes the dedicatedNAS-MessageList:

2> forward each element of the dedicatedNAS-MessageList to upper layers in the same order as listed;

1> if the RRCReconfiguration message includes the dedicatedSIB1-Delivery:

2> perform the action upon reception of SIB1 as specified in 5.2.2.4.2;

NOTE 0: If this RRCReconfiguration is associated to the MCG and includes reconfigurationWithSync in spCellConfig and dedicatedSIB1-Delivery, the UE initiates (if needed) the request to acquire required SIB s, according to clause 5.2.2.3.5, only after the random access procedure towards the target SpCell is completed.

1> if the RRCReconfiguration message includes the dedicatedSystemInformationDelivery:

2> perform the action upon reception of System Information as specified in 5.2.2.4;

1> if the RRCReconfiguration message includes the dedicatedPosSysInfoDelivery:

2> perform the action upon reception of the contained posSIB(s), as specified in sub-clause 5.2.2.4.16;

1> if the RRCReconfiguration message includes the otherConfig:

2> perform the other configuration procedure as specified in 5.3.5.9;

1> if the RRCReconfiguration message includes the bapConfig:

2> perform the BAP configuration procedure as specified in 5.3.5.12;

1> if the RRCReconfiguration message includes the iab-IP-AddressConfigurationList:

2> if iab-IP-AddressToReleaseList is included:

3> for each IAB-IP-AddressIndex received in the iab-IP-AddressToReleaseList

4> perform release of IP address as specified in 5.3.5.12a.1.1;

2> if iab-IP-AddressToAddModList is included:

3> for each IAB-IP-AddressIndex received in the iab-IP-AddressToAddModList

4> perform IAB IP address addition/update as specified in 5.3.5.12a.1.2;

1> if the RRCReconfiguration message includes the conditionalReconfiguration:

2> perform conditional reconfiguration as specified in 5.3.5.13;

1> if the RRCReconfiguration message includes the needForGapsConfigNR:

2> if needForGapsConfigNR is set to setup:

3> consider itself to be configured to provide the measurement gap requirement information of NR target bands;

2> else:

3> consider itself not to be configured to provide the measurement gap requirement information of NR target bands;

1> if the RRCReconfiguration message includes the sl-ConfigDedicatedNR:

2> perform the sidelink dedicated configuration procedure as specified in 5.3.5.14;

NOTE 0a: If the sl-ConfigDedicatedNR was received embedded within an E-UTRA RRCConnectionReconfiguration message, the UE does not build an NR RRCReconfigurationComplete message for the received sl-ConfigDedicatedNR.

1> if the RRCReconfiguration message includes the sl-ConfigDedicatedEUTRA-Info:

2> perform related procedures for V2X sidelink communication in accordance with TS 36.331 [10], clause 5.3.10 and clause 5.5.2;

1> set the content of the RRCReconfigurationComplete message as follows:

2> if the RRCReconfiguration includes the masterCellGroup containing the reportUplinkTxDirectCurrent:

3> include the uplinkTxDirectCurrentList for each MCG serving cell with UL;

3> include uplinkDirectCurrentBWP-SUL for each MCG serving cell configured with SUL carrier, if any, within the uplinkTxDirectCurrentList;

2> if the RRCReconfiguration includes the secondaryCellGroup containing the reportUplinkTxDirectCurrent:

3> include the uplinkTxDirectCurrentList for each SCG serving cell with UL;

3> include uplinkDirectCurrentBWP-SUL for each SCG serving cell configured with SUL carrier, if any, within the uplinkTxDirectCurrentList;

2> if the RRCReconfiguration message includes the mrdc-SecondaryCellGroupConfig with mrdc-SecondaryCellGroup set to eutra-SCG:

3> include in the eutra-SCG-Response the E-UTRA RRCConnectionReconfigurationComplete message in accordance with TS 36.331 clause 5.3.5.3;

2> if the RRCReconfiguration message includes the mrdc-SecondaryCellGroupConfig with mrdc-SecondaryCellGroup set to nr-SCG:

3> include in the nr-SCG-Response the RRCReconfigurationComplete message;

2> if the RRCReconfiguration message was included in an RRCResume message:

3> include the RRCReconfigurationComplete message in the nr-SCG-Response within the scg-Response in the RRCResumeComplete message;

2> if the RRCReconfiguration message was included in E-UTRA RRCConnectionResume message:

3> include the RRCReconfigurationComplete message in the E-UTRA MCG RRC message RRC- ConnectionResumeComplete in accordance with TS 36.331 [10], clause 5.3.3.4a;

2> if the UE has logged measurements available for NR and if the RPLMN is included in plmn-IdentityList stored in VarLogMeasReport:

3> include the logMeasAvailable in the RRCReconfigurationComplete message;

2> if the UE has Bluetooth logged measurements available and if the RPLMN is included in plmn-IdentityList stored in VarLogMeasReport:

3> include the logMeasAvailableBT in the RRCReconfigurationComplete message;

2> if the UE has WLAN logged measurements available and if the RPLMN is included in plmn-IdentityList stored in VarLogMeasReport:

3> include the logMeasAvailableWLAN in the RRCReconfigurationComplete message;

2> if the UE has connection establishment failure or connection resume failure information available in VarConnEstFailReport and if the RPLMN is equal to plmn-Identity stored in VarConnEstFailReport:

3> include connEstFailInfoAvailable in the RRCReconfigurationComplete message;

2> if the RRCReconfiguration message was received in response to the MCGFailureInformation message:

3> clear the information included in VarRLF-Report, if any;

2> if the UE has radio link failure or handover failure information available in VarRLF-Report and if the RPLMN is included in plmn-IdentityList stored in VarRLF-Report; or 2> if the UE has radio link failure or handover failure information available in VarRLF-Report of TS 36.331 and if the UE is capable of cross-RAT RLF reporting and if the RPLMN is included in plmn-IdentityList stored in VarRLF-Report of TS 36.331 [10]:

3> include rlf-InfoAvailable in the RRCReconfigurationComplete message;

2> if the RRCReconfiguration message was received via SRB1, but not within mrdc-SecondaryCellGroup or E-UTRA RRCConnectionReconfiguration:

3> if the UE is configured to provide the measurement gap requirement information of NR target bands:

4> if the RRCReconfiguration message includes the needForGapsConfigNR; or

4> if the NeedForGapsInfoNR information is changed compared to last time the UE reported this information:

5> include the NeedForGapsInfoNR and set the contents as follows:

6> include intraFreq-needForGap and set the gap requirement information of intra-frequency measurement for each NR serving cell;

6> if requestedTargetBandFilterNR is configured, for each supported NR band that is also included in requestedTargetBandFilterNR, include an entry in interFreq-needForGap and set the gap requirement information for that band; otherwise, include an entry in interFreq-needForGap and set the corresponding gap requirement information for each supported NR band;

1> if the UE is configured with E-UTRA nr-SecondaryCellGroupConfig (UE in (NG)EN-DC):

2> if the RRCReconfiguration message was received via E-UTRA SRB1 as specified in TS 36.331 [10]; or 2> if the RRCReconfiguration message was received via E-UTRA RRC message RRCConnectionReconfiguration within MobilityFromNRCommand;

3> if the RRCReconfiguration is applied due to a conditional reconfiguration execution:

4> submit the RRCReconfigurationComplete message via the E-UTRA MCG embedded in E-UTRA RRC message ULInformationTransferMRDC as specified in TS 36.331 [10], clause 5.6.2a.

3> else:

4> submit the RRCReconfigurationComplete via E-UTRA embedded in E-UTRA RRC message RRCConnectionReconfigurationComplete as specified in TS 36.331 [10], clause 5.3.5.3/5.3.5.4/5.4.2.3;

3> if reconfigurationWithSync was included in spCellConfig of an SCG:

4> initiate the Random Access procedure on the SpCell, as specified in TS 38.321 [3];

3> else:

4> the procedure ends;

2> if the RRCReconfiguration message was received within nr-SecondaryCellGroupConfig in RRCConnectionReconfiguration message received via SRB3 within DLInformationTransferMRDC:

3> submit the RRCReconfigurationComplete via E-UTRA embedded in E-UTRA RRC message RRCConnectionReconfigurationComplete as specified in TS 36.331 [10], clause 5.3.5.3/5.3.5.4;

3> if reconfigurationWithSync was included in spCellConfig of an SCG:

4> initiate the Random Access procedure on the SpCell, as specified in TS 38.321 [3], 3> else:

4> the procedure ends;

NOTE 1: The order the UE sends the RRCConnectionReconfigurationComplete message and performs the Random Access procedure towards the SCG is left to UE implementation.

2> else (RRCReconfiguration was received via SRB3) but not within DLInformationTransferMRDC:

3> submit the RRCReconfigurationComplete message via SRB3 to lower layers for transmission using the new configuration;

NOTE 2: In (NG)EN-DC and NR-DC, in the case RRCReconfiguration is received via SRB1 or within DLInformationTransferMRDC via SRB3, the random access is triggered by RRC layer itself as there is not necessarily other UL transmission. In the case RRCReconfiguration is received via SRB3 but not within DLInformationTransferMRDC, the random access is triggered by the MAC layer due to arrival of RRCReconfigurationComplete.

1> else if the RRCReconfiguration message was received via SRB1 within the nr-SCG within mrdc-SecondaryCellGroup (UE in NR-DC, mrdc-SecondaryCellGroup was received in RRCReconfiguration via SRB1):

2> if the RRCReconfiguration is applied due to a conditional reconfiguration execution:

3> submit the RRCReconfigurationComplete message via the NR MCG embedded in NR RRC message ULInformationTransferMRDC as specified in clause 5.7.2a.3.

2> if reconfigurationWithSync was included in spCell-Config in nr-SCG:

3> initiate the Random Access procedure on the PSCell, as specified in TS 38.321 [3];

2> else

3> the procedure ends;

NOTE 2a: The order in which the UE sends the RRCReconfigurationComplete message and performs the Random Access procedure towards the SCG is left to UE implementation.

1> else if the RRCReconfiguration message was received via SRB3 (UE in NR-DC):

2> if the RRCReconfiguration message was received within DLInformationTransferMRDC:

3> if the RRCReconfiguration message was received within the nr-SCG within mrdc-SecondaryCell-Group (NR SCG RRC Reconfiguration):

4> if reconfigurationWithSync was included in spCellConfig in nr-SCG:

5> initiate the Random Access procedure on the PSCell, as specified in TS 38.321 [3];

4> else:

5> the procedure ends;

3> else:

4> submit the RRCReconfigurationComplete message via SRB1 to lower layers for transmission using the new configuration;

2> else:

3> submit the RRCReconfigurationComplete message via SRB3 to lower layers for transmission using the new configuration;

1> else (RRCReconfiguration was received via SRB1):

2> submit the RRCReconfigurationComplete message via SRB1 to lower layers for transmission using the new configuration;

2> if this is the first RRCReconfiguration message after successful completion of the RRC re-establishment procedure:

3> resume SRB2 and DRBs that are suspended;

1> if reconfigurationWithSync was included in spCell-Config of an MCG or SCG, and when MAC of an NR cell group successfully completes a Random Access procedure triggered above:

2> stop timer T304 for that cell group;

2> stop timer T310 for source SpCell if running;

2> apply the parts of the CSI reporting configuration, the scheduling request configuration and the sounding RS configuration that do not require the UE to know the SFN of the respective target SpCell, if any;

2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;

2> for each DRB configured as DAPS bearer, request uplink data switching to the PDCP entity, as specified in TS 38.323 [5];

2> if the reconfigurationWithSync was included in spCellConfig of an MCG:

3> if T390 is running:

4> stop timer T390 for all access categories;

4> perform the actions as specified in 5.3.14.4.

3> if T350 is running:

4> stop timer T350;

3> if RRCReconfiguration does not include dedicatedSIB1-Delivery and

3> if the active downlink BWP, which is indicated by the firstActiveDownlinkBWP-Id for the target SpCell of the MCG, has a common search space configured by searchSpaceSIB1:

4> acquire the SIB1, which is scheduled as specified in TS 38.213 [13], of the target SpCell of the MCG;

4> upon acquiring SIB1, perform the actions specified in clause 5.2.2.4.2;

2> if the reconfigurationWithSync was included in spCellConfig of an MCG; or:

2> if the reconfigurationWithSync was included in spCellConfig of an SCG and the CPC was configured 3> remove all the entries within VarConditionalReconfig, if any;

3> for each measId of the source SpCell configuration, if the associated reportConfig has a reportType set to condTriggerConfig:

4> for the associated reportConfigId:

5> remove the entry with the matching reportConfigId from the reportConfigList within the VarMeasConfig;

4> if the associated measObjectId is only associated to a reportConfig with reportType set to condTriggerConfig:

5> remove the entry with the matching measObjectId from the measObjectList within the VarMeasConfig;

4> remove the entry with the matching measId from the measIdList within the VarMeasConfig;

2> if reconfigurationWithSync was included in masterCellGroup or secondaryCellGroup; and 2> if the UE transmitted a UEAssistanceInformation message for the corresponding cell group during the last 1 second, and the UE is still configured to provide the concerned UE assistance information for the corresponding cell group: or 2> if the UE transmitted a UEAssistanceInformation message for the corresponding cell group after reception of the conditional reconfiguration including the RRCReconfiguration message:

3> stop the prohibit timer (if exists) associated with the concerned UE assistance information with the timer value set to the value in corresponding configuration;

3> initiate transmission of a UEAssistanceInformation message for the corresponding cell group in accordance with clause 5.7.4.3 to provide the concerned UE assistance information;

3> start or restart the prohibit timer (if exists) associated with the concerned UE assistance information with the timer value set to the value in corresponding configuration;

2> if SIB12 is provided by the target PCell; and the UE transmitted a SidelinkUEInformationNR message indicating a change of NR sidelink communication related parameters relevant in target PCell (i.e. change of sl-RxInterestedFreqList or sl-TxResourceReqList) during the last 1 second preceding reception of the RRCReconfiguration message including reconfigurationWithSync in spCellConfig of an MCG: or 2> if the UE transmitted a SidelinkUEInformationNR message indicating a change of NR sidelink communication related parameters relevant in target PCell (i.e. change of sl-RxInterestedFreqList or sl- TxResourceReqList) after reception of the conditional reconfiguration including the RRCReconfiguration message:

3> initiate transmission of the SidelinkUEInformationNR message in accordance with 5.8.3.3;

2> the procedure ends.

NOTE 3: The UE is only required to acquire broadcasted SIB1 if the UE can acquire it without disrupting unicast data reception, i.e. the broadcast and unicast beams are quasi co-located.

NOTE 4: The UE sets the content of UEAssistanceInformation according to latest configuration (i.e. the configuration after applying the RRCReconfiguration message) and latest UE preference. The UE may include more than the concerned UE assistance information within the UEAssistanceInformation according to 5.7.4.2. Therefore, the content of UEAssistanceInformation message may not be similar to the original one.

5.3.5.4 Reception of an RRCConnectionReconfiguration Including the mobilityControlInfo by the UE (Handover)

If the RRCConnectionReconfiguration message includes the mobilityControlInfo and the UE is able to comply with the configuration included in this message, the UE shall:

1> if daps-HO is not configured for any DRB:

2> stop timer T310, if running;

2> stop timer T312, if running;

2> if timer T316 is running:

3> stop timer T316;

3> clear the information included in VarRLF-Report, if any;

2> resume MCG transmission, if suspended;

1> start timer T304 with the timer value set to t304, as included in the mobilityControlInfo;

1> stop timer T370, if running;

1> if the carrierFreq is included:

2> consider the target PCell to be one on the frequency indicated by the carrierFreq with a physical cell identity indicated by the targetPhysCellId;

1> else:

2> consider the target PCell to be one on the frequency of the source PCell with a physical cell identity indicated by the targetPhysCellId;

1> if T309 is running:

2> stop timer T309 for all access categories;

2> perform the actions as specified in 5.3.16.4.

1> start synchronising to the DL of the target PCell;

NOTE 1: The UE should perform the handover as soon as possible following the reception of the RRC message triggering the handover, which could be before confirming successful reception (HARQ and ARQ) of this message.

1> if BL UE or UE in CE:

2> if sameSFN-Indication is not present in mobilityControlInfo:

3> acquire the MasterInformationBlock in the target PCell;

1> if makeBeforeBreak is configured:

2> perform the remainder of this procedure including and following resetting MAC after the UE has stopped the uplink transmission/downlink reception with the source PCell;

NOTE 1a: It is up to UE implementation when to stop the uplink transmission/downlink reception with the source PCell to initiate re-tuning for connection to the target cell, as specified in TS 36.133 [16], if makeBeforeBreak is configured.

NOTE 1b: It is up to UE implementation when to stop the uplink transmission/downlink reception with the source SCell(s) after receiving RRCConnectionReconfiguration message.

1> if daps-HO is configured for any DRB:

2> establish a MAC entity for the target PCell, with the same configuration as the MAC entity for the source PCell;

2> for each DRB configured with daps-HO:

3> establish the RLC entity or entities and the associated DTCH logical channel for the target PCell, with the same configurations as for the source PCell;

3> reconfigure the PDCP entity to configure DAPS as specified in TS36.323 [8].

2> for each DRB not configured with daps-HO:

3> re-establish PDCP;

3> re-establish the RLC entity and associate it, and the associated DTCH logical channel, to the target PCell;

2> for each SRB:

3> establish a PDCP entity for the target PCell, with the same configuration as the PDCP entity for the source PCell;

3> establish an RLC entity and an associated DCCH logical channel for the target PCell, with the same configuration as for the source PCell;

3> suspend the SRBs for the source PCell;

NOTE 1c: In order to understand if a daps-HO is configured, the UE needs to check the presence of the field daps-HO within the received RadioResourceConfigDedicated IE.

1> else (if daps-HO is not configured):

2> reset MCG MAC and SCG MAC, if configured;

2> release uplinkDataCompression, if configured;

2> re-establish PDCP for all RBs configured with pdcp-config that are established;

NOTE 2: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].

NOTE 2a: At handover the reestablishPDCP flag will be set for all RBs configured with NR PDCP in nr-RadioBearerConfig1 or nr-RadioBearerConfig2 TS 38.331 which will cause the PDCP entity to be re-established also for these RBs.

2> re-establish MCG RLC and SCG RLC, if configured, for all RBs that are established;

1> for each SCell configured for the UE other than the PSCell:

2> if the received RRCConnectionReconfiguration message includes sCellState for the SCell and indicates activated:

3> configure lower layers to consider the SCell to be in activated state;

2> else if the received RRCConnectionReconfiguration message includes sCellState for the SCell and indicates dormant:

3> configure lower layers to consider the SCell to be in dormant state;

2> else:

3> configure lower layers to consider the SCell to be in deactivated state;

1> apply the value of the newUE-Identity as the C-RNTI in the target MCG;

1> if the RRCConnectionReconfiguration message includes the fullConfig:
 2> perform the radio configuration procedure as specified in 5.3.5.8;
1> configure lower layers in accordance with the received radioResourceConfigCommon;
1> if the received RRCConnectionReconfiguration message includes the rach-Skip:
 2> configure lower layers to apply the rach-Skip for the target MCG, as specified in TS 36.213 and 36.321 [6];
1> configure lower layers in accordance with any additional fields, not covered in the previous, if included in the received mobilityControlInfo;
1> if the received RRCConnectionReconfiguration includes the sCellToReleaseList:
 2> perform SCell release as specified in 5.3.10.3a;
1> if the received RRCConnectionReconfiguration includes the sCellGroupToReleaseList:
 2> perform SCell group release as specified in 5.3.10.3d;
1> if the received RRCConnectionReconfiguration includes the scg-Configuration; or
1> if the current UE configuration includes one or more split DRB s and the received RRCConnectionReconfiguration includes radioResourceConfigDedicated including drb-ToAddModList:
 2> perform SCG reconfiguration as specified in 5.3.10.10;
1> if the RRCConnectionReconfiguration message includes the radioResourceConfigDedicated:
 2> perform the radio resource configuration procedure as specified in 5.3.10;
1> if the securityConfigHO (without suffix) is included in the RRCConnectionReconfiguration:
 2> if the keyChangeIndicator received in the securityConfigHO is set to TRUE:
  3> update the $K_{eNB}$ key based on the $K_{ASME}$ key taken into use with the latest successful NAS SMC procedure, as specified in TS 33.401 [32];
 2> else:
  3> update the $K_{eNB}$ key based on the current $K_{eNB}$ or the NH, using the nextHopChainingCount value indicated in the securityConfigHO, as specified in TS 33.401 [32];
NOTE 2b: If the UE needs to update the S-$K_{eNB}$ key as specified in 5.3.10.10, the UE updates the S-$K_{eNB}$ after updating the $K_{eNB}$ key.
 2> store the nextHopChainingCount value;
 2> if the securityAlgorithmConfig is included in the securityConfigHO:
  3> derive the $K_{RRcint}$ key associated with the integrityProtAlgorithm, as specified in TS 33.401 [32];
  3> if connected as an RN:
   4> derive the $K_{UPint}$ key associated with the integrityProtAlgorithm, as specified in TS 33.401 [32];
  3> derive the $K_{RRcenc}$ key and the $K_{UPenc}$ key associated with the cipheringAlgorithm, as specified in TS 33.401 [32];
 2> else:
  3> derive the $K_{RRcint}$ key associated with the current integrity algorithm, as specified in TS 33.401 [32];
  3> if connected as an RN:
   4> derive the $K_{UPint}$ key associated with the current integrity algorithm, as specified in TS 33.401 [32];

3> derive the $K_{RRcenc}$ key and the $K_{UPenc}$ key associated with the current ciphering algorithm, as specified in TS 33.401 [32];
 2> configure lower layers to apply the integrity protection algorithm and the $K_{RRcint}$ key, i.e. the integrity protection configuration shall be applied to all subsequent messages received and sent by the UE, including the message used to indicate the successful completion of the procedure;
 2> configure lower layers to apply the ciphering algorithm, the $K_{RRcenc}$ key and the $K_{UPenc}$ key, i.e. the ciphering configuration shall be applied to all subsequent messages received and sent by the UE, including the message used to indicate the successful completion of the procedure;
NOTE 2c: For a DRB configured for DAPS HO, the new ciphering algorithm and the $K_{UPenc}$ key is applied for traffic exchange between the UE and the target MCG while the old ciphering algorithm and $K_{UPenc}$ key is applied for traffic exchange between the UE and the source MCG.
1> else if the securityConfigHO-v1530 is included in the RRCConnectionReconfiguration:
 2> if the nas-Container is received:
  3> forward the nas-Container to upper layers;
 2> if the keyChangeIndicator-r15 is received and is set to TRUE:
  3> update the $K_{eNB}$ key based on the KAMF key, as specified in TS 33.501 [86];
 2> else:
  3> update the $K_{eNB}$ key based on the current $K_{eNB}$ or the NH, using the received nextHopChainingCount-r15, as specified in TS 33.501 [86];
 2> store the nextHopChainingCount-r15 value;
 2> if the securityAlgorithmConfig-r15 is received:
  3> derive the $K_{RRcint}$ key associated with the integrityProtAlgorithm, as specified in TS 33.401 [32];
  3> derive the $K_{RRcenc}$ key and the $K_{UPenc}$ key associated with the cipheringAlgorithm, as specified in TS 33.401 [32];
 2> else:
  3> derive the $K_{RRcint}$ key associated with the current integrity algorithm, as specified in TS 33.401 [32];
  3> derive the $K_{RRcenc}$ key and the $K_{UPenc}$ key associated with the current ciphering algorithm, as specified in TS 33.401 [32];
1> if the received RRCConnectionReconfiguration includes the nr-Config and it is set to release; or
1> if the received RRCConnectionReconfiguration includes endc-ReleaseAndAdd and it is set to TRUE:
 2> perform MR-DC release as specified in TS 38.331 [82], clause 5.3.5.10;
1> if the received RRCConnectionReconfiguration includes the sk-Counter:
 2> perform key update procedure as specified in in TS 38.331 [82], clause 5.3.5.7;
1> if the received RRCConnectionReconfiguration includes the nr-SecondaryCellGroupConfig:
 2> perform NR RRC Reconfiguration as specified in TS 38.331 [82], clause 5.3.5.3;
1> if the received RRCConnectionReconfiguration includes the nr-RadioBearerConfig1:
 2> perform radio bearer configuration as specified in TS 38.331 [82], clause 5.3.5.6;

1> if the received RRCConnectionReconfiguration includes the nr-RadioBearerConfig2:

2> perform radio bearer configuration as specified in TS 38.331 [82], clause 5.3.5.6.

1> if connected as an RN:

2> configure lower layers to apply the integrity protection algorithm and the $K_{UPint}$ key, for current or subsequently established DRBs that are configured to apply integrity protection, if any;

1> if the received RRCConnectionReconfiguration includes the sCellToAddModList:

2> perform SCell addition or modification as specified in 5.3.10.3b;

1> if the received RRCConnectionReconfiguration includes the sCellGroupToAddModList:

2> perform SCell group addition or modification as specified in 5.3.10.3e;

1> if the received RRCConnectionReconfiguration includes the systemInformationBlockType1Dedicated:

2> preform the actions upon reception of the SystemInformationBlockType1 message as specified in 5.2.2.7;

1> perform the measurement related actions as specified in 5.5.6.1;

1> if the RRCConnectionReconfiguration message includes the measConfig:

2> perform the measurement configuration procedure as specified in 5.5.2;

1> perform the measurement identity autonomous removal as specified in 5.5.2.2a;

1> release reportProximityConfig and clear any associated proximity status reporting timer;

1> if the RRCConnectionReconfiguration message includes the otherConfig:

2> perform the other configuration procedure as specified in 5.3.10.9;

1> if the RRCConnectionReconfiguration message includes the sl-DiscConfig or sl-CommConfig:

2> perform the sidelink dedicated configuration procedure as specified in 5.3.10.15;

1> if the RRCConnectionReconfiguration message includes wlan-OffloadInfo:

2> perform the dedicated WLAN offload configuration procedure as specified in 5.6.12.2;

1> if handoverWithoutWT-Change is not configured:

2> release the LWA configuration, if configured, as described in 5.6.14.3;

1> release the LWIP configuration, if configured, as described in 5.6.17.3;

1> if the RRCConnectionReconfiguration message includes rclwi-Configuration:

2> perform the WLAN traffic steering command procedure as specified in 5.6.16.2;

1> if the RRCConnectionReconfiguration message includes lwa-Configuration:

2> perform the LWA configuration procedure as specified in 5.6.14.2;

1> if the RRCConnectionReconfiguration message includes lwip-Configuration:

2> perform the LWIP reconfiguration procedure as specified in 5.6.17.2;

1> if the RRCConnectionReconfiguration message includes the sl-V2X-ConfigDedicated or mobilityControlInfoV2X:

2> perform the V2X sidelink communication dedicated configuration procedure as specified in 5.3.10.15a;

NOTE 2d: In case of conditional reconfiguration the text "if the received RRCConnectionReconfiguration . . . " corresponds to applying the stored RRCConnectionReconfiguration message (according to 5.3.5.9.5).

1> if the UE is configured to operate in EN-DC as result of this procedure, forward upperLayerIndication, as if the UE receives this field from SIB2, to upper layers, otherwise indicate upper layers absence of this field;

1> set the content of RRCConnectionReconfigurationComplete message as follows:

2> if the UE has radio link failure or handover failure information available in VarRLF-Report and if the RPLMN is included in plmn-IdentityList stored in VarRLF-Report:

3> include rlf-InfoAvadable;

2> if the UE has MBSFN logged measurements available for E-UTRA and if the RPLMN is included in plmn-IdentityList stored in VarLogMeasReport and if T330 is not running:

3> include logMeasAvailableMBSFN;

2> else if the UE has logged measurements available for E-UTRA and if the RPLMN is included in Ann-IdentityList stored in VarLogMeasReport:

3> include the logMeasAvailable;

2> if the UE has Bluetooth logged measurements available and if the RPLMN is included in Ann-IdentityList stored in VarLogMeasReport:

3> include logMeasAvailableBT;

2> if the UE has WLAN logged measurements available and if the RPLMN is included in Ann-IdentityList stored in VarLogMeasReport:

3> include logMeasAvailableWLAN;

2> if the UE has connection establishment failure information available in VarConnEstFailReport and if the RPLMN is equal to Minn-Identity stored in VarConnEstFailReport:

3> include connEstFailInfoAvailable;

2> if the RRCConnectionReconfiguration message includes perCC-GapIndicationRequest:

3> include perCC-GapIndicationList and numFreqEffective;

2> if the frequencies are configured for reduced measurement performance:

3> include numFreqEffectiveReduced;

2> if the UE has flight path information available:

3> include flightPathInfoAvailable;

2> if the received RRCConnectionReconfiguration message included nr-SecondaryCellGroupConfig:

3> include scg-ConfigResponseNR in accordance with TS 38.331 [82], clause 5.3.5.3;

1> submit the RRCConnectionReconfigurationComplete message to lower layers for transmission;

1> if MAC successfully completes the random access procedure; or

1> if MAC indicates the successful reception of a PDCCH transmission addressed to C-RNTI and if rach-Skip is configured:

2> stop timer T304;

2> if daps-HO is configured for any DRB:

3> stop timer T310, if running;

3> stop timer T312, if running;

3> for each DAPS bearer trigger UL data switching, as specified in TS 36.323 [8];

2> release rach-Skip;

2> apply the parts of the CQI reporting configuration, the scheduling request configuration and the sounding RS configuration that do not require the UE to know the SFN of the target PCell, if any;

2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;

NOTE 3: Whenever the UE shall setup or reconfigure a configuration in accordance with a field that is received it applies the new configuration, except for the cases addressed by the above statements.

2> if the UE is configured to provide IDC indications:

3> if the UE has transmitted an InDeviceCoexIndication message during the last 1 second preceding reception of the RRCConnectionReconfiguration message including mobilityControlInfo or during the last 1 second preceding execution of the conditional reconfiguration including the RRCConnectionReconfiguration message:

4> initiate transmission of the InDeviceCoexIndication message in accordance with 5.6.9.3;

2> if the UE is configured to provide power preference indications, overheating assistance information, SPS assistance information, delay budget report or maximum bandwidth preference indications:

3> if the UE has transmitted a UEAssistanceInformation message during the last 1 second preceding reception of the RRCConnectionReconfiguration message including mobilityControlInfo or during the last 1 second preceding execution of the conditional reconfiguration including the RRCConnectionReconfiguration message:

4> initiate transmission of the UEAssistanceInformation message in accordance with 5.6.10.3;

2> if SystemInformationBlockType15 is broadcast by the PCell:

3> if the UE has transmitted a MBMSInterestIndication message during the last 1 second preceding reception or execution of the RRCConnectionReconfiguration message including mobilityControlInfo:

4> ensure having a valid version of SystemInformationBlockType15 for the PCell;

4> determine the set of MBMS frequencies of interest in accordance with 5.8.5.3;

4> determine the set of MBMS services of interest in accordance with 5.8.5.3a;

4> initiate transmission of the MBMSInterestIndication message in accordance with 5.8.5.4;

2> if SystemInformationBlockType18 is broadcast by the target PCell; and the UE transmitted a SidelinkUEInformation message indicating a change of sidelink communication related parameters relevant in target PCell (i.e. change of commRxInterested-Freq or commTxResourceReq, cortunTxResourceReqUC if SystemInformationBlockType18 includes cortnTxResourceUC-ReqAllowed or cortunTxResourceInfoReqRelay if PCell broadcasts SystemInformationBlockType19 including discConfigRelay) during the last 1 second preceding reception of the RRCConnectionReconfiguration message including mobilityControlInfo or execution of the conditional reconfiguration including the RRCConnectionReconfiguration message; or 2> if SystemInformationBlockType19 is broadcast by the target PCell; and the UE transmitted a SidelinkUEInformation message indicating a change of sidelink discovery related parameters relevant in target PCell (i.e. change of discRxInterest or discTxResourceReq, discTxResourceReqPS if SystemInformationBlockType19 includes discConfigPS or discRxGapReq or discTxGapReq if the UE is configured with gapRequestsAllowedDedicated set to true or if the UE is not configured with gapRequestsAllowedDedicated and SystemInformationBlockType19 includes gapRequestsAllowedCommon) during the last 1 second preceding reception of the RRCConnectionReconfiguration message including mobilityControlInfo or during the last 1 second preceding execution of the conditional reconfiguration including the RRCConnectionReconfiguration message; or 2> if SystemInformationBlockType21 is broadcast by the target PCell; and the UE transmitted a SidelinkUEInformation message indicating a change of V2X sidelink communication related parameters relevant in target PCell (i.e. change of v2x-CortunRx-InterestedFreqList or v2x-CommTxResourceReq) during the last 1 second preceding reception of the RRCConnectionReconfiguration message including mobilityControlInfo or during the last 1 second preceding execution of the conditional reconfiguration including the RRCConnectionReconfiguration message:

3> initiate transmission of the SidelinkUEInformation message in accordance with 2> remove all the entries within VarConditionalReconfiguration, if any;

2> for each measId of the source SpCell configuration, if the associated reportConfig is condReconfigurationTriggerEUTRA:

3> remove the entry with the matching measId from the measIdList within the VarMeasConfig;

3> remove the entry with the matching reportConfigId from the reportConfigList within the VarMeasConfig;

3> if the measObjectId is only included in a MeasIdToAddMod:

4> remove the entry with the matching measObjectId from the measObjectList within the VarMeasConfig;

2> the procedure ends;

NOTE 4: The UE is not required to determine the SFN of the target PCell by acquiring system information from that cell before performing RACH access in the target PCell, except for BL UEs or UEs in CE when sameSFN-Indication is not present in mobilityControlInfo.

5.3.5.3 Reception of an RRCReconfiguration by the UE

The UE shall perform the following actions upon reception of the RRCReconfiguration, or upon execution of the conditional reconfiguration (CHO or CPC):

1> if the RRCReconfiguration is applied due to a conditional reconfiguration execution upon cell selection while timer T311 is running, as defined in 5.3.7.3:

2> remove all the entries within VarConditionalReconfig, if any;

1> if the RRCReconfiguration includes the daps-SourceRelease:

2> release source SpCell configuration;

2> reset the source MAC and release the source MAC configuration;

2> for each DAPS bearer:

3> release the RLC entity or entities as specified in TS 38.322 [4], clause 5.1.3, and the associated logical channel for the source SpCell;

3> reconfigure the PDCP entity to release DAPS as specified in TS 38.323 [5];

2> for each SRB:

3> release the PDCP entity for the source SpCell;

3> release the RLC entity as specified in TS 38.322 [4], clause 5.1.3, and the associated logical channel for the source SpCell;

2> release the physical channel configuration for the source SpCell;

2> discard the keys used in the source SpCell (the $K_{gNB}$ key, the $K_{RRcenc}$ key, the $K_{RRcint}$ key, the $K_{UPint}$ key and the $K_{UPenc}$ key), if any;

1> if the RRCReconfiguration is received via other RAT (i.e., inter-RAT handover to NR):

2> if the RRCReconfiguration does not include the fullConfig and the UE is connected to 5GC (i.e., delta signalling during intra 5GC handover):

3> re-use the source RAT SDAP and PDCP configurations if available (i.e., current SDAP/PDCP configurations for all RBs from source E-UTRA RAT prior to the reception of the inter-RAT HO RRCReconfiguration message);

1> else:

2> if the RRCReconfiguration includes the fullConfig:

3> perform the full configuration procedure as specified in 5.3.5.11;

1> if the RRCReconfiguration includes the masterCellGroup:

2> perform the cell group configuration for the received masterCellGroup according to 1> if the RRCReconfiguration includes the masterKeyUpdate:

2> perform AS security key update procedure as specified in 5.3.5.7;

1> if the RRCReconfiguration includes the sk-Counter:

2> perform security key update procedure as specified in 5.3.5.7;

1> if the RRCReconfiguration includes the secondaryCellGroup:

2> perform the cell group configuration for the SCG according to 5.3.5.5;

1> if the RRCReconfiguration includes the mrdc-SecondaryCellGroupConfig:

2> if the mrdc-SecondaryCellGroupConfig is set to setup:

3> if the mrdc-SecondaryCellGroupConfig includes mrdc-ReleaseAndAdd:

4> perform MR-DC release as specified in clause 5.3.5.10;

3> if the received mrdc-SecondaryCellGroup is set to nr-SCG:

4> perform the RRC reconfiguration according to 5.3.5.3 for the RRCReconfiguration message included in nr-SCG;

3> if the received mrdc-SecondaryCellGroup is set to eutra-SCG:

4> perform the RRC connection reconfiguration as specified in TS 36.331 [10], clause 5.3.5.3 for the RRCConnectionReconfiguration message included in eutra-SCG;

2> else (mrdc-SecondaryCellGroupConfig is set to release):

3> perform MR-DC release as specified in clause 5.3.5.10;

1> if the RRCReconfiguration message includes the radioBearerConfig:

2> perform the radio bearer configuration according to 5.3.5.6;

1> if the RRCReconfiguration message includes the radioBearerConfig2:

2> perform the radio bearer configuration according to 5.3.5.6;

1> if the RRCReconfiguration message includes the measConfig:

2> perform the measurement configuration procedure as specified in 5.5.2;

1> if the RRCReconfiguration message includes the dedicatedNAS-MessageList:

2> forward each element of the dedicatedNAS-MessageList to upper layers in the same order as listed;

1> if the RRCReconfiguration message includes the dedicatedSIB1-Delivery:

2> perform the action upon reception of SIB1 as specified in 5.2.2.4.2;

NOTE 0: If this RRCReconfiguration is associated to the MCG and includes reconfigurationWithSync in spCell-Config and dedicatedSIB1-Delivery, the UE initiates (if needed) the request to acquire required SIB s, according to clause only after the random access procedure towards the target SpCell is completed.

1> if the RRCReconfiguration message includes the dedicatedSystemInformationDelivery:

2> perform the action upon reception of System Information as specified in 5.2.2.4;

1> if the RRCReconfiguration message includes the dedicatedPosSysInfoDelivery:

2> perform the action upon reception of the contained posSIB(s), as specified in sub-clause 5.2.2.4.16;

1> if the RRCReconfiguration message includes the otherConfig:

2> perform the other configuration procedure as specified in 5.3.5.9;

1> if the RRCReconfiguration message includes the bapConfig:

2> perform the BAP configuration procedure as specified in 5.3.5.12;

1> if the RRCReconfiguration message includes the iab-IP-AddressConfigurationList:

2> if iab-IP-AddressToReleaseList is included:

3> for each IAB-IP-AddressIndex received in the iab-IP-AddressToReleaseList

4> perform release of IP address as specified in 5.3.5.12a.1.1;

2> if iab-IP-AddressToAddModList is included:

3> for each IAB-IP-AddressIndex received in the iab-IP-AddressToAddModList

4> perform IAB IP address addition/update as specified in 5.3.5.12a.1.2;

1> if the RRCReconfiguration message includes the conditionalReconfiguration:

2> perform conditional reconfiguration as specified in 5.3.5.13;

1> if the RRCReconfiguration message includes the needForGapsConfigNR:

2> if needForGapsConfigNR is set to setup:

3> consider itself to be configured to provide the measurement gap requirement information of NR target bands;

2> else:

3> consider itself not to be configured to provide the measurement gap requirement information of NR target bands;

1> if the RRCReconfiguration message includes the sl-ConfigDedicatedNR:

2> perform the sidelink dedicated configuration procedure as specified in 5.3.5.14;

NOTE 0a: If the sl-ConfigDedicatedNR was received embedded within an E-UTRA RRCConnectionReconfiguration message, the UE does not build an NR RRCReconfigurationComplete message for the received sl-ConfigDedicatedNR.

1> if the RRCReconfiguration message includes the sl-ConfigDedicatedEUTRA-Info:

2> perform related procedures for V2X sidelink communication in accordance with TS 36.331 [10], clause 5.3.10 and clause 5.5.2;

1> set the content of the RRCReconfigurationComplete message as follows:

2> if the RRCReconfiguration includes the masterCellGroup containing the reportUplinkTxDirectCurrent:

3> include the uplinkTxDirectCurrentList for each MCG serving cell with UL;

3> include uplinkDirectCurrentBWP-SUL for each MCG serving cell configured with SUL carrier, if any, within the uplinkTxDirectCurrentList;

2> if the RRCReconfiguration includes the secondaryCellGroup containing the reportUplinkTxDirectCurrent:

3> include the uplinkTxDirectCurrentList for each SCG serving cell with UL;

3> include uplinkDirectCurrentBWP-SUL for each SCG serving cell configured with SUL carrier, if any, within the uplinkTxDirectCurrentList;

2> if the RRCReconfiguration message includes the mrdc-SecondaryCellGroupConfig with mrdc-SecondaryCellGroup set to eutra-SCG:

3> include in the eutra-SCG-Response the E-UTRA RRCConnectionReconfigurationComplete message in accordance with TS 36.331 clause 5.3.5.3;

2> if the RRCReconfiguration message includes the mrdc-SecondaryCellGroupConfig with mrdc-SecondaryCellGroup set to nr-SCG:

3> include in the nr-SCG-Response the RRCReconfigurationComplete message;

2> if the RRCReconfiguration message was included in an RRCResume message:

3> include the RRCReconfigurationComplete message in the nr-SCG-Response within the scg-Response in the RRCResumeComplete message;

2> if the RRCReconfiguration message was included in E-UTRA RRCConnectionResume message:

3> include the RRCReconfigurationComplete message in the E-UTRA MCG RRC message RRCConnectionResumeComplete in accordance with TS 36.331 [10], clause 5.3.3.4a;

2> if the UE has logged measurements available for NR and if the RPLMN is included in plmn-IdentityList stored in VarLogMeasReport:

3> include the logMeasAvailable in the RRCReconfigurationComplete message;

2> if the UE has Bluetooth logged measurements available and if the RPLMN is included in plmn-IdentityList stored in VarLogMeasReport:

3> include the logMeasAvailableBT in the RRCReconfigurationComplete message;

2> if the UE has WLAN logged measurements available and if the RPLMN is included in plmn-IdentityList stored in VarLogMeasReport:

3> include the logMeasAvailableWLAN in the RRCReconfigurationComplete message;

2> if the UE has connection establishment failure or connection resume failure information available in VarConnEstFailReport and if the RPLMN is equal to plmn-Identity stored in VarConnEstFailReport:

3> include connEstFadInfoAvailable in the RRCReconfigurationComplete message;

2> if the RRCReconfiguration message was received in response to the MCGFailureInformation message:

3> clear the information included in VarRLF-Report, if any;

2> if the UE has radio link failure or handover failure information available in VarRLF-Report and if the RPLMN is included in plmn-IdentityList stored in VarRLF-Report; or 2> if the UE has radio link failure or handover failure information available in VarRLF-Report of TS 36.331 and if the UE is capable of cross-RAT RLF reporting and if the RPLMN is included in plmn-IdentityList stored in VarRLF-Report of TS 36.331 [10]:

3> include rlf-InfoAvadable in the RRCReconfigurationComplete message;

2> if the RRCReconfiguration message was received via SRB1, but not within mrdc-SecondaryCellGroup or E-UTRA RRCConnectionReconfiguration:

3> if the UE is configured to provide the measurement gap requirement information of NR target bands:

4> if the RRCReconfiguration message includes the needForGapsConfigNR; or

4> if the NeedForGapsInfoNR information is changed compared to last time the UE reported this information:

5> include the NeedForGapsInfoNR and set the contents as follows:

6> include intraFreq-needForGap and set the gap requirement informantion of intra-frequency measurement for each NR serving cell;

6> if requestedTargetBandFilterNR is configured, for each supported NR band that is also included in requestedTargetBandFilterNR, include an entry in interFreq-needForGap and set the gap requirement information for that band; otherwise, include an entry in interFreq-needForGap and set the corresponding gap requirement information for each supported NR band;

1> if the UE is configured with E-UTRA nr-SecondaryCellGroupConfig (UE in (NG)EN-DC):

2> if the RRCReconfiguration message was received via E-UTRA SRB1 as specified in TS 36.331 [10]; or 2> if the RRCReconfiguration message was received via E-UTRA RRC message RRCConnectionReconfiguration within MobilityFromNRCommand;

3> if the RRCReconfiguration is applied due to a conditional reconfiguration execution:

4> submit the RRCReconfigurationComplete message via the E-UTRA MCG embedded in E-UTRA RRC message ULInformationTransferMRDC as specified in TS 36.331 [10], clause 5.6.2a.

3> else:

4> submit the RRCReconfigurationComplete via E-UTRA embedded in E-UTRA RRC message RRCConnectionReconfigurationComplete as specified in TS 36.331 [10], clause 5.3.5.3/5.3.5.4/5.4.2.3;

3> if reconfigurationWithSync was included in spCellConfig of an SCG:

4> initiate the Random Access procedure on the SpCell, as specified in TS 38.321 [3], 3> else:

4> the procedure ends;

2> if the RRCReconfiguration message was received within nr-SecondaryCellGroupConfig in RRCConnectionReconfiguration message received via SRB3 within DLInformationTransferMRDC:

3> submit the RRCReconfigurationComplete via E-UTRA embedded in E-UTRA RRC message RRCConnectionReconfigurationComplete as specified in TS 36.331 [10], clause 5.3.5.3/5.3.5.4;

3> if reconfigurationWithSync was included in spCellConfig of an SCG:

4> initiate the Random Access procedure on the SpCell, as specified in TS 38.321 [3], 3> else:

4> the procedure ends;

NOTE 1: The order the UE sends the RRCConnectionReconfigurationComplete message and performs the Random Access procedure towards the SCG is left to UE implementation.

2> else (RRCReconfiguration was received via SRB3) but not within DLInformationTransferMRDC:

3> submit the RRCReconfigurationComplete message via SRB3 to lower layers for transmission using the new configuration;

NOTE 2: In (NG)EN-DC and NR-DC, in the case RRCReconfiguration is received via SRB1 or within DLInformationTransferMRDC via SRB3, the random access is triggered by RRC layer itself as there is not necessarily other UL transmission. In the case RRCReconfiguration is received via SRB3 but not within DLInformationTransferMRDC, the random access is triggered by the MAC layer due to arrival of RRCReconfigurationComplete.

1> else if the RRCReconfiguration message was received via SRB1 within the nr-SCG within mrdc-SecondaryCellGroup (UE in NR-DC, mrdc-SecondaryCellGroup was received in RRCReconfiguration via SRB1):

2> if the RRCReconfiguration is applied due to a conditional reconfiguration execution:

3> submit the RRCReconfigurationComplete message via the NR MCG embedded in NR RRC message ULInformationTransferMRDC as specified in clause 5.7.2a.3.

2> if reconfigurationWithSync was included in spCellConfig in nr-SCG:

3> initiate the Random Access procedure on the PSCell, as specified in TS 38.321 [3];

2> else

3> the procedure ends;

NOTE 2a: The order in which the UE sends the RRCReconfigurationComplete message and performs the Random Access procedure towards the SCG is left to UE implementation.

1> else if the RRCReconfiguration message was received via SRB3 (UE in NR-DC):

2> if the RRCReconfiguration message was received within DLInformationTransferMRDC:

3> if the RRCReconfiguration message was received within the nr-SCG within mrdc-SecondaryCellGroup (NR SCG RRC Reconfiguration):

4> if reconfigurationWithSync was included in spCellConfig in nr-SCG:

5> initiate the Random Access procedure on the PSCell, as specified in TS 38.321 [3];

4> else:

5> the procedure ends;

3> else:

4> submit the RRCReconfigurationComplete message via SRB1 to lower layers for transmission using the new configuration;

2> else:

3> submit the RRCReconfigurationComplete message via SRB3 to lower layers for transmission using the new configuration;

1> else (RRCReconfiguration was received via SRB1):

2> submit the RRCReconfigurationComplete message via SRB1 to lower layers for transmission using the new configuration;

2> if this is the first RRCReconfiguration message after successful completion of the RRC re-establishment procedure:

3> resume SRB2 and DRBs that are suspended;

1> if reconfigurationWithSync was included in spCellConfig of an MCG or SCG, and when MAC of an NR cell group successfully completes a Random Access procedure triggered above:

2> stop timer T304 for that cell group;

2> stop timer T310 for source SpCell if running;

2> apply the parts of the CSI reporting configuration, the scheduling request configuration and the sounding RS configuration that do not require the UE to know the SFN of the respective target SpCell, if any;

2> apply the parts of the measurement and the radio resource configuration that require the UE to know the SFN of the respective target SpCell (e.g. measurement gaps, periodic CQI reporting, scheduling request configuration, sounding RS configuration), if any, upon acquiring the SFN of that target SpCell;

2> for each DRB configured as DAPS bearer, request uplink data switching to the PDCP entity, as specified in TS 38.323 [5];

2> if the reconfigurationWithSync was included in spCellConfig of an MCG:

3> if T390 is running:

4> stop timer T390 for all access categories;

4> perform the actions as specified in 5.3.14.4.

3> if T350 is running:

4> stop timer T350;

3> if RRCReconfiguration does not include dedicatedSIB1-Delivery and

3> if the active downlink BWP, which is indicated by the firstActiveDownlinkBWP-Id for the target SpCell of the MCG, has a common search space configured by searchSpaceSIB1:

4> acquire the SIB1, which is scheduled as specified in TS 38.213 [13], of the target SpCell of the MCG;

4> upon acquiring SIB1, perform the actions specified in clause 5.2.2.4.2;

2> if the reconfigurationWithSync was included in spCellConfig of an MCG; or:

2> if the reconfigurationWithSync was included in spCellConfig of an SCG and the CPC was configured 3> remove all the entries within VarConditionalReconfig, if any;

3> for each measId of the source SpCell configuration, if the associated reportConfig has a reportType set to condTriggerConfig:

4> for the associated reportConfigId:

5> remove the entry with the matching reportConfigId from the reportConfigList within the VarMeasConfig;

4> if the associated measObjectId is only associated to a reportConfig with reportType set to condTriggerConfig:

5> remove the entry with the matching measObjectId from the measObjectList within the VarMeasConfig;

4> remove the entry with the matching measId from the measIdList within the VarMeasConfig;

2> if reconfigurationWithSync was included in masterCellGroup or secondaryCellGroup; and 2> if the UE transmitted a UEAssistanceInformation message for the corresponding cell group during the last 1 second preceding reception of the RRCReconfiguration message including reconfigurationWithSync in spCellConfig or during the last 1 second preceding execution of the conditional reconfiguration including the RRCReconfiguration message, and the UE is still configured to provide the concerned UE assistance information for the corresponding cell group:

3> stop the prohibit timer (if exists) associated with the concerned UE assistance information with the timer value set to the value in corresponding configuration;

3> initiate transmission of a UEAssistanceInformation message for the corresponding cell group in accordance with clause 5.7.4.3 to provide the concerned UE assistance information;

3> start or restart the prohibit timer (if exists) associated with the concerned UE assistance information with the timer value set to the value in corresponding configuration;

2> if SIB12 is provided by the target PCell; and the UE transmitted a SidelinkUEInformationNR message indicating a change of NR sidelink communication related parameters relevant in target PCell (i.e. change of sl-RxInterestedFreqList or sl-TxResourceReqList) during the last 1 second preceding reception of the RRCReconfiguration message including reconfigurationWithSync in spCellConfig of an MCG or during the last 1 second preceding execution of the conditional reconfiguration including the RRCReconfiguration message:

3> initiate transmission of the SidelinkUEInformationNR message in accordance with 5.8.3.3;

2> the procedure ends.

NOTE 3: The UE is only required to acquire broadcasted SIB1 if the UE can acquire it without disrupting unicast data reception, i.e. the broadcast and unicast beams are quasi co-located.

NOTE 4: The UE sets the content of UEAssistanceInformation according to latest configuration (i.e. the configuration after applying the RRCReconfiguration message) and latest UE preference. The UE may include more than the concerned UE assistance information within the UEAssistanceInformation according to 5.7.4.2. Therefore, the content of UEAssistanceInformation message may not be similar to the original one.

The following list of examples reflects a variety of the embodiments explicitly contemplated by the present disclosure:

Example 1. A method in a user equipment, UE, communicating with a radio access network, RAN, the method comprising: receiving, from the RAN, a conditional configuration and a corresponding condition for a conditional mobility procedure, wherein the corresponding condition is to be satisfied before the UE can communicate with a candidate node of the RAN using the conditional configuration; after receiving the conditional configuration and the corresponding condition, sending UE information to the RAN, the UE information including information indicative of a preference or circumstance of the UE; after sending the UE information to the RAN, determining, by processing hardware of the UE, that the corresponding condition is satisfied; and after determining that the corresponding condition is satisfied, again sending the UE information to the RAN.

Example 2. The method of example 1, wherein: the conditional mobility procedure is a conditional handover; the candidate node is a candidate base station; receiving the conditional configuration and the corresponding condition includes receiving the conditional configuration and the corresponding condition from a source base station; sending the UE information to the RAN includes sending the UE information to the source base station; and again sending the UE information to the RAN includes sending the UE information to the candidate base station.

Example 3. The method of example 1, wherein: the conditional mobility procedure is a conditional handover between distributed units, DUs, of a distributed base station; the candidate node is a candidate DU of the distributed base station; receiving the conditional configuration and the corresponding condition includes receiving the conditional configuration and the corresponding condition from a source DU of the distributed base station; sending the UE information to the RAN includes sending the UE information to the source DU; and again sending the UE information to the RAN includes sending the UE information to the candidate DU.

Example 4. The method of example 1, wherein: the conditional mobility procedure is a conditional secondary node, SN, addition or change procedure; the candidate node is a candidate SN; receiving the conditional configuration and the corresponding condition includes receiving the conditional configuration and the corresponding condition from a master node, MN; sending the UE information to the RAN includes sending the UE information to the MN; and again sending the UE information to the RAN includes sending the UE information to the MN for forwarding to the candidate SN.

Example 5. The method of example 1, wherein: the conditional mobility procedure is a conditional secondary node, SN, change procedure; the candidate node is a candidate SN; receiving the conditional configuration and the corresponding condition includes receiving the conditional configuration and the corresponding condition from a master node, MN; sending the UE information to the RAN includes sending the UE information to a source SN of the RAN; and again sending the UE information to the RAN includes sending the UE information to the candidate SN.

Example 6. The method of any one of examples 1-5, wherein the UE information includes a preferred configuration of the UE.

Example 7. The method of any one of examples 1-5, wherein the UE information indicates another communication technology that the UE is using, resources that the UE is using for the other communication technology, and/or resources that are affected by the other communication technology.

Example 8. The method of any one of examples 1-5, wherein the UE information indicates a service that is preferred or being used by the UE.

Example 9. The method of any one of examples 1-5, wherein the UE information includes sidelink information.

Example 10. The method of any one of examples 1-5, further comprising: determining, by the processing hardware, that a condition is satisfied, wherein sending the UE information to the RAN is in response to determining that the condition is satisfied; and again determining, by the processing hardware, that the condition is satisfied, wherein again sending the UE information to the RAN is in response to again determining that the condition is satisfied.

Example 11. A user equipment, UE, comprising hardware and configured to implement the method of any one of examples 1-10.

Example 12. A method in a radio access network, RAN, communicating with a user equipment, UE, the method comprising: sending to the UE a conditional configuration and a corresponding condition for a conditional mobility procedure, wherein the corresponding condition is to be satisfied before the UE can communicate with a candidate node of the RAN using the conditional configuration; after sending the conditional configuration and the corresponding condition, and before the corresponding condition is satisfied, receiving UE information from the UE, the UE information including information indicative of a preference or circumstance of the UE; and after the conditional mobility procedure is executed, again receiving the UE information from the UE.

Example 13. The method of example 12, wherein: the conditional mobility procedure is a conditional handover procedure; the candidate node is a candidate base station: sending the conditional configuration and the corresponding condition to the UE includes sending, by a source base station, the conditional configuration and the corresponding condition to the UE; receiving the UE information from the UE includes receiving the UE information at the source base station; and again receiving the UE information from the UE includes receiving the UE information at the candidate base station.

Example 14. The method of example 12, wherein: the conditional mobility procedure is a conditional handover between distributed units, DUs, of a distributed base station; the candidate node is a candidate DU of the distributed base station; sending the conditional configuration and the corresponding condition to the UE includes sending, by a source DU of the distributed base station, the conditional configuration and the corresponding condition to the UE; receiving the UE information from the UE includes receiving the UE information at the source DU; and again receiving the UE information from the UE includes receiving the UE information at the candidate DU.

Example 15. The method of example 12, wherein: the conditional mobility procedure is a conditional secondary node, SN, addition or change procedure; the candidate node is a candidate SN; sending the conditional configuration and the corresponding condition to the UE includes sending, by a master node, MN, the conditional configuration and the corresponding condition to the UE; receiving the UE information from the UE includes receiving the UE information at the MN; and again receiving the UE information from the UE includes again receiving the UE information at the MN.

Example 16. The method of example 15, further comprising: after again receiving the UE information at the MN, sending, by the MN, the UE information to the candidate SN.

Example 17. The method of example 12, wherein: the conditional mobility procedure is a conditional secondary node, SN, change procedure; the candidate node is a candidate SN; sending the conditional configuration and the corresponding condition to the UE includes sending, by a master node, MN, the conditional configuration and the corresponding condition to the UE; receiving the UE information from the UE includes receiving the UE information at a source SN; and again receiving the UE information from the UE includes receiving the UE information at the candidate SN.

Example 18. The method of any one of examples 12-17, wherein the UE information includes a preferred configuration of the UE.

Example 19. The method of any one of examples 12-17, wherein the UE information indicates another communication technology that the UE is using, resources that the UE is using for the other communication technology, and/or resources that are affected by the other communication technology.

Example 20. The method of any one of examples 12-17, wherein the UE information indicates a service that is preferred or being used by the UE.

Example 21. The method of any one of examples 12-17, wherein the UE information includes sidelink information.

Example 22. The method of any one of examples 12-17, further comprising: after again receiving the UE information from the UE, sending to the UE, by the candidate node, a message that reconfigures the UE in accordance with the UE information.

Example 23. One or more radio access network, RAN, nodes comprising hardware and configured to implement the method of any one of examples 12-22.

Example 24. A method in a radio access network, RAN, node of a RAN, the method comprising: sending to a user equipment, UE, a conditional configuration and a corresponding condition for a conditional mobility procedure, wherein the corresponding condition is to be satisfied before the UE can communicate with a candidate node of the RAN using the conditional configuration; after sending the conditional configuration and the corresponding condition, receiving UE information from the UE, the UE information including information indicative of a preference or circumstance of the UE; and after receiving the UE information from the UE, sending the UE information to the candidate node.

Example 25. The method of example 24, wherein: the conditional mobility procedure is a conditional handover procedure; the RAN node is a source base station; and sending the UE information to the candidate node includes sending the UE information to a candidate base station.

Example 26. The method of example 25, wherein: sending the UE information to the candidate base station includes sending the UE information to the candidate base station in a conditional handover request message; and the method further comprises, after sending the UE information to the candidate base station, receiving a new conditional configuration from the candidate base station, and sending the new conditional configuration to the UE.

Example 27. The method of example 24, wherein: the conditional mobility procedure is a conditional handover between distributed units, DUs, of a distributed base station; the RAN node is a centralized unit, CU, of the distributed base station; and sending the UE information to the candidate node includes sending the UE information to a candidate DU of the distributed base station.

Example 28. The method of example 27, wherein sending the UE information to the candidate DU includes sending the UE information to the candidate DU in a UE context request message.

Example 29. The method of example 27 or 28, wherein sending the UE information to the candidate DU includes sending the UE information to the candidate DU after the conditional mobility procedure is executed.

Example 30. The method of example 27 or 28, wherein sending the UE information to the candidate DU includes sending the UE information to the candidate DU before the corresponding condition is satisfied.

Example 31. The method of example 24, wherein: the conditional mobility procedure is a conditional secondary node, SN, addition or change procedure; the RAN node is a master node, MN; and sending the UE information to the candidate node includes sending the UE information to a candidate SN.

Example 32. The method of example 31, wherein sending the UE information to the candidate SN includes sending the candidate SN an SN request message that includes the UE information.

Example 33. The method of example 31 or 32, wherein receiving the UE information includes receiving the UE information from the UE via a source SN of the RAN.

Example 34. A method in a radio access network, RAN, node of a RAN, the method comprising: sending to a user equipment, UE, a conditional configuration and a corresponding condition for a conditional mobility procedure, wherein the corresponding condition is to be satisfied before the UE can communicate with a candidate node of the RAN using the conditional configuration; after sending the conditional configuration and the corresponding condition, receiving UE information from the UE, the UE information including information indicative of a preference or circumstance of the UE; and after receiving the UE information from the UE, sending the candidate node a message that causes the UE to be reconfigured in accordance with the UE information.

Example 35. The method of example 34, further comprising: determining, by processing hardware of the RAN node, one or more configuration restrictions based on the UE information, wherein sending the message that causes the UE to be reconfigured includes sending information indicative of the one or more configuration restrictions to the candidate node.

Example 36. The method of example 35, wherein the one or more configuration restrictions include a maximum resource allocation for the UE.

Example 37. The method of any one of examples 34-36, wherein the message that causes the UE to be reconfigured does not include the UE information.

Example 38. The method of any one of examples 34-37, wherein: the conditional mobility procedure is a conditional handover procedure; the RAN node is a source base station; the candidate node is a candidate base station; and sending the message that causes the UE to be reconfigured includes sending the candidate base station a conditional handover request message before the conditional mobility procedure is executed.

Example 39. The method of any one of examples 34-37, wherein: the conditional mobility procedure is a conditional handover between distributed units, DUs, of a distributed base station; the RAN node is a centralized unit, CU, of the distributed base station; the candidate node is a candidate DU of the distributed base station; sending the conditional configuration and the corresponding condition to the UE includes sending the conditional configuration and the corresponding condition to the UE via a source DU of the base station; receiving the UE information from the UE includes receiving the UE information from the UE via the source DU; and sending the message that causes the UE to be reconfigured includes sending the candidate DU a UE context request message before the conditional mobility procedure is executed.

Example 40. The method of any one of examples 34-37, wherein: the conditional mobility procedure is a conditional secondary node, SN, addition or change procedure; the RAN node is a master node, MN; the candidate node is a candidate SN; and sending the message that causes the UE to be reconfigured includes sending the candidate SN an SN request message before the conditional mobility procedure is executed.

Example 41. The method of example 40, wherein receiving the UE information from the UE includes receiving the UE information from the UE via a source SN of the RAN.

Example 42. A method in a radio access network, RAN, node of a RAN, the method comprising: sending to a user equipment, UE, a conditional configuration and a corresponding condition for a conditional mobility procedure, wherein the corresponding condition is to be satisfied before the UE can communicate with a candidate node of the RAN using the conditional configuration; after sending the conditional configuration and the corresponding condition, receiving UE information from the UE, the UE information including information indicative of a preference or circumstance of the UE; and in response to receiving the UE information from the UE, sending a message that causes the UE to release the conditional configuration.

Example 43. The method of example 42, wherein: the conditional mobility procedure is a conditional handover procedure; the RAN node is a source base station; the candidate node is a candidate base station; and sending the message that causes the UE to release the conditional configuration includes sending a reconfiguration message to the UE.

Example 44. The method of example 43, further comprising: also in response to receiving the UE information from the UE, sending to the candidate base station a handover cancel message.

Example 45. The method of example 42, wherein: the conditional mobility procedure is a conditional handover between distributed units, DUs, of a distributed base station; the RAN node is a centralized unit, CU, of the distributed base station; the candidate node is a candidate DU of the distributed base station; sending the conditional configuration and the corresponding condition to the UE includes sending the conditional configuration and the corresponding condition to the UE via a source DU of the base station; receiving the UE information from the UE includes receiving the UE information from the UE via the source DU; and sending the message that causes the UE to be reconfigured includes sending the message that causes the UE to be reconfigured to the source DU.

Example 46. The method of example 42, wherein: the conditional mobility procedure is a conditional secondary node, SN, addition or change procedure; the RAN node is a master node, MN; the candidate node is a candidate SN; and sending the message that causes the UE to release the conditional configuration includes sending a reconfiguration message to the UE.

Example 47. The method of example 45 or 46, further comprising: also in response to receiving the UE information from the UE, sending to the candidate SN an SN release request message.

Example 48. The method of example 46 or 47, wherein receiving the UE information from the UE includes receiving the UE information from the UE via a source SN of the RAN.

Example 49. A method in a radio access network, RAN, node of a RAN, the method comprising: determining, by processing hardware of the RAN node, to perform a conditional mobility procedure for a user equipment, UE; and in response to determining to perform, or performing, the conditional mobility procedure, preventing the UE from sending UE information indicative of a preference or circumstance of the UE to the RAN node, and sending to the UE a conditional configuration and a corresponding condition that is to be satisfied before the UE can communicate with a candidate node of the RAN using the conditional configuration.

Example 50. The method of example 49, wherein: the conditional mobility procedure is a conditional handover procedure; the RAN node is a source base station; the candidate node is a candidate base station; and determining to perform the conditional mobility procedure includes determining to perform a conditional handover of the UE from the source base station to the candidate base station.

Example 51. The method of example 49, wherein: the conditional mobility procedure is a conditional handover between distributed units, DUs, of a distributed base station; the RAN node is a centralized unit, CU, of the distributed base station; the candidate node is a candidate DU of the base station; and determining to perform the conditional mobility procedure includes determining to perform a conditional handover of the UE from a source DU of the base station to the candidate DU.

Example 52. The method of example 49, wherein: the conditional mobility procedure is a conditional secondary node, SN, change procedure; the RAN node is a master node, MN; the candidate node is a candidate SN; and determining to perform the conditional mobility procedure includes determining to perform an SN change procedure for the UE from a source SN of the RAN to the candidate SN.

Example 53. The method of any one of examples 49-52, wherein preventing the UE from sending UE information indicative of a preference or circumstance of the UE to the RAN node includes: determining, by the processing hardware, that the UE is currently enabled to send UE information indicative of a preference or circumstance of the UE; and in response to determining that the UE is currently enabled to send UE information indicative of a preference or circumstance of the UE, disabling the UE from sending UE information indicative of a preference or circumstance of the UE.

Example 54. The method of any one of examples 49-52, wherein preventing the UE from sending UE information indicative of a preference or circumstance of the UE to the RAN node includes: determining, by the processing hardware, that the UE is not currently enabled to send UE information indicative of a preference or circumstance of the UE; and in response to determining that the UE is not currently enabled to send UE information indicative of a preference or circumstance of the UE, refraining from disabling the UE from sending UE information indicative of a preference or circumstance of the UE.

Example 55. A method in a radio access network, RAN, node of a RAN, the method comprising: determining, by processing hardware of the RAN node, to enable a user equipment, UE, to send UE information indicative of a preference or circumstance of the UE to the RAN node; in response to determining to enable, or enabling, the UE to send UE information indicative of a preference or circumstance of the UE to the RAN node, enabling the UE to send UE information indicative of a preference or circumstance of the UE to the RAN node, and preventing the UE from performing a conditional mobility procedure.

Example 56. The method of example 55, wherein: the RAN node is a source base station; and preventing the UE from performing the conditional mobility procedure includes preventing the UE from performing a conditional handover from the source base station to a candidate base station of the RAN.

Example 57. The method of example 55, wherein: the RAN node is a centralized unit, CU, of the distributed base station; and preventing the UE from performing the conditional mobility procedure includes preventing the UE from performing a conditional handover from a source distributed unit, DU, of the distributed base station to a candidate DU of the distributed base station.

Example 58. The method of example 55, wherein: the RAN node is a master node, MN; and preventing the UE from performing the conditional mobility procedure includes preventing the UE from performing a change procedure for the UE from a source secondary node, SN, of the RAN to a candidate SN of the RAN.

Example 59. The method of any one of examples 55-58, wherein preventing the UE from performing the conditional mobility procedure includes: determining, by the processing hardware, that the UE is currently configured with a conditional configuration; and in response to determining that the UE is currently configured with a conditional configuration, sending the UE a message that causes the UE to release the conditional configuration.

Example 60. The method of any one of examples 55-58, wherein preventing the UE from performing the conditional mobility procedure includes: determining, by the processing hardware, that the UE is not currently configured with a conditional configuration; and in response to determining that the UE is not currently configured with a conditional configuration, refraining from configuring the UE with a conditional configuration.

Example 61. The method of any one of examples 24-60, wherein the UE information includes a preferred configuration of the UE.

Example 62. The method of any one of examples 24-60, wherein the UE information indicates another communication technology that the UE is using, resources that the UE is using for the other communication technology, and/or resources that are affected by the other communication technology.

Example 63. The method of any one of examples 24-60, wherein the UE information indicates a service that is preferred or being used by the UE.

Example 64. The method of any one of examples 24-60, wherein the UE information includes sidelink information.

Example 65. A radio access network, RAN, node comprising hardware and configured to implement the method of any one of examples 24-64.

Example 66. A method in a user equipment, UE, communicating with a radio access network, RAN, the method comprising: receiving, from the RAN, a conditional configuration and a corresponding condition for a conditional PSCell addition or change procedure, wherein the corresponding condition is to be satisfied before the UE can communicate via a candidate cell of the RAN using the conditional configuration; after receiving the conditional configuration and the corresponding condition, sending UE information to the RAN, the UE information including information indicative of a preference or circumstance of the UE; and after determining that the corresponding condition is satisfied, again sending the UE information to the RAN.

Example 67. The method of example 66, wherein again sending the UE information to the RAN occurs after the conditional PSCell addition or change procedure is executed.

Example 68. The method of example 66 or 67, wherein the UE information includes a preferred configuration of the UE.

Example 69. The method of example 66 or 67, wherein the UE information indicates another communication technology that the UE is using, resources that the UE is using for the other communication technology, and/or resources that are affected by the other communication technology.

Example 70. The method of example 66 or 67, wherein the UE information indicates a service that is preferred or being used by the UE.

Example 71. The method of example 66 or 67, wherein the UE information includes sidelink information.

Example 72. A user equipment, UE, comprising hardware and configured to implement the method of any one of examples 66-71.

Example 73. A method in a radio access network, RAN, communicating with a user equipment, UE, the method comprising: sending to the UE a conditional configuration and a corresponding condition for a conditional PSCell addition or change procedure, wherein the corresponding condition is to be satisfied before the UE can communicate via a candidate cell of the RAN using the conditional configuration; after sending the conditional configuration and the corresponding condition, and before the corresponding condition is satisfied, receiving UE information from the UE, the UE information including information indicative of a preference or circumstance of the UE; and after the corresponding condition is satisfied, again receiving the UE information from the UE.

Example 74. The method of example 73, wherein again receiving the UE information occurs after the conditional PSCell addition or change procedure is executed.

Example 75. The method of example 73 or 74, wherein the UE information includes a preferred configuration of the UE.

Example 76. The method of example 73 or 74, wherein the UE information indicates another communication technology that the UE is using, resources that the UE is using for the other communication technology, and/or resources that are affected by the other communication technology.

Example 77. The method of example 73 or 74, wherein the UE information indicates a service that is preferred or being used by the UE.

Example 78. The method of example 73 or 74, wherein the UE information includes sidelink information.

Example 79. The method of any one of examples 73-78, further comprising: after again receiving the UE information from the UE, sending to the UE, via the candidate cell, a message that reconfigures the UE in accordance with the UE information.

Example 80. One or more radio access network, RAN, nodes comprising hardware and configured to implement the method of any one of examples 73-79.

Example 80. One or more radio access network, RAN, nodes comprising hardware and configured to implement the method of any one of examples 73-79.

The following additional considerations apply to the foregoing discussion.

In some implementations, a "message" discussed above can instead be an information element (IE), and/or an "IE" can be a field. Moreover, where the discussion above refers to a "condition" or a "configuration" in the singular, it will be understood that it can be one or multiple conditions, or include one or multiple configurations or configuration parameters. The term "(C-)MN configuration" can be replaced by configuration(s) included in the (C-)MN configuration, and "(C-)SN configuration" can be replaced by configuration(s) included in the (C-)SN configuration.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques described herein can be provided as part of the operating system, a library used by multiple applications, a particular software application, and/or in another form. The software can be executed by one or more general-purpose processors and/or one or more special-purpose processors.

What is claimed is:

1. A method in a user equipment (UE) communicating with a radio access network (RAN), the method comprising:
   receiving, from the RAN, a conditional configuration and a corresponding condition for a conditional procedure, wherein the corresponding condition is to be satisfied before the UE can communicate with a candidate node of the RAN using the conditional configuration;

determining, by the UE, that an other condition is satisfied;

after receiving the conditional configuration and the corresponding condition, and in response to determining that the other condition is satisfied, sending UE information to the RAN, the UE information including preferred configurations, in-device coexistence (IDC) assistance information, sidelink information, or multicast and/or broadcast service (MBS) interest information;

after sending the UE information to the RAN, determining, by the UE, that the corresponding condition is satisfied;

again determining, by the UE, that the other condition is satisfied; and after determining that the corresponding condition is satisfied, and in response to again determining that the other condition is satisfied, again sending the UE information to the RAN.

2. The method of claim 1, wherein:

the conditional procedure is a conditional handover;

the candidate node is a candidate base station;

receiving the conditional configuration and the corresponding condition includes receiving the conditional configuration and the corresponding condition from a source base station;

sending the UE information to the RAN includes sending the UE information to the source base station; and again sending the UE information to the RAN includes sending the UE information to the candidate base station.

3. The method of claim 1, wherein:

the conditional procedure is a conditional handover between distributed units (DUs) of a distributed base station;

the candidate node is a candidate DU of the distributed base station;

receiving the conditional configuration and the corresponding condition includes receiving the conditional configuration and the corresponding condition from a source DU of the distributed base station;

sending the UE information to the RAN includes sending the UE information to the source DU; and again sending the UE information to the RAN includes sending the UE information to the candidate DU.

4. The method of claim 1, wherein:

the conditional procedure is a conditional secondary node (SN) addition or change procedure;

the candidate node is a candidate SN;

receiving the conditional configuration and the corresponding condition includes receiving the conditional configuration and the corresponding condition from a master node (MN);

sending the UE information to the RAN includes sending the UE information to the MN; and again sending the UE information to the RAN includes sending the UE information to the MN for forwarding to the candidate SN.

5. The method of claim 1, wherein:

the conditional procedure is a conditional secondary node (SN) change procedure;

the candidate node is a candidate SN;

receiving the conditional configuration and the corresponding condition includes receiving the conditional configuration and the corresponding condition from a master node (MN);

sending the UE information to the RAN includes sending the UE information to a source SN of the RAN; and again sending the UE information to the RAN includes sending the UE information to the candidate SN.

6. The method of claim 1, wherein the UE information includes the preferred configurations.

7. The method of claim 1, wherein the UE information includes the IDC assistance information.

8. The method of claim 7, wherein the IDC assistance information indicates another communication technology that the UE is using, resources that the UE is using for the other communication technology, and/or resources that are affected by the other communication technology.

9. The method of claim 1, wherein the UE information includes the MBS interest information.

10. The method of claim 9, wherein the MBS interest information indicates a service that is preferred or being used by the UE.

11. The method of claim 1, wherein the UE information includes the sidelink information.

12. The method of claim 11, wherein the other condition is a condition relating to interest in sidelink communication, a request for sidelink resources, or provision of sidelink assistance information.

13. The method of claim 12, wherein the sidelink information includes frequency information of one or more frequencies, sidelink transmission resources request information, or sidelink assistance information.

14. The method of claim 11, wherein the other condition is a condition relating to a request to release sidelink communication, a lack of interest in sidelink communication, or a change of sidelink assistance information.

15. A user equipment (UE) comprising hardware, wherein the UE operates by:

receiving, from a radio access network (RAN), a conditional configuration and a corresponding condition for a conditional procedure, wherein the corresponding condition is to be satisfied before the UE can communicate with a candidate node of the RAN using the conditional configuration;

determining that an other condition is satisfied;

after receiving the conditional configuration and the corresponding condition, and in response to determining that the other condition is satisfied, sending UE information to the RAN, the UE information including preferred configurations, in-device coexistence (IDC) assistance information, sidelink information, or multicast and/or broadcast service (MBS) interest information;

after sending the UE information to the RAN, determining that the corresponding condition is satisfied;

again determining that the other condition is satisfied; and after determining that the corresponding condition is satisfied, and in response to again determining that the other condition is satisfied, again sending the UE information to the RAN.

16. The UE of claim 15, wherein:

the conditional procedure is a conditional handover;

the candidate node is a candidate base station;

receiving the conditional configuration and the corresponding condition includes receiving the conditional configuration and the corresponding condition from a source base station;

sending the UE information to the RAN includes sending the UE information to the source base station; and again sending the UE information to the RAN includes sending the UE information to the candidate base station.

17. The UE of claim 15, wherein:

the conditional procedure is a conditional handover between distributed units (DUs) of a distributed base station;

the candidate node is a candidate DU of the distributed base station;

receiving the conditional configuration and the corresponding condition includes receiving the conditional configuration and the corresponding condition from a source DU of the distributed base station;

sending the UE information to the RAN includes sending the UE information to the source DU; and again sending the UE information to the RAN includes sending the UE information to the candidate DU.

18. The UE of claim 15, wherein:

the conditional procedure is a conditional secondary node (SN) addition or change procedure;

the candidate node is a candidate SN;

receiving the conditional configuration and the corresponding condition includes receiving the conditional configuration and the corresponding condition from a master node (MN);

sending the UE information to the RAN includes sending the UE information to the MN; and again sending the UE information to the RAN includes sending the UE information to the MN for forwarding to the candidate SN.

19. The UE of claim 15, wherein:

the conditional procedure is a conditional secondary node (SN) change procedure;

the candidate node is a candidate SN;

receiving the conditional configuration and the corresponding condition includes receiving the conditional configuration and the corresponding condition from a master node (MN);

sending the UE information to the RAN includes sending the UE information to a source SN of the RAN; and again sending the UE information to the RAN includes sending the UE information to the candidate SN.

20. The UE of claim 15, wherein the UE information includes the sidelink information.

\* \* \* \* \*